United States Patent
Islam et al.

(10) Patent No.: US 10,906,184 B2
(45) Date of Patent: Feb. 2, 2021

(54) METHOD AND CONTROL SYSTEM FOR VERIFYING AND UPDATING CAMERA CALIBRATION FOR ROBOT CONTROL

(71) Applicant: MUJIN, INC., Tokyo (JP)

(72) Inventors: Russell Islam, Tokyo (JP); Xutao Ye, Tokyo (JP); Rosen Diankov, Tokyo (JP)

(73) Assignee: MUJIN, INC., Tokyo (JP)

( * ) Notice: Subject to any disclaimer, the term of this patent is extended or adjusted under 35 U.S.C. 154(b) by 0 days.

(21) Appl. No.: 16/864,071

(22) Filed: Apr. 30, 2020

(65) Prior Publication Data

US 2020/0306977 A1 Oct. 1, 2020

Related U.S. Application Data

(63) Continuation-in-part of application No. 16/732,832, filed on Jan. 2, 2020, which is a continuation of
(Continued)

(51) Int. Cl.
*B25J 9/16* (2006.01)
*G06T 7/80* (2017.01)

(52) U.S. Cl.
CPC .......... *B25J 9/1692* (2013.01); *B25J 9/1697* (2013.01); *G06T 7/80* (2017.01); *G05B 2219/39008* (2013.01); *G06T 2207/30164* (2013.01)

(58) Field of Classification Search
CPC ......... B25J 9/1692; B25J 9/1697; G06T 7/80; G06T 2207/30164; G05B 2219/39008
(Continued)

(56) References Cited

U.S. PATENT DOCUMENTS

| 5,297,238 A | 3/1994 | Wang et al. |
| 7,015,418 B2 | 3/2006 | Cahill et al. |

(Continued)

FOREIGN PATENT DOCUMENTS

| CN | 1598610 A | 3/2005 |
| CN | 106000904 A | 10/2016 |

(Continued)

OTHER PUBLICATIONS

Any information that are not included with this Information Disclosure Statement can be found in U.S. Appl. No. 16/369,630;U.S. Appl. No. 16/525,044; and U.S. Appl. No. 16/732,832, to which this application claims priority.

(Continued)

*Primary Examiner* — Jaime Figueroa
(74) *Attorney, Agent, or Firm* — Medler Ferro Woodhouse & Mills PLLC

(57) ABSTRACT

A computing system and a method for calibration verification is presented. The computing system is configured to perform a first calibration operation, and to control a robot arm to move a verification symbol to a reference location. The robot control system further receives, from a camera, a reference image of the verification symbol, and determines a reference image coordinate for the verification symbol. The robot control system further controls the robot arm to move the verification symbol to the reference location again during an idle period, receives an additional image of the verification symbol, and determines a verification image coordinate. The robot control system determines a deviation parameter value based the reference image coordinate and the verification image coordinate, and whether the deviation parameter value exceeds a defined threshold, and performs a second calibration operation if the threshold is exceeded.

20 Claims, 30 Drawing Sheets

Related U.S. Application Data application No. 16/525,004, filed on Jul. 29, 2019, now Pat. No. 10,562,186, which is a continuation of application No. 16/369,630, filed on Mar. 29, 2019, now Pat. No. 10,399,227.

(60) Provisional application No. 62/916,798, filed on Oct. 18, 2019.

(58) Field of Classification Search
USPC .......................................................... 700/245
See application file for complete search history.

(56) References Cited

U.S. PATENT DOCUMENTS

| | | | |
|---|---|---|---|
| 9,916,506 B1 | 3/2018 | Davis | |
| 10,052,766 B2 | 8/2018 | Shirakyan et al. | |
| 10,095,555 B2 | 10/2018 | Koyanagi et al. | |
| 10,350,755 B2 | 7/2019 | Wagner et al. | |
| 10,369,698 B1 * | 8/2019 | Islam | G06T 7/50 |
| 2005/0166413 A1 | 8/2005 | Crampton | |
| 2008/0004750 A1 * | 1/2008 | Ban | B25J 9/1692 |
| | | | 700/245 |
| 2010/0232681 A1 | 9/2010 | Fujieda et al. | |
| 2011/0282492 A1 * | 11/2011 | Krause | B25J 9/1664 |
| | | | 700/259 |
| 2012/0203490 A1 | 8/2012 | Sayeh et al. | |
| 2012/0327214 A1 | 12/2012 | McEntyre et al. | |
| 2013/0010081 A1 | 1/2013 | Tenney et al. | |
| 2013/0345875 A1 * | 12/2013 | Brooks | B25J 11/0005 |
| | | | 700/259 |
| 2015/0025683 A1 | 1/2015 | Amano | |
| 2016/0075015 A1 | 3/2016 | Izhikevich et al. | |
| 2016/0292882 A1 | 10/2016 | Comport et al. | |
| 2017/0032529 A1 | 2/2017 | De Villiers et al. | |
| 2017/0043477 A1 * | 2/2017 | Kitayama | B25J 9/0084 |
| 2018/0089831 A1 | 3/2018 | Liu et al. | |
| 2018/0272535 A1 | 9/2018 | Ogawa et al. | |
| 2018/0300901 A1 | 10/2018 | Wakai et al. | |
| 2018/0304466 A1 | 10/2018 | Machino et al. | |
| 2018/0309978 A1 | 10/2018 | Nobori et al. | |
| 2018/0316905 A1 | 11/2018 | Nobori et al. | |
| 2018/0316906 A1 | 11/2018 | Nobori et al. | |
| 2018/0339174 A1 | 11/2018 | Kilby et al. | |
| 2018/0339456 A1 | 11/2018 | Czinger et al. | |
| 2018/0350100 A1 | 12/2018 | Hanson et al. | |
| 2018/0354130 A1 | 12/2018 | Preisinger et al. | |
| 2019/0105781 A1 | 1/2019 | Nobori et al. | |
| 2019/0071261 A1 * | 3/2019 | Wertenberger | B25J 15/0052 |
| 2019/0092179 A1 | 3/2019 | Kwa et al. | |
| 2019/0154850 A1 | 5/2019 | Nishihara et al. | |
| 2019/0156478 A1 | 5/2019 | Berlinger et al. | |
| 2019/0182415 A1 * | 6/2019 | Sivan | G06F 3/013 |
| 2019/0239716 A1 | 8/2019 | Choi et al. | |
| 2019/0244375 A1 | 8/2019 | Choi et al. | |
| 2019/0291277 A1 | 9/2019 | Oleynik | |
| 2020/0027241 A1 | 1/2020 | Tong et al. | |

FOREIGN PATENT DOCUMENTS

| | | |
|---|---|---|
| CN | 106965180 A | 7/2017 |
| CN | 107851304 A | 3/2018 |
| DE | 2011 101 730 B4 | 3/2016 |
| DE | 2017 217 142 A1 | 3/2018 |
| DE | 2018 200 154 A1 | 7/2018 |
| EP | 2921267 A2 | 9/2015 |
| JP | 63-163907 A | 7/1988 |
| JP | 02-183102 A | 7/1990 |
| JP | 04-60817 A | 2/1992 |
| JP | 05-11822 A | 1/1993 |
| JP | 05-301195 A | 11/1993 |
| JP | 2014-149142 A | 8/2014 |
| JP | 2016-078195 A | 5/2016 |
| JP | 2017-033247 A | 2/2017 |
| JP | 2018-001333 A | 1/2018 |
| JP | 2018-158391 A | 10/2018 |
| JP | 2019-000923 A | 1/2019 |
| JP | 2014-014912 A | 4/2020 |
| WO | 2018/163450 A1 | 1/2018 |
| WO | 2017033247 A1 | 3/2018 |
| WO | 2018163450 A1 | 9/2018 |

OTHER PUBLICATIONS

Notification of Reason for Refusal issued in Japanese Application No. 2019-126578, dated Nov. 19, 2019.
Office Action dated Sep. 9, 2020, in German Patent Appln No. 10 2020 106 973.1 (with English language translation).
Office Action dated Aug. 10, 2020, in Chinese Patent Appln No. 202010044652.0 (with English language translation).
Office Action dated Aug. 25, 2020, in Japanese Patent Appln No. 2020-120957 (with English language translation).
Office Action dated Sep. 29, 2020, in U.S. Appl. No. 16/732,832.

* cited by examiner

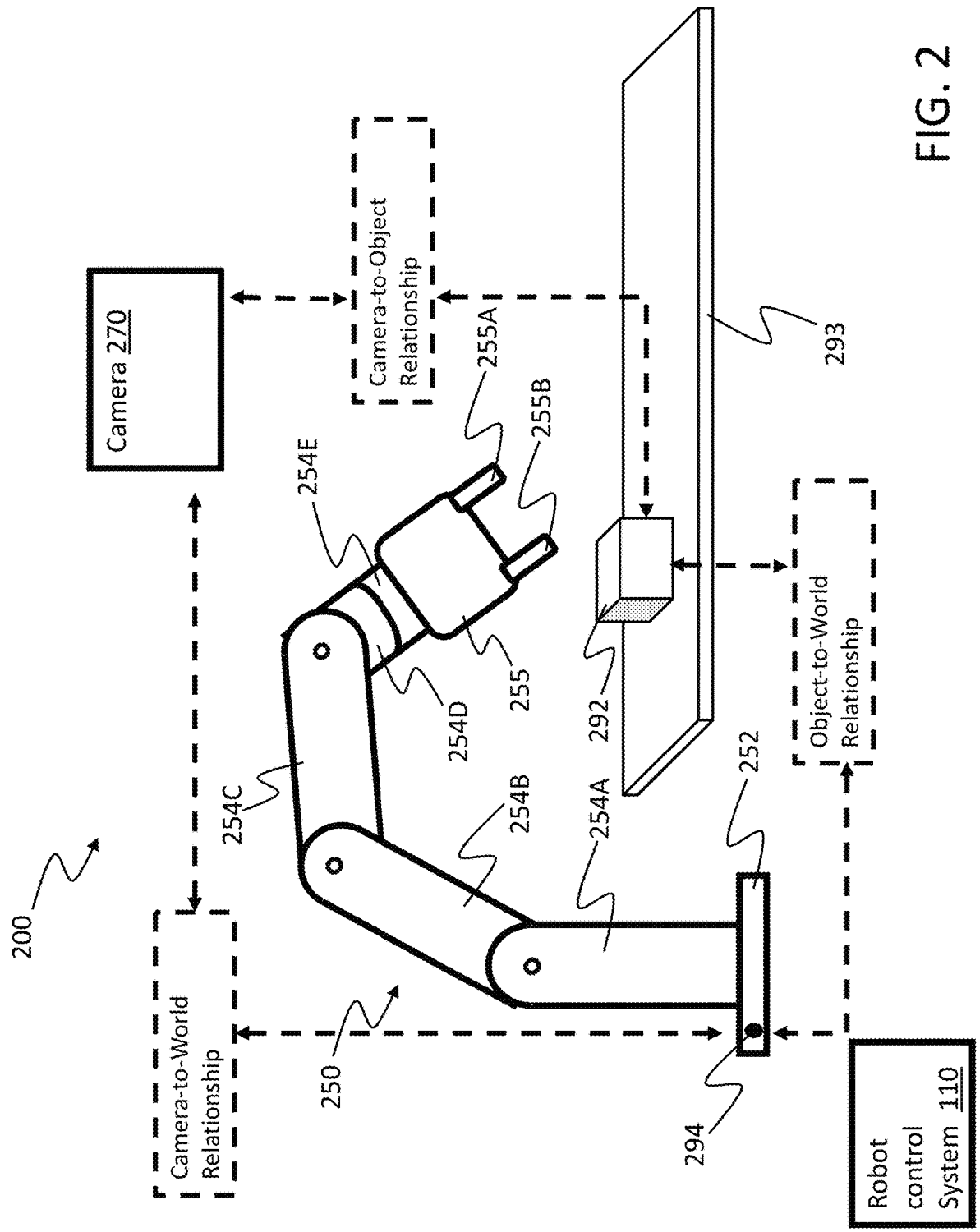

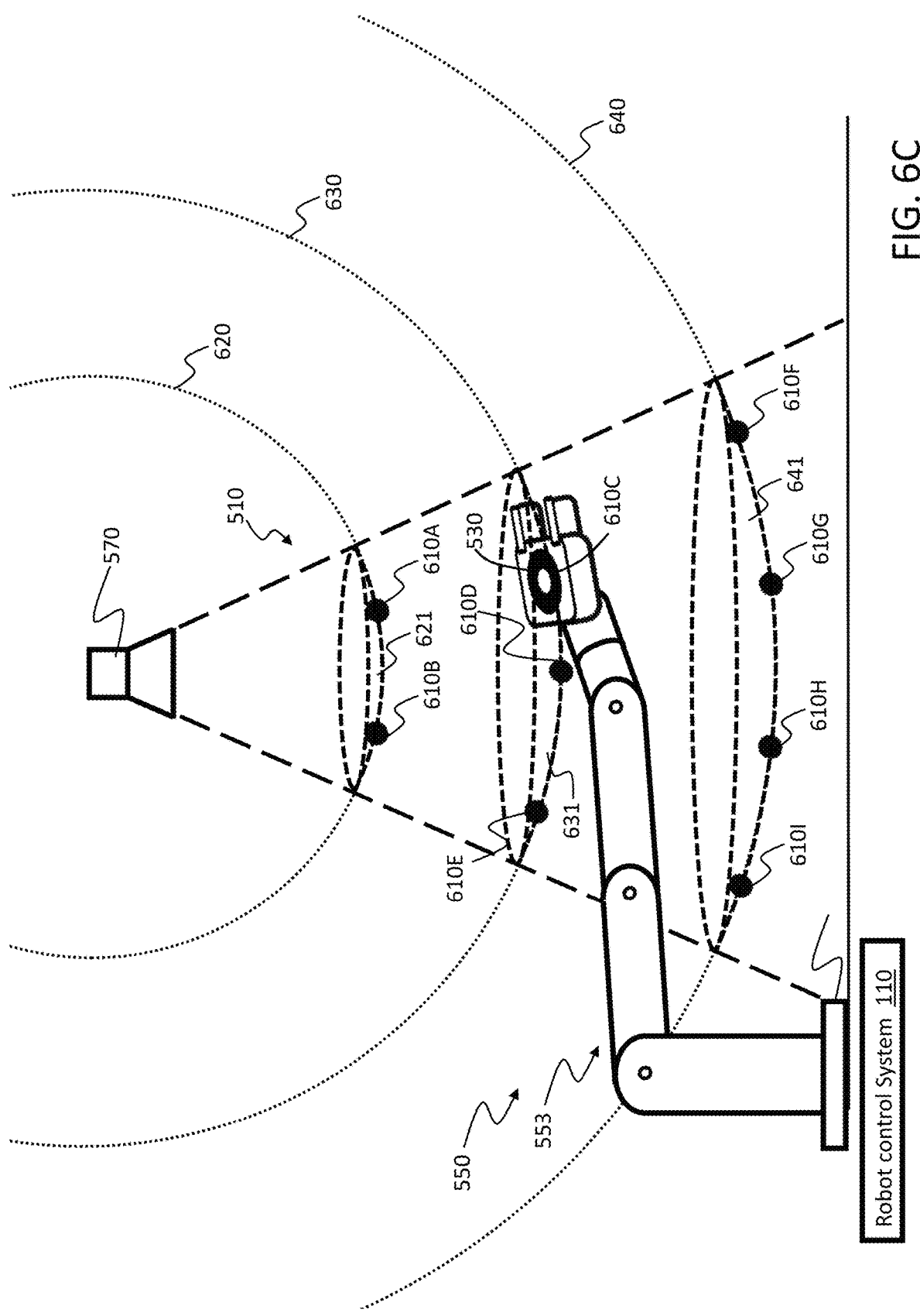

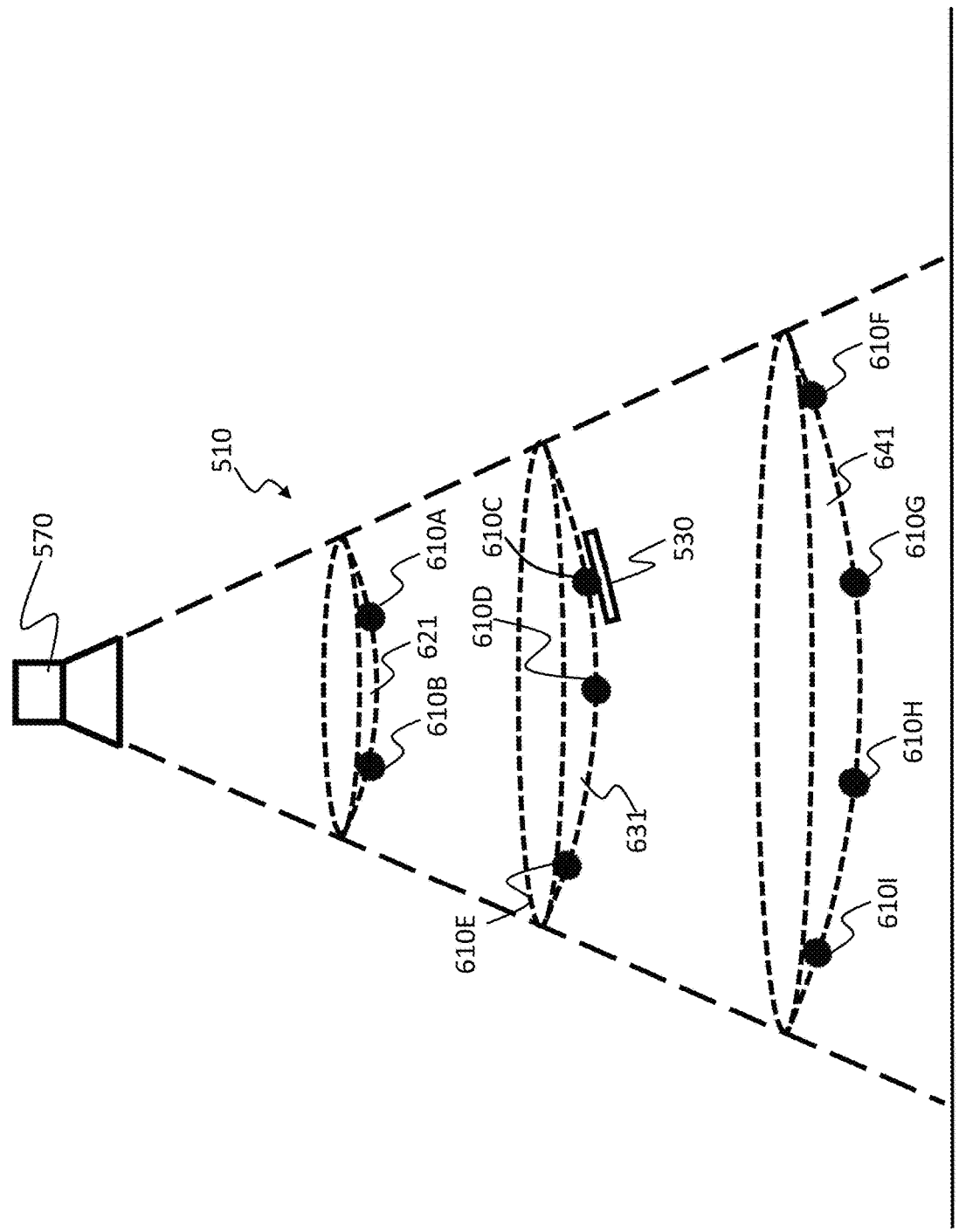

METHOD AND CONTROL SYSTEM FOR VERIFYING AND UPDATING CAMERA CALIBRATION FOR ROBOT CONTROL

CROSS-REFERENCE TO RELATED APPLICATIONS

The present application is a continuation-in-part of U.S. patent application Ser. No. 16/732,832, entitled "Method and Control System for Verifying and Updating Camera Calibration for Robot Control" and filed Jan. 2, 2020, which is a continuation of U.S. patent application Ser. No. 16/525,004, entitled "Method and Control System for Verifying and Updating Camera Calibration for Robot Control" and filed Jul. 29, 2019, which is a continuation of U.S. patent application Ser. No. 16/369,630, entitled "Method and Control System for Verifying and Updating Camera Calibration for Robot Control" and filed Mar. 29, 2019, the entire contents of which are incorporated by reference herein. This application further claims the benefit of U.S. Provisional Application No. 62/916,798, entitled "Method and Control System for Verifying Calibration for Robot Control," filed Oct. 18, 2019, the entire content of which is also incorporated herein by reference.

FIELD OF THE INVENTION

The present invention is directed to a method and control system for verifying and updating calibration information for robot control.

BACKGROUND

As automation becomes more common, robots are being used in more environments, such as in warehousing and manufacturing environments. For instance, robots may be used to load items onto or off of a pallet in a warehouse, or to pick up objects from a conveyor belt in a factory. The movement of the robot may be fixed, or may be based on an input, such as an image taken by a camera in the warehouse or factory. In the latter situation, a calibration operation may be performed so as to determine a property of the camera, and to determine a relationship between the camera and an environment in which the robot is located. The calibration operation may generate calibration information that is used to control the robot. In some implementations, the calibration operation may involve manual operation by a person, who may manually control movement of the robot, or manually control the camera to capture an image of the robot.

SUMMARY

One aspect of the embodiments herein relates to performing calibration verification for robot control, such as verifying camera calibration or other system calibration. The calibration verification may be performed by a robot control system that comprises a communication interface and a control circuit. The communication interface may be configured to communicate with a robot having a base and a robot arm with a verification symbol disposed thereon, and to communicate with a camera having a camera field of view. The control circuit of the robot control system may be configured to perform the calibration verification by: a) performing a first calibration operation (e.g., a first camera calibration) to determine calibration information (e.g., camera calibration information), b) outputting a first movement command to the communication interface, wherein the communication interface is configured to communicate the first movement command to the robot to cause the robot arm to move the verification symbol, during or after the first calibration operation, to a location within the camera field of view, the location being a reference location of one or more reference locations for verification of the first calibration operation, c) receiving an image of the verification symbol via the communication interface from the camera, which is configured to capture the image of the verification symbol at the reference location, the image being a reference image for the verification, d) determining a reference image coordinate for the verification symbol, the reference image coordinate being a coordinate at which the verification symbol appears in the reference image, and e) outputting a second movement command that is based on the calibration information to the communication interface, wherein the communication interface is configured to communicate the second movement command to the robot to cause movement of the robot arm to perform a robot operation.

In an embodiment, the control circuit is configured to perform the calibration verification further by: f) detecting an idle period during the robot operation, g) outputting a third movement command to the communication interface, wherein the communication interface is configured to communicate the third movement command to the robot to cause the robot arm to move the verification symbol to at least the reference location during the idle period, h) receiving via the communication interface an additional image of the verification symbol from the camera, which is configured to capture the additional image of the verification symbol at least at the reference location during the idle period, the additional image being a verification image for the verification, i) determining a verification image coordinate used for the verification, the verification image coordinate being a coordinate at which the verification symbol appears in the verification image, j) determining a deviation parameter value based on an amount of deviation between the reference image coordinate and the verification image coordinate, the reference image coordinate and the verification image coordinate both associated with the reference location, wherein the deviation parameter value is indicative of a change since the first calibration operation in the camera that the communication interface is configured to communicate with, or a change since the first calibration operation in a relationship between the camera and the robot that the communication interface is configured to communicate with, k) determining whether the deviation parameter value exceeds a defined threshold, and l) performing, in response to a determination that the deviation parameter value exceeds the defined threshold, a second calibration operation (e.g., a second camera calibration operation) to determine updated calibration information (e.g., updated camera calibration information).

BRIEF DESCRIPTION OF THE DRAWINGS

The foregoing and other features, objects and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 2 depicts a system that illustrates a robot being controlled based on calibration information obtained from a calibration operation, according to an embodiment herein.

FIGS. 6A-6D depict examples of reference locations at which respective images of a verification symbol is captured, according to an embodiment herein.

DETAILED DESCRIPTION

Figure 1A:
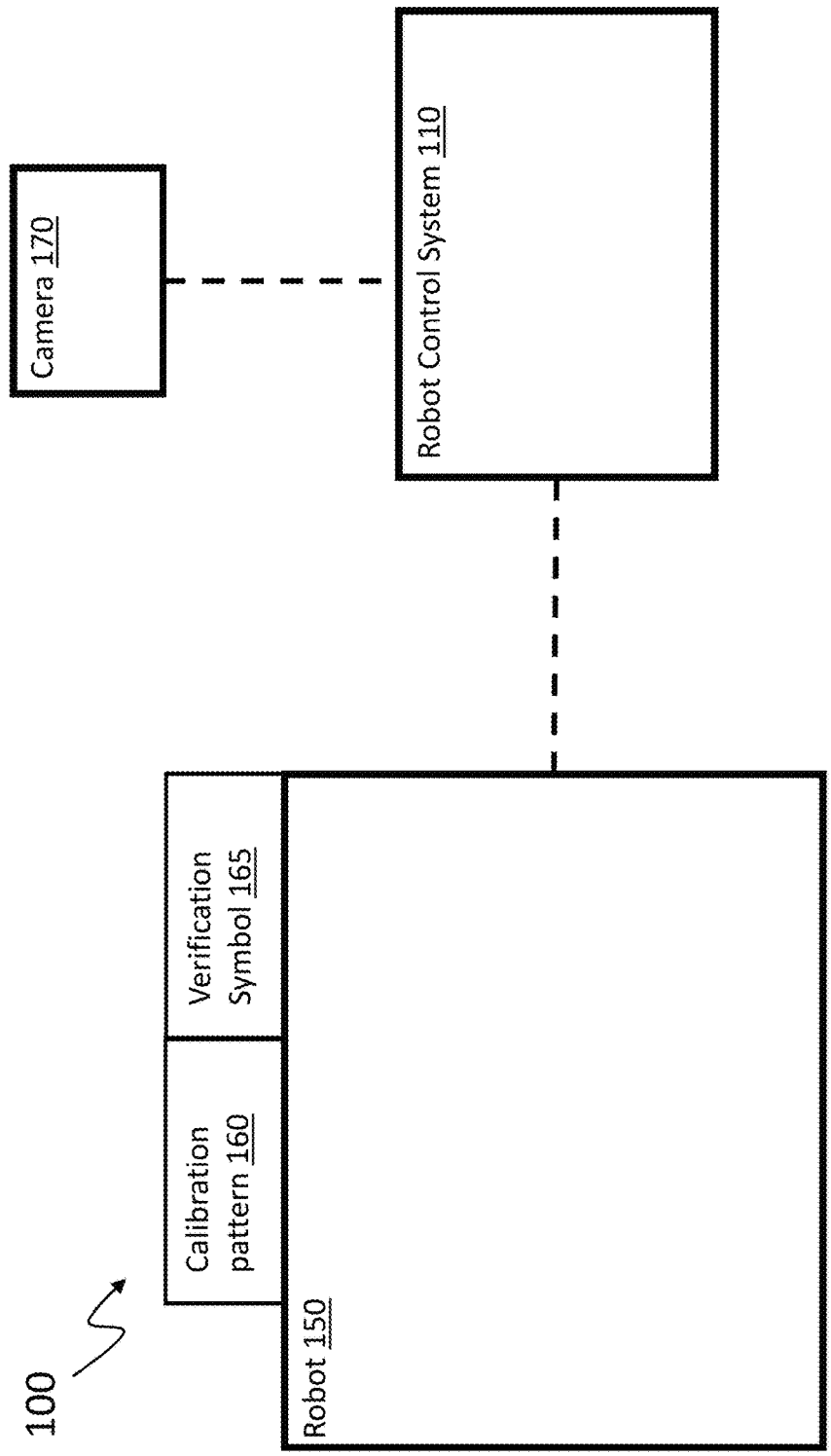
FIGS. 1A and 1B depict block diagrams of systems in which verification of calibration information is performed, according to embodiments herein.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments described herein relate to verifying and/or updating calibration information used to control a robot, such as a robot used in a warehouse, a manufacturing plant, or in some other environment. More specifically, the calibration information may be performed to facilitate control of a robot operation system, and may be determined by performing a calibration operation, which may be referred to as system calibration. The system calibration may include calibration of a camera (which may be referred to as camera calibration or a camera calibration operation), calibration of a robot (which may be referred to as robot calibration), a calibration of another element of the robot operation system, or any combination thereof. The system calibration may be performed by, e.g., a robot control system (also referred to as a robot controller) to generate calibration information (e.g., camera calibration information) that facilitates an ability of the robot control system to control of the robot based on images captured (e.g., photographed) by the camera. For instance, the robot may be used to pick up a package in a warehouse, wherein placement of a robot arm or other component of the robot may be based on images of the package captured by the camera. In that instance, if the calibration information includes camera calibration information, the camera calibration information may be used along with the images of the package to determine, for example, a location and orientation of the package relative to the robot arm of the robot. If the system calibration includes camera calibration, the camera calibration may involve determining respective estimates of intrinsic parameters of the camera (which may also be referred to as internal parameters), and determining an estimate of a relationship between the camera and its external environment. An intrinsic parameter of the camera may have one or more parameter values such as a matrix, a vector, or a scalar value. Further, examples of an intrinsic parameter include a projection matrix and a distortion parameter. In an instance, the camera calibration may involve determining the camera's position with respect to a fixed position in an external environment, which may be expressed as a transformation function representing the relationship between the camera and the fixed position in the external environment. In some cases, the camera calibration may be performed with the aid of a calibration pattern, which may have pattern elements disposed at defined locations on the calibration pattern. The camera may capture an image of the pattern elements of the calibration pattern (also referred to as a calibration image), and the camera calibration may be performed based on comparing an image of the pattern elements with the defined locations of the pattern elements. Camera calibration is discussed in more detail in U.S. application Ser. No. 16/295,940, filed on Mar. 7, 2019 and titled "METHOD AND DEVICE FOR PERFORMING AUTOMATIC CAMERA CALIBRATION FOR ROBOT CONTROL", the entire content of which is incorporated herein by reference.

As stated above, one aspect of the present disclosure relates to verifying that a camera calibration or other calibration operation performed at an earlier point in time is still accurate at a later point in time. The camera calibration performed at the earlier point in time may generate camera calibration information that reflects a property of the camera at that point in time, such as an intrinsic parameter of the camera or a relationship between the camera and its external environment at that point in time. In some cases, an earlier camera calibration may lose accuracy over time because the property of the camera may change over time. In a first example, an intrinsic parameter of the camera may change over time. Such a change may be caused by, e.g., a temperature change that alters a shape of a housing and/or a lens of the camera. In a second example, a relationship between the camera and its external environment may change over time. For instance, the camera may shift in position or orientation relative to, e.g., a base of the robot or a location in a warehouse. Such a change may be caused by, e.g., a temperature change that expands or contracts any component used to mount the camera, by a person or other object bumping into the camera, by a vibration in the camera's external environment (e.g., a warehouse), by a force from the camera's own weight (i.e., by gravity), or by some other factor. These changes may render the camera calibration information or other calibration information outdated, and using this camera calibration information or other calibration information to position a robot arm or other component of the robot at a later point in time may lead to errors. In other words, if a property associated with the camera has changed over time but the camera calibration information is not updated to reflect such a change, the robot may operate based on outdated or otherwise incorrect camera calibration information, thereby causing undesirable errors in the robot's operation. To address the possibility that changes in one or more properties of the camera may occur, a robot control system may automatically perform a verification that detects when camera calibration information from a camera calibration is no longer sufficiently accurate (or, more generally, when calibration information from a calibration operation is no longer sufficiently accurate). Detecting such a condition may provide an indication of a change in a property of the camera or of some other element of a robot operation system. If the verification detects that the calibration information is no longer sufficiently accurate, then the robot control system may perform a calibration operation to determine updated calibration information, which may reflect a more current property or properties of the camera or of another element of the robot operation system. The updated calibration information may be used to control placement of the robot arm or some other aspect of the robot's operation. Accordingly, an automatic verification of the calibration information and/or update of the calibration information are performed to ensure that the robot operates based on correct information about one or more properties associated with the camera or any other element of the robot operation system.

One aspect of the embodiments herein relates to verifying calibration information for a camera by comparing a reference image captured by the camera and a verification image captured by the camera. In some instances, the reference image may be an image of an object captured when the object is at a particular location at an earlier point in time, and the verification image may be an image of the object captured at a later point in time at the same location. The verification may determine whether there is too much deviation between the reference image and the verification image, such as whether the deviation exceeds a certain threshold. In some implementations, the object may be a verification symbol. More specifically, a robot arm or other component of the robot may have a verification symbol that is used to verify the calibration information. Both the reference image and the verification image may capture or otherwise include the verification symbol, and the robot control system may compare the two images by comparing an appearance of the verification symbol in the reference image with an appearance of the verification symbol in the verification image. For instance, after the robot control system performs a calibration operation that produces calibration information at a particular point in time, the robot control system may control the robot arm (e.g., via a movement command) to move the verification symbol to a set of predefined locations within the camera's field of view (also referred to as a camera field of view of the camera), wherein these locations may be used as a set of reference locations for the verification. The camera may capture respective reference images of the verification symbol at the set of reference locations. In some cases, the reference images may be captured immediately after the calibration operation is performed. The movement of the robot arm, or more specifically a movement command used to move the robot arm, may be based on the calibration information from the calibration operation that was just performed, or may be independent of the calibration information. In some cases, the reference images may be captured before the robot begins robot operation. After the reference images are captured, the robot may be considered ready to begin a robot operation to perform a task, and the robot control system may, e.g., control positioning of the robot arm based on images subsequently captured by the camera.

As stated above, the reference images may be compared against subsequently captured verification images. In an embodiment, the verification images may be captured during one or more idle periods detected by the robot control system. More specifically, when the robot operation begins, the robot may start performing robot tasks (e.g., by interacting with packages or other objects). While the robot is performing the robot operation, the robot control system may detect one or more idle periods for the robot. In some instances, the idle period may be a time period during which the robot is free from performing a robot task during the robot operation. In some cases, the robot control system may schedule the robot operation based on detecting or otherwise anticipating objects that the robot needs to interact with, and may detect an idle period based on detecting or otherwise anticipating an absence of objects with which the robot needs to interact.

During the idle period(s), the robot control system may control the robot arm or other component of the robot (e.g., via a movement command) to move to the reference locations and capture (e.g., via a camera command) a respective verification image at each of the reference locations. If the robot has a verification symbol disposed thereon, the robot control system may more specifically control the robot arm to move the verification symbol to the reference locations to capture the verification images. Subsequently, the robot control system may determine how much the respective verification images deviate from corresponding reference images at respective reference locations. In some cases, the deviation between the verification images and respective reference images may be expressed as a deviation parameter. If a value of the deviation parameter (also referred to as a deviation parameter value) exceeds a defined threshold for the deviation parameter (which may also be referred to as defined deviation threshold), the robot control system may perform an additional calibration operation (e.g., perform an additional camera calibration) to determine updated calibration information (e.g., updated camera calibration information) for the camera. When a value of the deviation parameter exceeds the defined deviation threshold, this condition may indicate that use of previously generated calibration information may lead to an undesirable amount of error in the robot operation. Thus, in some cases, the robot operation may be paused or stopped while the additional calibration operation is performed (the pause may be considered another idle period). After the additional calibration operation is complete, a new set of reference images may be captured, and the robot operation may continue with the updated calibration information. During a subsequent idle period(s), a new set of verification images may be captured, and the robot control system may perform verification of the additional calibration operation by comparing the new set of reference images with the new set of verification images.

As stated above, if a value of the deviation parameter exceeds the defined deviation threshold, the robot control system may perform an additional calibration operation. If the value of the deviation parameter does not exceed the deviation threshold, then the robot operation may continue after an idle period without the robot control system performing an additional calibration operation. In this scenario, the camera may capture a new set of verification images at the respective reference locations during a subsequent idle period(s). When the new set of verification images are captured, the robot control system may again perform verification of the calibration information by determining how much the new set of verification images deviate from respective reference images at respective reference locations.

As stated above, the robot arm may have a verification symbol, such as a ring pattern, disposed thereon, and the verification symbol may be captured by or otherwise included in the reference images and the verification images. In an embodiment, the robot control system may determine a deviation between the reference images and the respective verification images based on respective locations where the verification symbol appears in the reference images, and based on respective locations where the verification symbol appears in the verification images. For instance, the robot control system may determine a reference image coordinate for each reference location. The reference image coordinate for a particular location may be a coordinate at which the verification symbol appears in a reference image that was captured when the verification symbol was placed at that reference location. More specifically, the reference image coordinate may be associated with a particular reference location, and may refer to an image coordinate at which a verification symbol appears in a reference image, wherein the reference image was captured by a camera when the verification symbol was placed at that reference location. In the above example, the image coordinate may refer to a coordinate in an image, such as a pixel coordinate. When the robot control system subsequently places the verification symbol at a particular reference location at a subsequent point in time and obtains a corresponding verification image, the robot control system may determine a verification image coordinate. The verification image coordinate may also be associated with the reference location, and may refer to an image coordinate (e.g., a pixel coordinate) at which the verification symbol appears in the verification image, wherein the verification image was captured by the camera when the verification symbol was placed at the reference location. The robot control system may compare the reference image coordinate associated with a particular reference location with a verification image coordinate associated with the same reference location. This comparison may be done for each reference location at which a verification image and a reference image were captured.

In an instance, a reference image coordinate at which a verification symbol appears in a reference image may be a coordinate of a center of the verification symbol in the reference image (also referred to as a center coordinate of the verification symbol in the reference image). Similarly, a verification image coordinate at which the verification symbol appears in a verification image may be a coordinate of a center of the verification symbol in the verification image (also referred to as a center coordinate of the verification symbol in the verification image). For each reference location at which the robot arm and/or verification symbol was located when a corresponding verification image was captured, the robot control system may determine a deviation between the reference image coordinate associated with the reference location and the verification image coordinate associated with the same reference location. If the robot arm and/or verification symbol had been placed at a plurality of reference locations, the robot control system may determine respective amounts of deviation between respective reference image coordinates and respective verification image coordinates for the plurality of reference locations. The robot control system may further determine a value of a deviation parameter based on the respective amounts of deviation between the reference image coordinates and the respective verification image coordinates for respective reference locations.

In an instance, the verification symbol may include multiple shapes that are concentric with one another, such that the respective centers of the multiple shapes in the verification symbol are at the same or substantially the same location. For instance, the verification symbol may be a ring pattern that includes two or more concentric circles. In some cases, if the reference image coordinate of a verification symbol is a center coordinate of the verification symbol in a reference image, the robot control system may determine a center coordinate of the verification symbol based on respective center coordinates of the multiple shapes in the reference image, wherein the center coordinate of a particular shape is a coordinate of a center of that shape. If the verification symbol is a ring pattern, the center coordinate of the ring pattern in a reference image may be determined as an average of a center coordinate of a first circle forming the ring pattern and a center coordinate of a second circle forming the ring pattern in the reference image. Similarly, a center coordinate of a verification symbol in a verification image may be determined based on respective center coordinates of the multiple shapes forming the verification symbol in the verification image. In some cases, using multiple shapes to form the verification symbol may improve an accuracy of the verification. For instance, using the respective center coordinates of the multiple shapes in an image to determine a center coordinate of the verification symbol may improve a robustness of the verification against image noise. More specifically, if an image of the verification symbol includes image noise, the image noise may reduce an accuracy by which the robot control system detects a center coordinate of a particular shape of the verification symbol. However, if the center coordinate of that shape is averaged with a center coordinate of another shape to determine a center coordinate of the verification symbol, the averaged center coordinate may reduce an impact of the image noise. As a result, an accuracy in determining the center coordinate of the verification symbol may be improved.

In an instance, the verification symbol may have multiple regions with different respective colors, wherein respective areas of the multiple regions may have a distinct and defined ratio. For example, the verification symbol may have a first region having a first color (e.g., black) and a second region having a second color (e.g., white), where a ratio of an area of the first region to an area of the second region is defined or otherwise known. The distinct ratio may facilitate identifying the verification symbol in an image, especially if the image captures or otherwise includes other features, such as dots of a calibration pattern. For example, the robot arm that is moving the verification symbol may also have the calibration pattern disposed on the robot arm. The robot control system may use the ratio to distinguish the verification symbol from the dots of the calibration pattern. More specifically, because the ratio of the areas of the multiple regions of the verification symbol is defined as a distinct ratio, the robot control system may identify the verification symbol in an image based on the defined ratio. During identification of the verification symbol appearing in an image, the robot control system may distinguish the verification symbol from the calibration pattern or other feature based on the defined ratio. In some cases, the verification symbol may be identified in the image as a portion of the image having the multiple regions of different respective colors and having the defined ratio between respective areas of the multiple regions. If the robot control system or other system or device determines that a particular portion of the image does not have multiple regions with different respective colors, or that respective areas of the multiple regions have a ratio different than the defined ratio, the robot control system may determine that the portion of the image is not the verification symbol.

In an instance, the robot control system may perform the verification based on a temperature surrounding the robot. For instance, the robot control system may adjust the defined deviation threshold (i.e., define a new value for the deviation threshold) based on the temperature. For example, a temperature may affect various parts in the camera and/or in the robot, as some materials may be sensitive and/or may expand/contract based on a temperature. A change in temperature may cause an intrinsic parameter(s) of the camera to change, and/or cause a relationship between the camera and its external environment to change. In an embodiment, the deviation threshold may be set to have a first value when the temperature is outside of a defined range, while the deviation threshold may be set to have a second value lower than the first value when the temperature is within the defined range. For example, when the temperature is within a defined normal operating temperature range (e.g., within 10 degrees of the room temperature), then the deviation threshold may be the first value. When the temperature is outside the normal operating temperature range, then the deviation threshold may have the second value lower than the first value. The second value may be lower than the first value so as to more easily trigger an additional calibration operation when the temperature is outside of the normal operating range, as the temperature outside the normal operating temperature range may be more likely to cause changes to the camera or to its relationship with the external environment, and thus more likely to cause errors in operating the robot with previously generated camera calibration information or any other calibration information.

In an embodiment, the verification of the calibration information may rely on only a single reference location. Alternatively, the verification of the calibration information may rely on a plurality of reference locations. The reference locations may be any locations in a camera's field of view, or may be specific, defined locations. For instance, the reference locations may be defined as locations on a surface of at least one imaginary sphere that is concave with respect to the camera. At each reference location in this scenario, the robot arm may be controlled to position the verification symbol such that the verification symbol is positioned tangentially to the surface of the at least one imaginary sphere while facing the camera. This positioning may better allow the verification symbol to be photographed or otherwise captured head-on by the camera (with the verification symbol directly facing the camera), so that an image of the verification symbol resembles a top view rather than a perspective view of the verification symbol. For instance, if the verification symbol is a ring pattern, positioning the ring pattern to be tangent to the surface of the imaginary sphere may allow a resulting image of the ring pattern to still appear circular, rather than appear elliptical. The resulting image may exhibit less perspective distortion or no perspective distortion (relative to a scenario in which the ring pattern appears elliptical in the image). The lack of perspective distortion may facilitate an accurate determination of a center coordinate of the ring pattern. In some cases, the reference locations may be divided among multiple imaginary spheres that are all concave with respect to the camera. The multiple imaginary spheres may share a common center and may be different in size, such that each imaginary sphere has a spherical surface having a different respective distance from the camera. In some cases, the camera may be a common center for all of the imaginary spheres.

FIG. 1A illustrates a block diagram of a robot operation system 100 (also referred to as the system 100) for performing automatic camera calibration and automatic verification of the camera calibration. While some of the examples below discuss performing automatic camera calibration and verifying camera calibration information determined from the automatic camera calibration, these examples may apply more generally to any type of automatic calibration operation, and to verifying any type of calibration information determined from the automatic calibration operation. The robot operation system 100 includes a robot 150, a robot control system 110 (also referred to as a robot controller), and a camera 170. In an embodiment, the system 100 may be located within a warehouse, a manufacturing plant, or other premises. The robot control system 110 may be configured to perform camera calibration, which is discussed in more detail below, to determine camera calibration information that is later used to control the robot 150 to perform a robot operation, such as picking up packages in the warehouse. The robot control system 110 may further be configured to perform camera calibration verification, which is also discussed in more detail below, to verify whether the camera calibration information is still sufficiently accurate. In some cases, the robot control system 110 is configured to perform the camera calibration and to control the robot 150 to perform robot operation based on the camera calibration information. In some cases, the robot control system 110 may form a single device (e.g., a single console or a single computer) that communicates with the robot 150 and the camera 170. In some cases, the robot control system 110 may include multiple devices.

In some cases, the robot control system 110 may be dedicated to performing the camera calibration and/or verification of the camera calibration, and may communicate the most current camera calibration information to another control system (also referred to as another controller, not shown) that then controls the robot 150 to perform a robot operation based on the most current camera calibration information. The robot 150 may be positioned based on images captured by the camera 170 and on the camera calibration information. More specifically, the robot control system 110 may, in an embodiment, be configured to generate movement commands based on the images and based on the camera calibration information, and to communicate the movement commands to the robot 150 to control movement of its robot arm. In some cases, the robot control system 110 is configured to perform verification of the camera calibration during an idle period in the robot operation. In some cases, the robot control system 110 is configured to perform the verification while performing a robot operation with the robot 150.

In an embodiment, the robot control system 110 may be configured to communicate via a wired or wireless communication with the robot 150 and the camera 170. For instance, the robot control system 110 may be configured to communicate with the robot 150 and/or the camera 170 via a RS-232 interface, a universal serial bus (USB) interface, an Ethernet interface, a Bluetooth® interface, an IEEE 802.11 interface, or any combination thereof. In an embodiment, the robot control system 110 may be configured to communicate with the robot 150 and/or the camera 170 via a local computer bus, such as a peripheral component interconnect (PCI) bus.

In an embodiment, the robot control system 110 may be separate from the robot 150, and may communicate with the robot via the wireless or wired connection discussed above. For instance, the robot control system 110 may be a stand-alone computer that is configured to communicate with the robot 150 and the camera 170 via a wired connection or wireless connection. In an embodiment, the robot control system 110 may be an integral component of the robot 150, and may communicate with other components of the robot 150 via the local computer bus discussed above. In some cases, the robot control system 110 may be a dedicated control system (also referred to as a dedicated controller) that controls only the robot 150. In other cases, the robot control system 110 may be configured to control multiple robots, including the robot 150. In an embodiment, the robot control system 110, the robot 150, and the camera 170 are located at the same premises (e.g., warehouse). In an embodiment, the robot control system 110 may be remote from the robot 150 and the camera 170, and may be configured to communicate with the robot 150 and the camera 170 via a network connection (e.g., local area network (LAN) connection).

In an embodiment, the robot control system 110 may be configured to retrieve or otherwise receive images of a calibration pattern 160 and/or of a verification symbol 165 disposed on the robot 150 (e.g., on a robot arm of the robot) from the camera 170. In some instances, the robot control system 110 may be configured to control the camera 170 to capture such images. For example, the robot control system 110 may be configured to generate a camera command that causes the camera 170 to capture an image of a field of view of the camera 170 (also referred to as a camera field of view), and to communicate the camera command to the camera 170 via the wired or wireless connection. The same command may cause the camera 170 to also communicate the image to the robot control system 110, or more generally to a storage device accessible by the robot control system 110. Alternatively, the robot control system 110 may generate another camera command that causes the camera 170, upon receiving the camera command, to communicate an image(s) it has captured to the robot control system 110. In an embodiment, the camera 170 may automatically capture an image in its camera field of view, either periodically or in response to a defined triggering condition, without needing a camera command from the robot control system 110. In such an embodiment, the camera 170 may also be configured to automatically, without a camera command from the robot control system 110, communicate the image to the robot control system 110 or, more generally, to a storage device accessible by the robot control system 110.

Figure 1B:
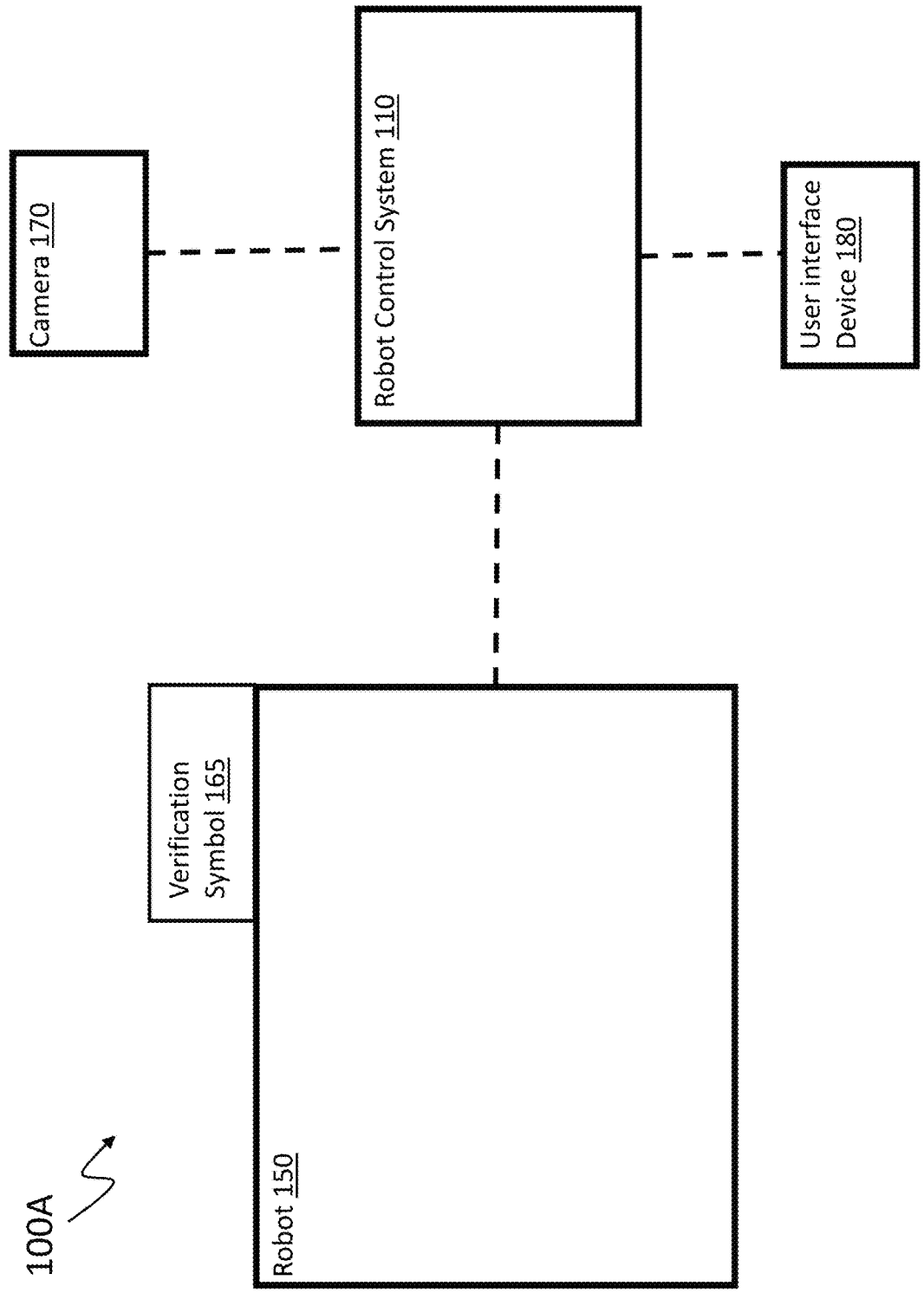

In an embodiment, the robot control system 110 may be configured to control movement of the robot 150 via movement commands that are generated by the robot control system 110 and communicated over the wired or wireless connection to the robot 150. The robot 150 may be configured to have one or both of the calibration pattern 160 and the verification symbol 165 on the robot 150. For instance, FIG. 1B depicts a robot operation system 100A in which the verification symbol 165 is disposed on the robot 150 without the presence of the calibration pattern 160 of FIG. 1A. In one instance, the verification symbol 165 may be a part of the robot 150 and may be permanently disposed on the robot 150. For example, the verification symbol 165 may be permanently painted on the robot 150, or may be part of a sticker or board that is permanently attached to the robot 150. In another instance, the verification symbol 165 may be a separate component that is attachable to and detachable from the robot 150. The verification symbol 165 may be permanently disposed on the robot 150, or may be a separate component that can be attached to and detached from the robot 150.

In an embodiment, the only images used in system 100 to control the robot 150 may be those captured by the camera 170. In another embodiment, the system 100 may include multiple cameras, and the robot 150 may be controlled by images from the multiple cameras.

FIG. 1B further illustrates an embodiment in which the robot control system 110 is in communication with a user interface device 180. The user interface device 180 may be configured to interface with an operator of the robot 150, such as an employee at a warehouse in which the robot 150 is located. The user interface device 180 may include, e.g., a tablet computer or desktop computer that provides a user interface displaying information relating to operation of the robot 150. As stated above, the robot control system 110 may be configured to detect when a deviation parameter value exceeds a defined deviation threshold. In an embodiment, the user interface device 180 may provide an alarm or other alert to notify the operator of the deviation parameter value exceeding the defined deviation threshold.

Figure 1C:
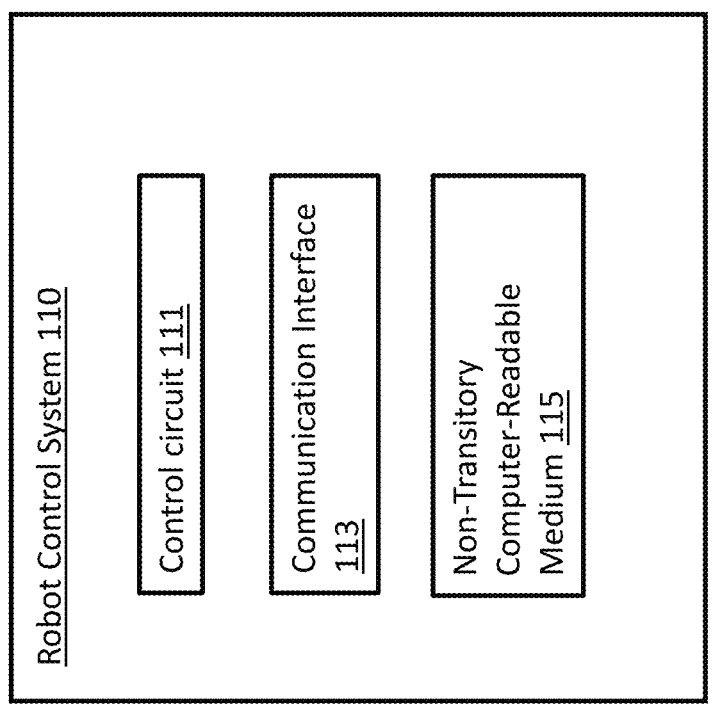
FIG. 1C depicts a block diagram of a robot control system configured to perform verification of calibration, according to an embodiment herein.

FIG. 1C depicts a block diagram of the robot control system 110. As illustrated in the block diagram, the robot control system 110 includes a control circuit 111, a communication interface 113, and a non-transitory computer-readable medium 115 (e.g., memory). In an embodiment, the control circuit 111 may include one or more processors, a programmable logic circuit (PLC) or a programmable logic array (PLA), a field programmable gate array (FPGA), an application specific integrated circuit (ASIC), or any other control circuit.

In an embodiment, the communication interface 113 may include one or more components that are configured to communicate with the camera 170 of FIG. 1A or 1B and the robot 150 of FIG. 1A or 1B. For instance, the communication interface 113 may include a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof. In an embodiment, the control circuit 111 may be configured to generate a movement command (e.g., a motor movement command) and to output the movement command to the communication interface 113. In this embodiment, the communication interface 113 may be configured to communicate the movement command to the robot 150 to control movement of a robot arm or other component of the robot 150. In an embodiment, the control circuit 111 may be configured to generate a camera command and to output the camera command (e.g., capture image command) to the communication interface 113. In this embodiment, the communication interface 113 may be configured to communicate the camera command to the camera 170 to control the camera 170 to photograph or otherwise capture an image of an object in the camera's field of view. In an embodiment, the communication interface 113 may be configured to receive an image or other data from the camera 170, and the control circuit 111 may be configured to receive the image from the communication interface 113.

In an embodiment, the non-transitory computer-readable medium 115 may include computer memory. The computer memory may comprise, e.g., dynamic random access memory (DRAM), solid state integrated memory, and/or a hard disk drive (HDD). In some cases, the camera calibration may be implemented through computer-executable instructions (e.g., computer code) stored on the non-transitory computer-readable medium 115. In such cases, the control circuit 111 may include one or more processors configured to perform the computer-executable instructions to perform verification of camera calibration (e.g., the steps illustrated in FIGS. 4A, 4B, and 9).

Figure 1D:
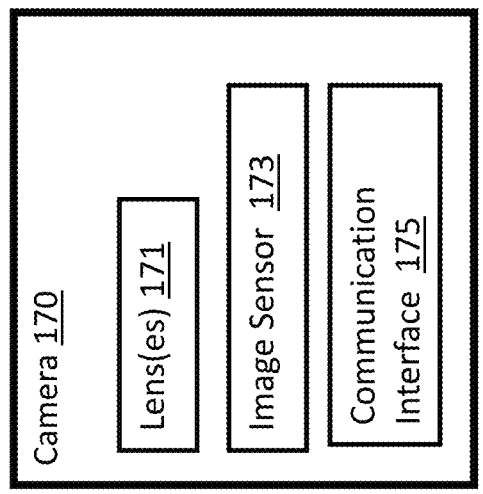
FIG. 1D depicts a block diagram of a camera for which camera calibration is performed, according to an embodiment herein.

FIG. 1D depicts a block diagram of the camera 170 that includes one or more lenses 171, an image sensor 173, and a communication interface 175. The communication interface 175 may be configured to communicate with the robot control system 110 of FIG. 1A, 1B or 1C, and may be similar to the communication interface 113 of FIG. 1C of the robot control system 110. In an embodiment, the one or more lenses 171 may focus light that is coming from outside the camera 170 onto the image sensor 173. In an embodiment, the image sensor 173 may include an array of pixels configured to represent an image via respective pixel intensity values. The image sensor 173 may include a charge-coupled device (CCD) sensor, a complementary metal oxide semiconductor (CMOS) sensor, a quanta image sensor (QIS), or any other image sensor.

As stated above, the camera calibration may be performed in order to facilitate the control of a robot based on images captured by a camera. For instance, FIG. 2 depicts a robot operation system 200 (also referred to as the system 200) in which the images are used to control a robot 250 to perform a robot operation, such as an operation to pick up an object 292 in a warehouse. More specifically, the system 200 may be an embodiment of system 100 of FIG. 1A, and includes a camera 270, the robot 250, and the robot control system 110. The camera 270 may be an embodiment of the camera 170 of FIG. 1A, 1B, or 1D, and the robot 250 may be an embodiment of the robot 150 of FIG. 1A or 1B. The camera 270 may be configured to capture an image of the object 292 (e.g., a package for shipping) disposed on a conveyor belt 293 in the warehouse, and the robot control system 110 may be configured to control the robot 250 to pick up the object 292. When there are one or more objects on the conveyor belt 293, the robot control system 110 may be configured to schedule movement of the robot 250 to pick up the objects. The robot control system 110 may in some cases be configured to detect an idle period for the robot operation by detecting when there are no objects on the conveyor belt 293, or when there are no objects on the conveyor belt 293 that are within reach of the robot 250.

In the embodiment of FIG. 2, the robot 250 may have a base 252 and a robot arm that is movable relative to the base 252. More specifically, the robot arm may comprise a plurality of links 254A through 254E, and a robot hand 255 attached to the link 254E. The plurality of links 254A through 254E may be rotatable relative to each other, and/or may be prismatic links that are movable linearly with respect to each other. Because FIG. 2 involves the robot 250 that is used to pick up objects, the robot hand 255 may include grippers 255A and 255B used to grab the object 292. In an embodiment, the robot control system 110 may be configured to communicate a movement command to rotate one or more of the links 254A through 254E. The movement command may be a low-level command, such as motor movement commands, or a high-level command. If the movement command from the robot control system 110 is a high-level command, the robot 150 may be configured to convert the high-level command to a low-level command.

In an embodiment, the camera calibration information determined from the camera calibration describes a relationship between the camera 270 and the robot 250, or more specifically a relationship between the camera 270 and a world point 294 that is stationary relative to the base 252 of the robot 250. The world point 294 may represent a world or other environment in which the robot 250 is located, and may be any imaginary point that is stationary relative to the base 252. In other words, the camera calibration information may include information describing a relationship between the camera 270 and the world point 294. In an embodiment, this relationship may refer to a location of the camera 270 relative to the world point 294, as well as an orientation of the camera 270 relative to a reference orientation for the robot 250. The above relationship between the camera 270 and the world point 294 may be referred to as a camera-to-world relationship, and may be used to represent a relationship between the camera 270 and the robot 250. In some cases, the camera-to-world relationship may be used to determine a relationship between the camera 270 and the object 292 (also referred to as a camera-to-object relationship), and a relationship between the object 292 and the world point 294 (also referred to as an object-to-world relationship). The camera-to-object relationship and the object-to-world relationship may be used to control the robot 250 to pick up the object 292.

In an embodiment, the camera calibration information may describe an intrinsic parameter of the camera 270, where the intrinsic parameter may be any parameter whose value is independent of a location and an orientation of the camera 270. The intrinsic parameters may characterize a property of the camera 270, such as its focal length, a size of its image sensor, or an effect of lens distortion introduced by the camera 270.

Figure 3:
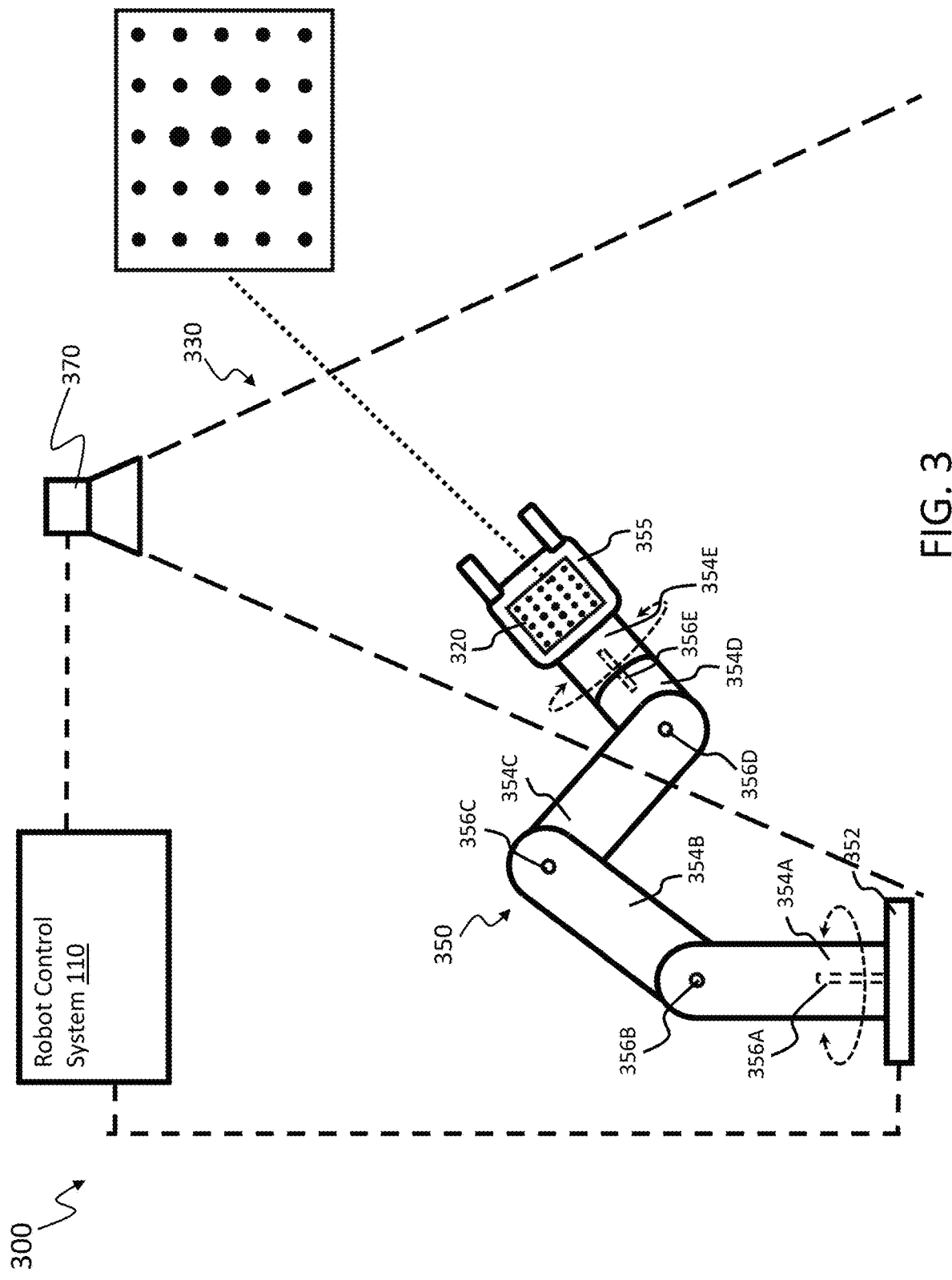
FIG. 3 depicts a system for performing a calibration operation, according to an embodiment herein.

An example showing a detailed structure of an example of a robot 350 is depicted in FIG. 3, which depicts a robot operation system 300 that includes the robot control system 110 in communication with a camera 370 and the robot 350. The camera 370 may be an embodiment of the camera 170/270 of FIG. 1A, 1B, 1D, or 2 respectively, and the robot 350 may be an embodiment of the robot 150/250 of FIG. 1A, 1B, or 2 respectively. The camera 370 may be capable of capturing images within a camera field of view 330. The robot 350 may include a base 352 and a robot arm movable relative to the base 352. The robot arm includes one or more links, such as links 354A through link 354E, and a robot hand 355. In an embodiment, the links 354A-354E may be rotatably attached to each other. For instance, the link 354A may be rotatably attached to the robot base 352 via a joint 356A. The remaining links 354B through 354E may be rotatably attached to each other via joints 356B through 356E. In an embodiment, the base 352 may be used to mount the robot 350 to, e.g., a mounting frame or mounting surface (e.g., floor of a warehouse). In an embodiment, the robot 350 may include a plurality of motors that are configured to move the robot arm by rotating the links 354A-354E. For instance, one of the motors may be configured to rotate the first link 354A with respect to the joint 356A and the base 302, as shown with the dotted arrow in FIG. 3. Similarly, other motors of the plurality of motors may be configured to rotate the links 354B through 354E. The plurality of motors may be controlled by the robot control system 110. FIG. 3 further depicts the robot hand 355 disposed in a fixed manner on the fifth link 354E. The robot hand 355 may have a calibration pattern 320 thereon, such that the robot control system 110 may capture images of the calibration pattern 320 via the camera 370 and perform camera calibration based on the captured images of the calibration pattern 320. For example, the robot control system 110 may move the robot arm such that the calibration pattern 320 may be within the camera field of view 330 and visible to the camera 370 when the camera 370 is being used to capture the images of the calibration pattern 320 (also referred to as calibration images). After the camera calibration is performed, the robot hand 355 may be removed and replaced with another robot hand, such as a robot hand having a verification symbol disposed thereon, as discussed below in more detail.

Figure 4A:
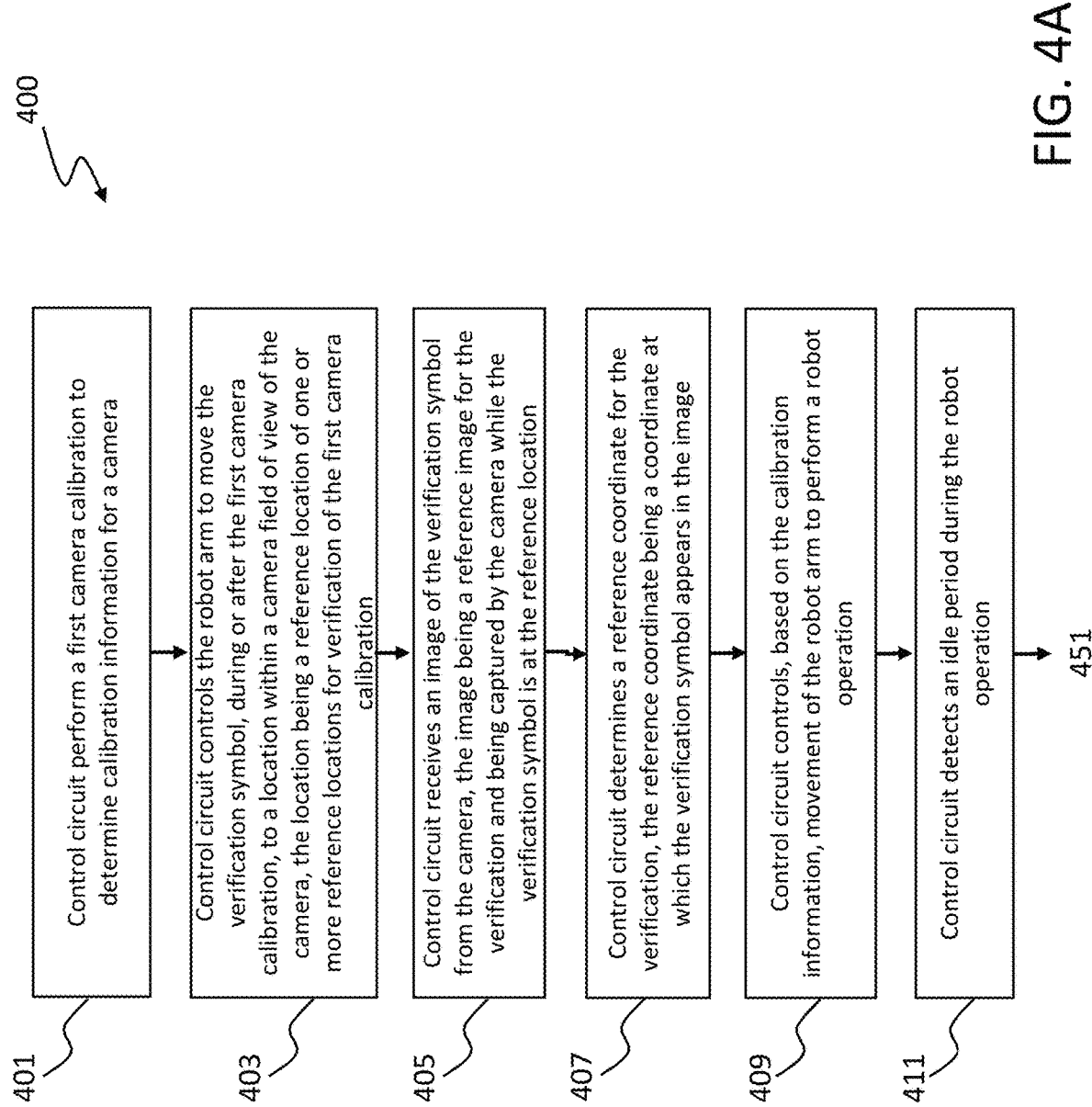
FIGS. 4A and 4B provide a flow diagram that illustrates a method for performing verification of calibration information, according to an embodiment herein.
Figure 4B:
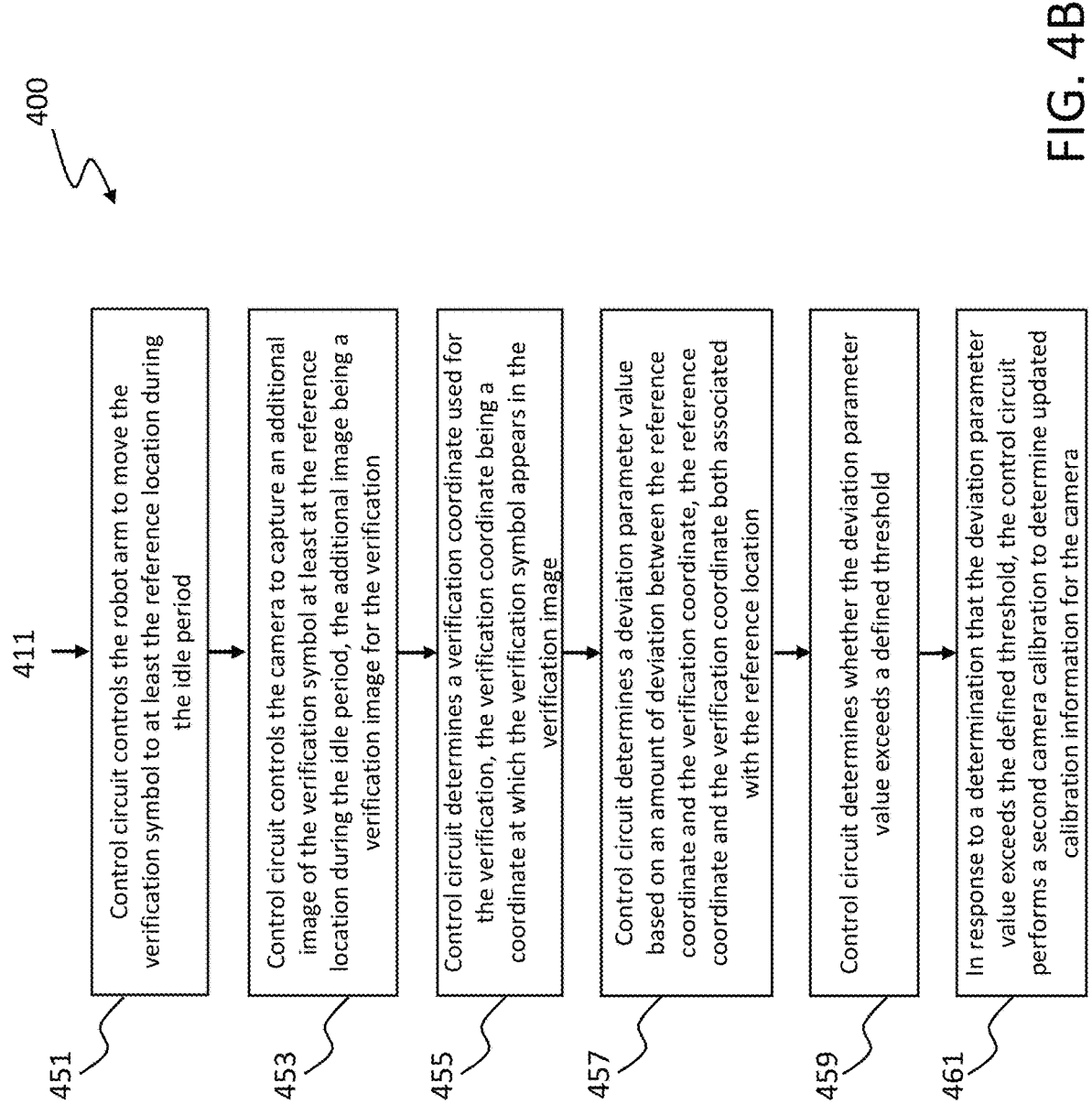

As stated above, according to an embodiment, the calibration verification may involve comparing a reference image coordinate at which a verification symbol appears in a reference image to a verification image coordinate at which the verification symbol appears in a verification image. The comparison may determine a deviation between the verification image coordinate and the reference image coordinate, and the deviation may be used to determine whether to perform an additional calibration operation. The verification image may be captured during an idle period of a robot operation. FIGS. 4A and 4B depict flow diagrams that illustrate a method 400 for verification of camera calibration, according to an embodiment. While some of the embodiments below discuss verifying camera calibration information determined from camera calibration, method 400 may be used to more generally verify calibration information determined from any calibration operation performed for a robot operation system. In an embodiment, the method 400 may be performed by the control circuit 111 of the robot control system 110. As stated above, the robot control system 110 may include the communication interface 113 of FIG. 1C, which is configured to communicate with the robot 150 of FIG. 1A or 1B, and with the camera 170 of FIG. 1A, 1B, or 1D. In an embodiment, the robot may have a base (e.g. the base 252 of FIG. 2 or the base 352 of FIG. 3) and a robot arm (e.g. the robot arm of FIG. 2 or FIG. 3) with a verification symbol disposed on thereon, and wherein the robot arm is movable relative to the base.

Figure 5A:
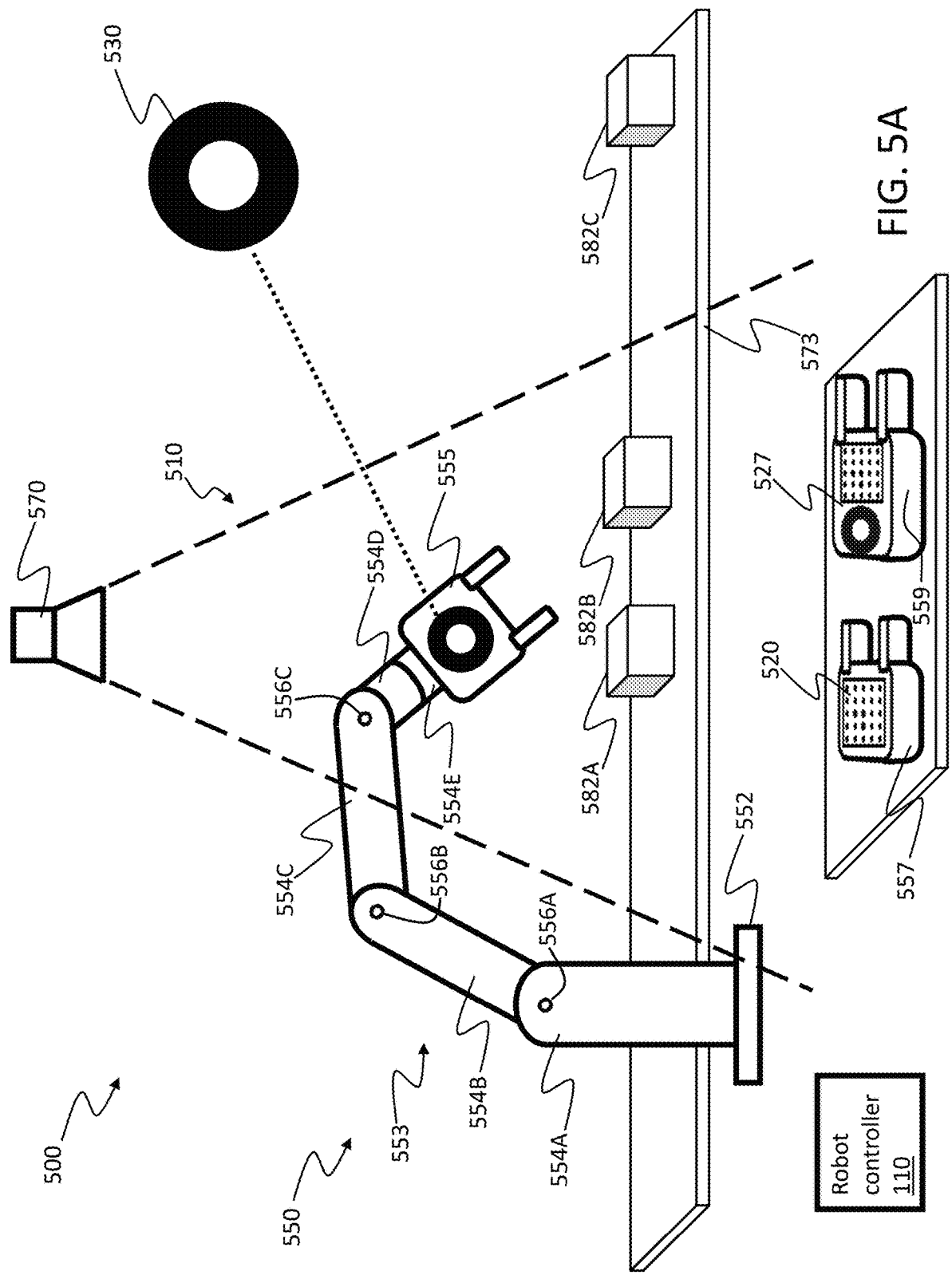
FIGS. 5A and 5B illustrate a system in which a verification symbol is disposed on a robot, wherein the verification symbol is used to perform verification of calibration information, according to an embodiment herein.
Figure 5B:
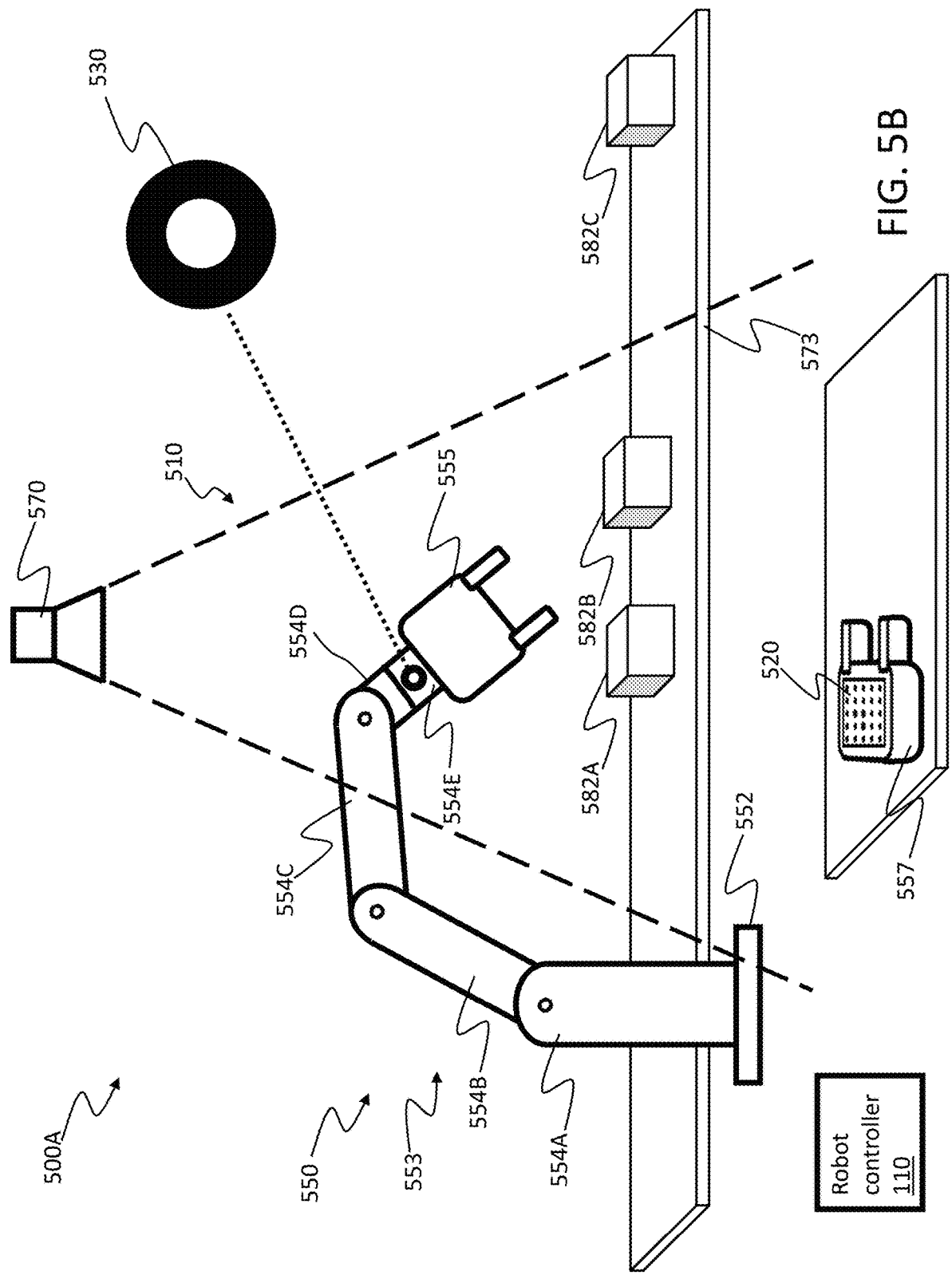

An example environment in which the method 400 is performed is depicted in FIGS. 5A and 5B, which depicts a robot operation system 500/500A that each includes the robot control system 110 in communication with a camera 570 and a robot 550. The camera 570 may be an embodiment of the camera 170/270/370 of FIG. 1, 2, or 3 respectively, and the robot 550 may be an embodiment of the robot 150/250/350 of FIG. 1A, 1B, 2, or 3, respectively. The robot 550 may include a base 552 and a robot arm (which is labeled 553 in FIGS. 5A and 5B) movable relative to the base 552. The robot arm includes one or more links, such as links 554A through link 554E. The links 554A-554E may also be examples of arm portions of the robot arm 553 that are movably attached to each other. In an embodiment, the links 554A-554E may be rotatably attached to each other.

For instance, the link 554A may be rotatably attached to the robot base 552. The remaining links 554B through 554E may be rotatably attached to each other via a plurality of joints. In an embodiment, the base 552 may be used to mount the robot 552 to, e.g., a mounting frame or mounting surface (e.g., floor of a warehouse). The robot 550 may operate in a similar manner to the robot 350 of FIG. 3. For instance, the robot 550 may include multiple motors configured to move the robot arm by rotating the links 554A-554E relative to each other. The robot arm may further include a robot hand that is attached to the link 554E. For example, FIG. 5A depicts a first robot hand 555, a second robot hand 557, and a third robot hand 559, each of which may be attachable to and detachable from the fifth link 554E. The robot hand 555/557/559 may include, e.g., a gripper or suction device that is configured to pick up objects (e.g., 582A, 582B, 582C) from a conveyor belt 573. When the robot hand 555/557/559 is attached to the fifth link 554E, the attachment may be in a mixed manner. The attachment and detachment may be performed manually or automatically. In one example, the fifth link 554E may be attached to the first robot hand 555, as depicted in FIGS. 5A and 5B, and the robot control system 110 may control the robot 550 to cause the fifth link 554E to release the first robot hand 555 and attach the fifth link 554E to the second robot hand 557. In another embodiment, the fifth link 554E may be permanently attached to a robot hand (e.g., robot hand 559).

In an embodiment, the robot 550 may have a verification symbol 530 disposed thereon. In some cases, the verification symbol 530 may be permanently disposed on the robot 550. In some cases, the verification symbol 530 may be disposed on a robot arm of the robot 550, such as one of the links 554A-554E, or on a robot hand. For instance, FIG. 5A depicts the verification symbol 530 being disposed on the first robot hand 555 and the third robot hand 559, while FIG. 5B depicts the verification symbol 530 being disposed on the link 554E. The verification symbol 530 may be directly painted on the robot 550, or may be attached to the robot 550, such as via a sticker or a flat board. In the example depicted in FIG. 5A, the second robot hand 557 or the third robot hand 559 may be used to perform camera calibration, because they each have a respective calibration pattern 520/527 disposed thereon, while the first robot hand 555 or the third robot hand 559 may be used to perform verification of the camera calibration, because they each have a respective verification symbol 530 disposed thereon.

Returning to FIG. 4A, in an embodiment the method 400 may begin with step 401, in which the control circuit 111 performs a first camera calibration to determine camera calibration information associated with the camera (e.g., camera 170/270/370/570 of FIG. 1, 2, 3, or 5 respectively). More specifically, the camera calibration information may include camera calibration values for the camera. In this embodiment, the control circuit 111 may perform the first camera calibration based on images of a calibration pattern (also referred to as calibration images).

For instance, to perform the first camera calibration, the robot 550 of FIG. 5A may be attached to the second robot hand 557 having the calibration pattern 520 or the third robot hand 559 having the calibration pattern 527. FIG. 3 depicts a similar environment in which the first camera calibration can be performed. During this step, the first robot hand 555 may be detached from the fifth link 554E, in which the calibration pattern 320 is used to perform camera calibration. The first camera calibration may be performed before starting a robot operation. For instance, the robot operation may begin with a robot task such as the first robot hand 555 interacting with a first object 582A on a conveyor belt. During the first camera calibration, the robot 550 may be equipped with the second robot hand 557. The robot control system 110 may control the robot arm of the robot 550, via movement commands, to move the calibration pattern 520 to various locations within a camera field of view 510 of the camera 570 and to capture respective images of the calibration pattern 520 at such locations. The robot control system 110 may perform the first camera calibration to determine the camera calibration information for the camera 570 based on the captured images of the calibration pattern 520. In an example, the camera calibration information may include information describing a relationship between the camera 570 and the robot 550. In an example, the camera calibration information may describe the intrinsic parameters of the camera 570. Camera calibration is discussed in more detail in U.S. application Ser. No. 16/295,940, filed on Mar. 7, 2019 and titled "METHOD AND DEVICE FOR PERFORMING AUTOMATIC CAMERA CALIBRATION FOR ROBOT CONTROL," the entire content of which is incorporated herein by reference Returning to FIG. 4A, the method 400 may further include step 403, in which the control circuit 111 controls the robot arm to move the verification symbol (e.g., 530 of FIG. 5), during or after the first camera calibration, to a location within a camera field of view (e.g., 510) of the camera (e.g., 570) by outputting a first movement command to the communication interface 113 of the robot control system 110. The communication interface 113 may be configured to communicate the movement command to the robot to cause the robot arm to move the verification symbol (e.g., 530), during or after the first camera calibration, to the location within the camera field of view (e.g., 510). The movement command may also cause the robot arm to orient the verification symbol to face the camera (e.g., 570), or more generally to be visible to the camera. The location may be used as a reference location of one or more reference locations for verification of the first camera calibration. For instance, when the verification process acquires images of the verification symbol over time, the control circuit 111 may control the robot arm to consistently position the verification symbol (e.g., 530) at the same one or more locations, such that the one or more locations may be used as one or more reference locations. Further, as described below with respect to steps 405-459, the verification process may compare later images of the verification symbol against a set of earlier images of the verification symbol (e.g., 530), such as images obtained immediately after the first camera calibration is performed. The later images may be used as verification images, while the images against which the later images are compared may be used as reference images.

In step 405, the control circuit 111 may receive (e.g., retrieve) an image of the verification symbol (e.g., 530) from the camera (e.g., 170/270/370/570) via the communication interface 113, wherein the image is a reference image for the verification. The image may have been captured by the camera while the verification symbol is or was at the reference location. In an embodiment, the communication interface 113 may initially receive the reference image from the camera, and the control circuit 111 may then receive the reference image from the communication interface 113. In an embodiment, step 405 is performed without the control circuit 111 generating a camera command for the camera. In an embodiment, step 405 may involve the control circuit 111 generating a camera command and communicating the camera command to the camera via the communication interface 113. The camera command may control the camera to capture an image of the verification symbol at the reference location.

FIGS. 5A through 6B illustrate aspects of steps 403 and 405. In the embodiment of FIG. 5A, after the first camera calibration is performed with, e.g., the second robot hand 557, the second robot hand 557 may be replaced with the third robot hand 559, which has the verification symbol 530 disposed thereon. In this instance, the robot control system 110 controls the robot arm of the robot 550 (e.g., via one or more movement commands) to move the verification symbol 530 to one or more reference locations within the camera field of view 510 of the camera 570. The one or more reference locations may include any location within the camera field of view 510, or may be a set of one or more specific locations, such as locations disposed on a surface of an imaginary sphere, as discussed below in more detail. In another instance, in the embodiment of FIG. 5B, during or after the first camera calibration, the robot control system 110 may control the robot arm to move the verification symbol 530 to one or more reference locations within the camera field of view 510. In this instance, the one or more reference locations may include any location at which verification symbol 530 was photographed (along with the calibration pattern 520) during the first camera calibration, or may be a set of one or more specific locations to which the verification symbol 530 is moved after the first camera calibration is performed. The robot control system 110 may control the movement of the robot arm of the robot 550 in this step with guidance of the camera 570 based on the camera calibration information obtained from the first camera calibration, or may do so without such guidance. In an embodiment, the reference locations may be defined locations that are stored in a local or remote storage device and may be retrieved. They may be stored in the form of coordinates (e.g., Cartesian coordinates) or as motor commands for rotating the links 554A-554E, or in some other manner.

Figure 6A:
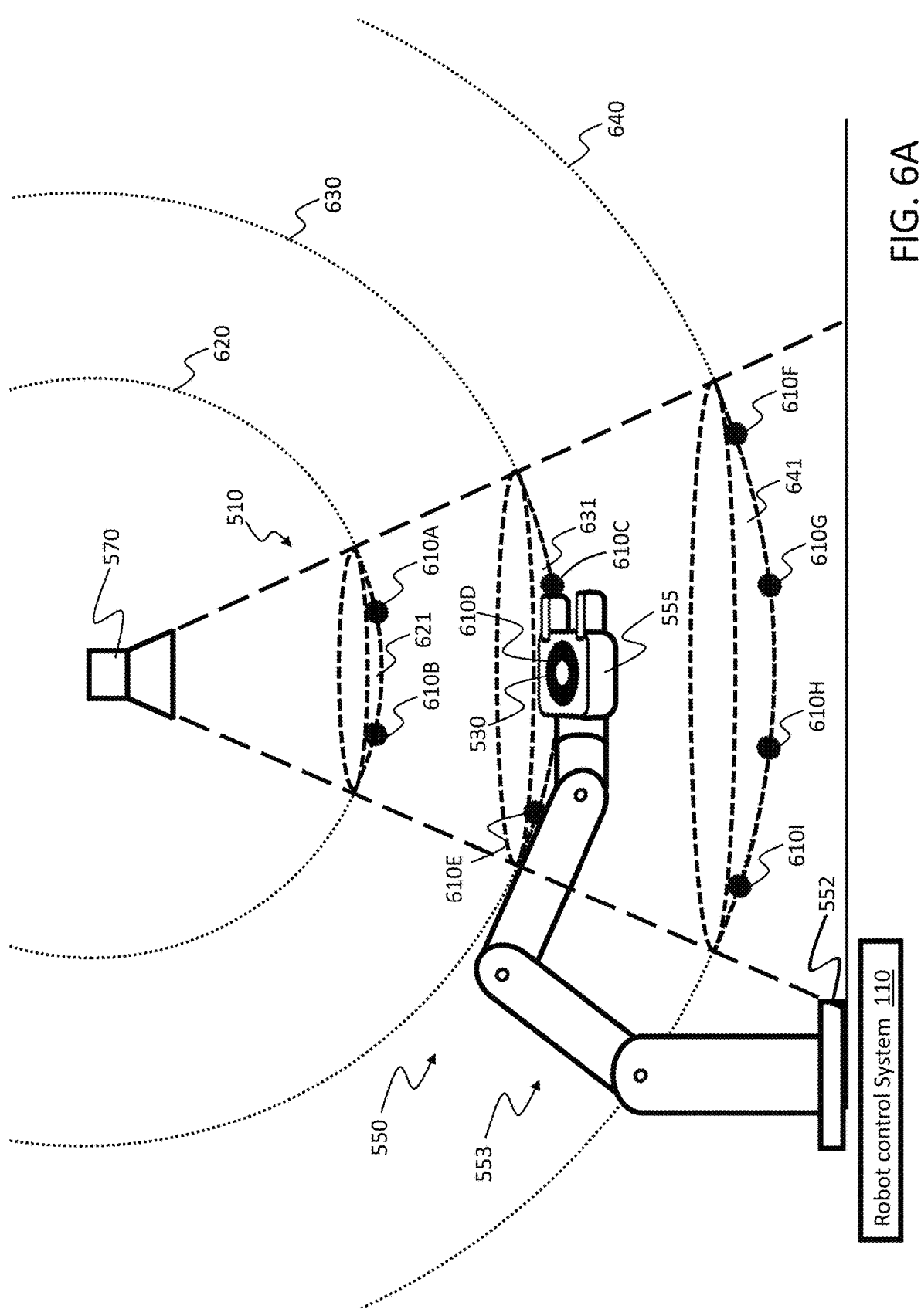
Figure 6B:
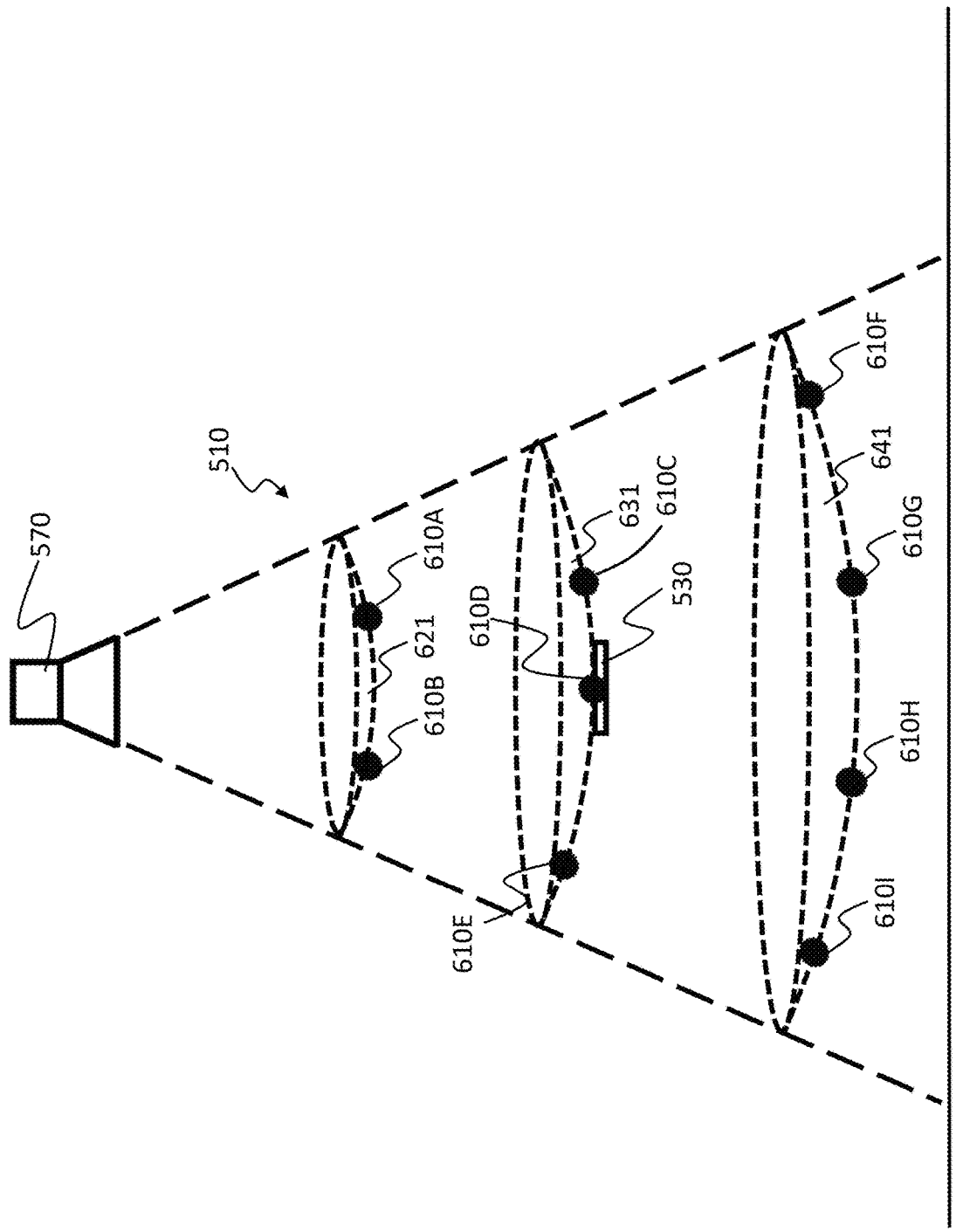

In an embodiment, the one or more reference locations to which the robot arm moves the verification symbol (e.g., 530) may include a plurality of reference locations, wherein each of the plurality of reference locations is a location disposed on a surface of an imaginary sphere that is concave with respect to the camera. In such an embodiment, the control circuit 111 may be further configured to control the robot arm to move the verification symbol to be tangent to the surface of the imaginary sphere at each reference location of the plurality of reference locations. For instance, as illustrated in FIGS. 6A, 6B, 6C, and 6D, the robot control system 110 may control the robot arm of the robot 550 to move the verification symbol 530 to reference locations 610A-610I, and control the camera 570 to capture a respective reference image at each of the reference locations 610A-610I. The reference locations 610A-610I in FIGS. 6A and 6B may be divided among a plurality of imaginary spheres within the camera field of view 510. The reference locations 610A and 610B may be disposed on a first spherical surface 621 of a first imaginary sphere 620, where the first spherical surface 621 is within the camera field of view 510. The reference locations 610C, 610D, and 610E may be disposed on a second spherical surface 631 of a second imaginary sphere 630, where the second spherical surface 631 is within the camera field of view 510. The reference locations 610F, 610G, 610H, and 610I may be disposed on a third spherical surface 641 of a third imaginary sphere 640, where the third spherical surface 641 is within the camera field of view 510. As illustrated in FIGS. 6A and 6B, the first, second, and third spherical surfaces 621, 631, and 641, respectively, are concave with respect to the camera 570. Although the examples in FIGS. 6A and 6B show three spherical surfaces based on three spheres, a number of different spherical surfaces on which reference locations may be disposed may be greater than three or less than three. In an embodiment, the camera 570 may be a center of each of the imaginary spheres 620, 630, 640.

In an embodiment, as illustrated in FIGS. 6A-6D, when the verification symbol 530 is moved to a reference location, the robot control system 110 may control the robot arm 553 of the robot 550 (e.g., via a movement command) to position the verification symbol 530 to be tangent to the spherical surface on which the reference location is disposed. For example, FIGS. 6A and 6B illustrate the verification symbol 530 being tangent to the second spherical surface 631 at the reference location 610D, while FIGS. 6C and 6D illustrate the verification symbol 530 being tangent to the second spherical surface 631 at the reference location 610C. More particularly, the verification symbol 530 may be disposed on a flat plane (e.g., on a sticker), and the flat plane of the verification symbol 530 may be tangent to the second spherical surface 631 at the reference location 610D in FIGS. 6A and 6B, and tangent to the second spherical surface 631 at the reference location 610C in FIGS. 6C and 6D. In an embodiment, the robot arm 553 may be in a first pose in FIGS. 6A and 6B, and may be in a second pose in FIGS. 6C and 6D. A pose of the robot arm 553 may refer to, e.g., a shape, or more generally a geometry, formed by links or other arm portions of the robot arm 553. For instance, the pose of a robot arm 553 may refer to a particular permutation of angles or distances by which links of the robot arm 553 have rotated or translated (e.g., extended or retracted) relative to preceding links of the robot arm 553. As an example, the first pose depicted in FIG. 6A may correspond with a first permutation of angles formed between consecutive links of the series of links of the robot arm 553, while the second pose depicted in FIG. 6C may correspond with a second permutation of angles between consecutive links of the series of links of the robot arm 553. In such an example, the reference location 610D for the verification symbol 630 may be associated with the first pose for the robot arm 553, illustrated in FIG. 6A, while the reference location 610C for the verification symbol 630 may be associated with the second pose for the robot arm 553, as illustrated in FIG. 6C.

In an embodiment, the control circuit 111 is configured to control the robot arm to move the verification symbol (e.g., 530) to directly face the camera when the verification symbol is moved to a reference location. For instance, as illustrated in FIG. 6A, the robot control system 110 may control the robot arm 553 of the robot 550 to move the verification symbol 530 to directly face the camera 570 when the verification symbol 530 is moved to the reference location 610D. In this example, the robot control system 110 may control the robot hand 555 to be rotated such that the verification symbol 530 directly faces the camera 570. In some cases, the verification symbol may directly face the camera 570 by being tangent to a spherical surface at the camera field of view 510. When the verification symbol 530 directly faces the camera 570, the camera 570 may be able to photograph the verification symbol 530 head-on, so that there is no perspective effect or a reduced perspective effect in a resulting image of the verification symbol 530.

Figure 5C:
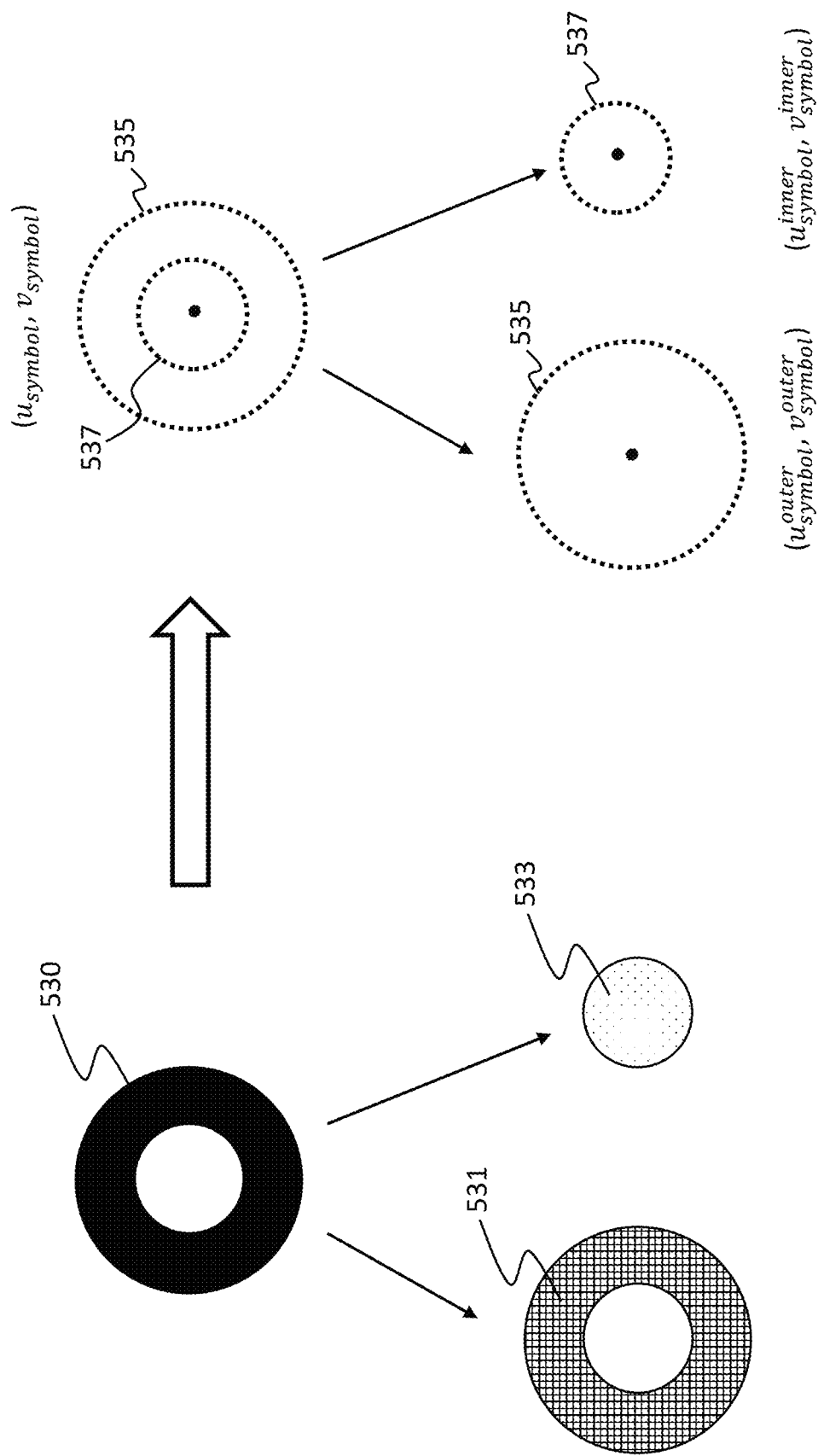
FIG. 5C depicts an example verification symbol, according to an embodiment herein.

In an embodiment, the verification symbol (e.g., 530) includes a first region having a first color and a second region having a second color, wherein a ratio of an area of the first region to an area of the second region is defined and stored on a non-transitory computer-readable medium (e.g., storage device) of the robot control system 110. In such an embodiment, the control circuit 111 may be configured to identify the verification symbol in a reference image or a verification image based on the defined ratio. For instance, as illustrated in FIG. 5C, the verification symbol 530 may include a first region 531 that is ring-shaped and has a first color (e.g., black region), and includes a second region 533 (e.g., white region) enclosed by the first region 531 and having a second color. The ratio of an area of the first region 531 in black to an area of the second region 533 in white in the verification symbol 530 may be a distinct, defined value. By analyzing the colors within a captured image, the robot control system 110 may be capable of identifying a portion of the image that corresponds to the verification symbol 530 by determining whether that portion has a ring-shaped region that encloses a circular region, and whether a ratio between an area of the ring-shaped region and an area of the circular region matches the defined ratio. This may allow the robot control system 110 to distinguish the verification symbol 530 from other features captured in an image. For example, as illustrated in FIG. 5A, the robot 550 may be set to utilize the third robot hand 559 that has a combination of a calibration pattern 527 and a verification symbol 530. In this example, a reference image may show both the verification symbol 530 and the calibration pattern 527. In this example, the calibration pattern 527 may not have any ring pattern, or may have ring patterns with a different ratio than the defined ratio discussed above. The control circuit 111 may determine whether a portion of the reference image is the verification symbol 530 or the calibration pattern 527 by determining whether the portion of the reference image has a first image region having the first color and has a second image region having the second color, and whether a ratio between an area of the first image region and an area of the second image region is equal to the defined ratio.

In some cases, the robot control system 110 may determine whether a particular portion of a captured image has a first region with a first color and a second region with a second color, and whether a ratio between an area of the first region and an area of the second region is within a defined range. In one example, if the defined ratio is 1.5, then the robot control system 110 may determine that the particular region corresponds to the verification symbol 530 if the ratio in the particular region falls within a range between 1.4 and 1.6. The two colors of the first and second regions are not limited to black and white colors and may be any two different colors that can be distinguishable by the robot control system 110.

In an aspect, the verification symbol (e.g., 530) may include a first shape and a second shape that are concentric with each other, wherein respective centers of the first shape and the second shape are at substantially the same location. For instance, the verification symbol may be shaped as a circular ring, which includes a first circle and a second circle that are concentric with each other. More specifically, as illustrated in FIG. 5C, the verification symbol 530 may include a first shape 535 (e.g., outer circle) and a second shape 537 (e.g., inner circle). The first shape 535 and the second shape 537 may be concentric to each other, such that a center of the first shape 535 and a center of the second shape 537 are at substantially at the same location. For example, if a center of the first shape 535 is at a coordinate $(u_{symbol}^{outer}, v_{symbol}^{outer})$ and a center of the second shape 537 is at a coordinate $(u_{symbol}^{inner}, v_{symbol}^{inner})$, the coordinate $(u_{symbol}^{outer}, v_{symbol}^{outer})$ and the coordinate $(u_{symbol}^{inner}, v_{symbol}^{inner})$ may be substantially the same.

Returning to FIG. 4A, the method 400 may further include step 407, in which the control circuit 111 determines a reference image coordinate for the verification symbol, the reference image coordinate being a coordinate at which the verification symbol (e.g., 530) appears in the reference image. For instance, as illustrated in FIG. 6A, an image of the verification symbol 530 may be captured at the reference location 610D, and may be used as the reference image. The verification symbol 530 may appear within the reference image at a particular coordinate, which may be referred to as a reference image coordinate.

In an embodiment, as discussed above, the verification symbol (e.g., 530) may include a first shape and a second shape that are concentric with each other, wherein respective centers of the first shape and the second shape are at substantially the same location. In such an embodiment, the control circuit 111 in step 407 may be configured to determine the reference image coordinate for such a verification symbol by: determining a first coordinate of a center of the first shape in the reference image, determining a second coordinate of a center of the second shape in the reference image, and determining the reference image coordinate as an average of the first coordinate and the second coordinate in the reference image.

Figure 7B:
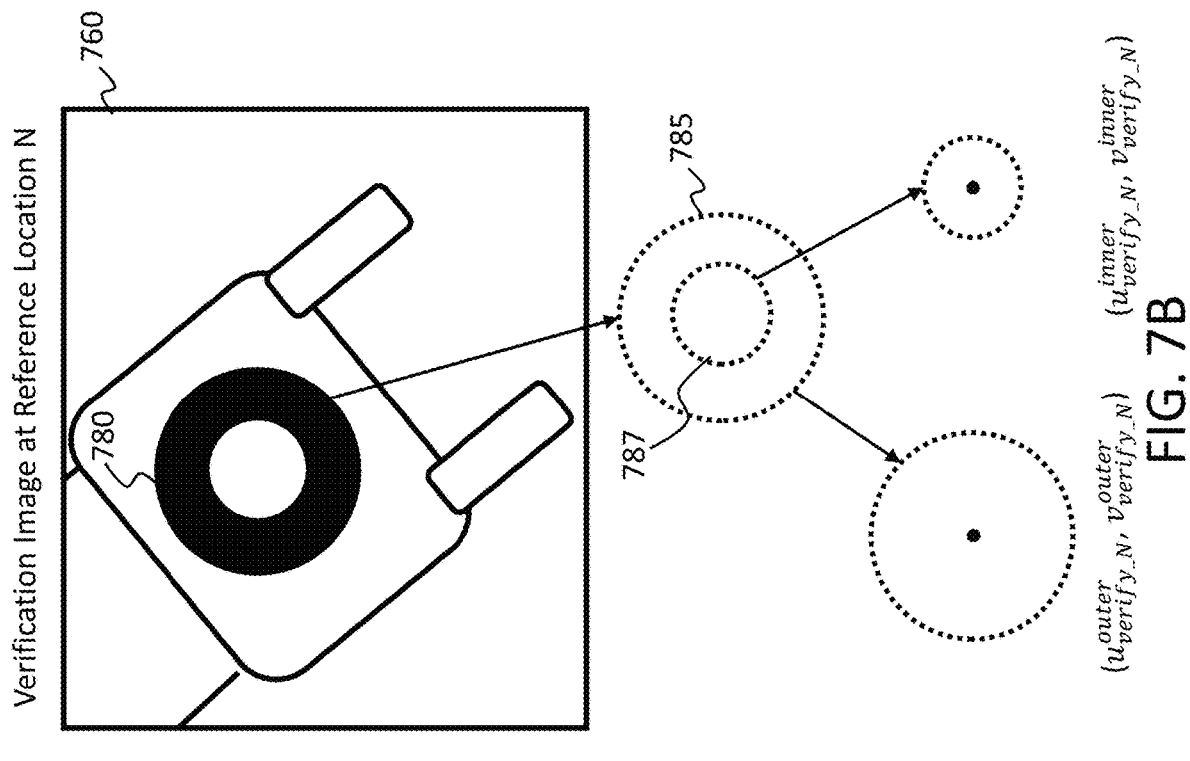
FIG. 7B depicts an example of determining a verification image coordinate, according to an embodiment herein.
Figure 7A:
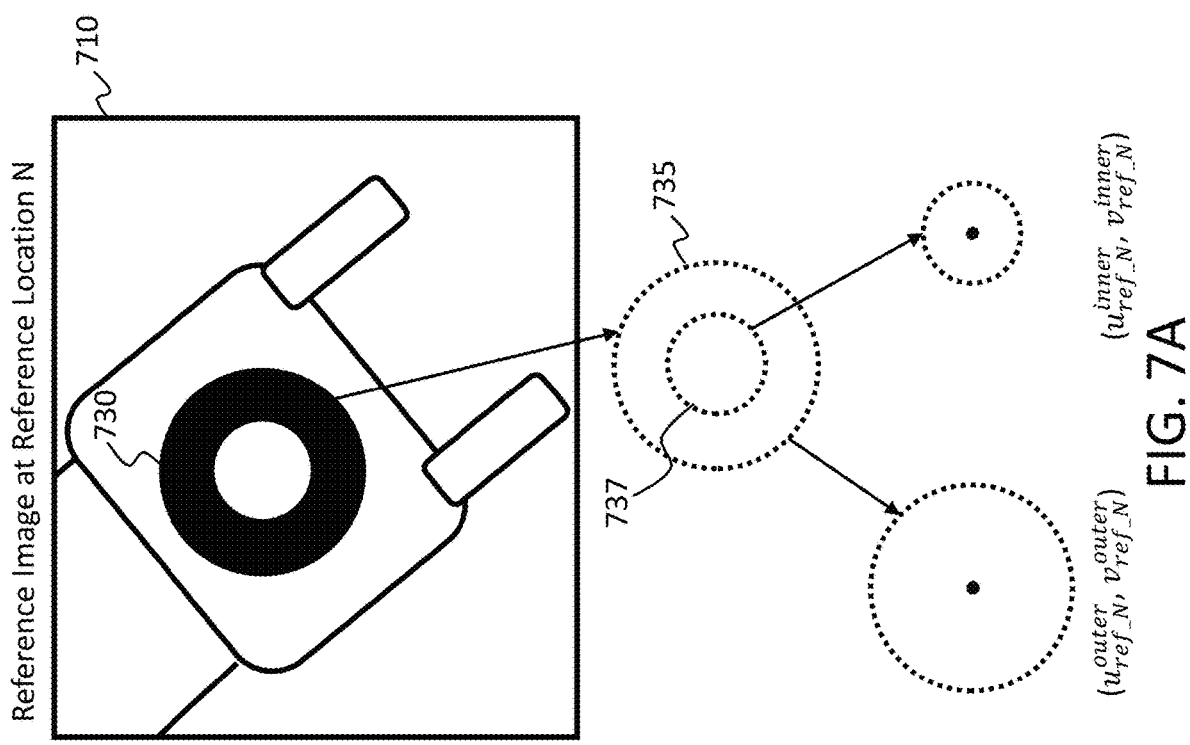
FIG. 7A depicts an example of determining a reference image coordinate, according to an embodiment herein.

For instance, FIG. 7A shows a reference image 710 captured at a reference location N (where N is an integer) of the reference locations. The reference image 710 includes a verification portion 730, which is an image portion in the reference image 710 showing the verification symbol 530 of FIG. 5A, 5B, or 5C. The robot control system 110 of FIG. 1A or 1B may be configured to identify, from the verification portion 730, a first shape 735 (e.g., outer circle) that is the same as or substantially the same as the first shape 535 of the verification symbol 530 of FIG. 5C. The robot control system 110 may be configured to further identify, from the verification portion 730, a second shape 737 (e.g., inner circle) that is the same or substantially the same as the second shape 537 of the verification symbol 530 in FIG. 5C. Subsequently, for the reference location N, the robot control system 110 may determine a first coordinate $(u_{ref\_N}^{outer}, v_{ref\_N}^{outer})$ of a center of the first shape 735 (i.e., a center coordinate of the first shape 735) shown in the reference image 710 and a second coordinate $(u_{ref\_N}^{inner}, v_{ref\_N}^{inner})$ of a center of the second shape 737 (i.e., a center coordinate of the second shape 737) shown in the reference image 710. To determine the reference image coordinate $(u_{ref\_N}, v_{ref\_N})$ for the reference image 710 as a whole, wherein the reference image 710 corresponds with the verification symbol 530 being at reference location N, the robot control system 110 may calculate an average of the first coordinate $(u_{ref\_N}^{outer}, v_{ref\_N}^{outer})$ and the second coordinate $(u_{ref\_N}^{inner}, v_{ref\_N}^{inner})$ in the reference image 710, as follows:

$$(u_{ref\_N}, v_{ref\_N}) = \left( \frac{u_{ref\_N}^{outer} + u_{ref\_N}^{inner}}{2}, \frac{v_{ref\_N}^{outer} + v_{ref\_N}^{inner}}{2} \right)$$

In an embodiment, the reference image coordinate for the verification symbol may be its center coordinate, and determining the center coordinate of the verification symbol 530 based on the respective center coordinates of the first shape 735 and the second shape 735 may improve a robustness of the verification process against image noise. For instance, image noise may introduce error in the determination of a center coordinate for the first shape 735, but not to the determination of the center coordinate for the second shape 737. In some cases, the second shape 737 may have may in reality share the same center location as the first shape 735, but image noise may cause the center coordinate of the second shape 737 to appear in an image to be different than the center coordinate of the first shape 735. In this scenario, simply using the center coordinate of the second shape 737 as the center coordinate of the verification symbol 530 may lead to an undesirable amount of error. The amount of error may be reduced by using an average of the center coordinate for the first shape 735 and the center coordinate for the second shape 737 as the center coordinate of the verification symbol 530.

In an embodiment, the one or more reference locations discussed above may be a plurality of reference locations that respectively correspond with a plurality of reference image coordinates. In this embodiment, the reference image coordinate may be one of the plurality of reference image coordinates. For instance, as illustrated in FIGS. 6A and 6B, there may be multiple reference locations such as the reference locations 610A-610I to which the verification symbol 530 is moved or otherwise placed. For each of the reference locations 610A-610I of the verification symbol 530, the robot control system 110 may retrieve or otherwise receive a respective reference image captured by the camera 570 of the verification symbol 530 at that location, and may determine a respective reference image coordinate that indicates where the verification symbol 530 appears in the respective reference image.

Returning to FIG. 4A, the method 400 may further include step 409, in which the control circuit 111 controls, based on the camera calibration information, movement of the robot arm to perform a robot operation. In an embodiment, this step may involve the control circuit 111 generating a second movement command that is based on the camera calibration information, and outputting the second movement command to the communication interface 113. The communication interface 113 may in turn communicate the second movement command to the robot to control movement of the robot arm. For instance, as illustrated in FIG. 5A, after the first camera calibration, the robot control system 110 controls the robot 550 to perform a robot operation involving robot tasks, such as picking up objects 582A, 582B, and 582C. The movement of the robot 550 may be based on the camera calibration information obtained from the first camera calibration and based on images of the objects 582A, 582B, 582C captured by the camera 570.

In step 411, the control circuit 111 detects an idle period during the robot operation. In an aspect, the idle period of robot may be a time period during which the robot is free from performing a robot task during the robot operation. In some cases, if the robot operation is based on picking up objects from the conveyor belt 573, the idle period may be based on an absence of objects on the conveyor belt 573. More specifically, the conveyor belt 573 may be reachable by the robot arm 553, and the control circuit 111 is configured to detect the idle period by detecting that there are no objects on the conveyor belt 573, or that a distance between the robot 550 and a closest object on the conveyor belt 573 exceeds a defined distance threshold. In some cases, the control circuit 111 may receive a signal indicating that an idle period is about to occur, where the signal may be received from another device or component monitoring the robot operation. For instance, as illustrated in FIG. 5A, the robot control system 110 may detect an idle period between a robot task involving picking up the second object 582B and a robot task involving picking up the third object 582C during the robot operation because a large distance exists between the second object 582B and the third object 582C. During this idle period, after the robot 550 picks up the second object 582B, it may have an idle period during which it is free from performing a robot task, because the object 582C is not yet reachable by the robot 550. In one example, the robot control system 110 may detect the idle period when no object on the conveyer belt 573 is reachable by the robot 550 and/or when the robot control system 110 determines that a distance between the robot 550 and the closest object (e.g., third object 582C) upstream on the conveyer belt 573 exceeds a certain threshold.

Returning to FIGS. 4A and 4B, the method 400 may further include a step 451, in which the control circuit 111 controls the robot arm 553 to move the verification symbol 530, during the idle period, to at least the reference location that was used in step 403 (which was used to capture the reference image). In an embodiment, step 451 may involve the control circuit 111 generating a third movement command, and outputting the third movement command to the communication interface 113. The communication interface 113 may be configured to then communicate the third movement to the robot to cause the robot arm 553 to move based on the movement command. In some cases, the third movement command may involve a set of stored motor commands that correspond to the reference location. In some cases, the third movement command may be generated based on the camera calibration information from step 401. In other cases, the third movement command in step 451 does not rely on the camera calibration information from step 401.

In step 453, the control circuit 111 retrieves or otherwise receives an additional image of the verification symbol (e.g., 530) from the camera (e.g., 570) during the idle period, wherein the additional image is a verification image for the verification, and is an image of the verification symbol at least at the reference location during the idle period. That is, the verification image for the reference location is captured while the verification symbol (e.g., 530) is or was at the reference location. In an embodiment, step 453 involves the control circuit 111 generating a camera command that controls the camera (e.g., 570) to capture the verification image. The control circuit 111 may output the camera command to the communication interface 113, which may communicate the camera command to the camera (e.g., 570). In an embodiment, step 451 may involve controlling the robot arm to move the verification symbol to multiple reference locations, and receiving multiple respective verification images captured by the camera. For instance, as illustrated in FIGS. 6A and 6B, during an idle period, the robot control system 110 may control the robot arm 553 of the robot 550 to move the verification symbol 530 to one of the reference locations 610A-610I and capture an image of the verification symbol 530 at the location as a verification image. If the idle period is not yet over, or more specifically if a sufficient amount of time remains in the idle period, the robot control system 110 may control the robot arm 553 of the robot 550 to move the verification symbol 530 to another one of the reference locations 610A-610I and capture an image of the verification symbol 530 at that other location as another verification image. If the idle period ends, the robot control system 110 may stop capturing verification images. As such, during each idle period, the robot control system 110 may control the robot arm 553 of the robot 550 to move the verification symbol 530 to one or more of the reference locations 610A-610I and capture a verification image at each of the one or more of the reference locations 610A-610I.

Returning to FIG. 4B, the method 400 may further include step 455, in which the control circuit 111 determines a verification image coordinate used for the verification, the verification image coordinate being a coordinate at which the verification symbol appears in the verification image. If the verification symbol (e.g., 530) is moved to a plurality of reference locations (e.g., 610A-610I), the camera (e.g., 570) may capture a plurality of verification images that respectively correspond with the plurality of reference locations, and the control circuit 111 may determine a plurality of verification image coordinates that respectively correspond with the plurality of verification images and respectively correspond with the plurality of reference locations. The plurality of verification images may be all captured by the camera (e.g., 570) in a single idle period (e.g., if the single idle period is sufficiently long to allow the robot arm to move the verification symbol (e.g., 530) to all of the reference locations 610A-610I), or in several different idle periods (e.g., if each of the idle periods is not long enough for the robot arm to move the verification symbol 530 to all of the reference locations 610A-610I).

In an embodiment, the verification image coordinate may be determined in a manner similar to that for the reference image coordinate. For instance, the verification image coordinate may be a center coordinate of the verification symbol (e.g., 530), and may be determined as an average of a center coordinate of a first shape of the verification symbol (e.g., 530) and a center coordinate of a second shape of the verification symbol in the verification image (e.g., 760). For instance, FIG. 7B shows a verification image 760 captured at the reference location N of the reference locations. The verification image 760 shows a verification portion 780, which is an image portion in the verification image 760 showing the verification symbol 530. The robot control system 110 may identify, from the verification portion 780, a first shape 785 that is the same as or substantially the same as the first shape 585 of the verification symbol 530 of FIG. 5C. The robot control system 110 may further identify, from the verification portion 780, a second shape 787 that is the same or substantially the same as the second shape 587 of the verification symbol 530. Further, the robot control system 110 may be configured to determine a center coordinate $(u_{verify\_N}^{outer}, v_{verify\_N}^{outer})$ of the first shape 785 shown in the verification portion 780 of the verification image 760, and determine a center coordinate $(u_{verify\_N}^{inner}, v_{verify\_N}^{inner})$ of the second shape 787 shown in the verification portion 780 of the verification image 760. The robot control system 110 may further determine the verification image coordinate $(u_{verify\_N}, v_{verify\_N})$ for the verification image 760 as an average of the center coordinate of the first shape 785 and the center coordinate of the second shape 787 in the verification image 760, as follows:

$$(u_{verify\_N}, v_{verify\_N}) = \left( \frac{u_{verify\_N}^{outer} + u_{verify\_N}^{inner}}{2}, \frac{v_{verify\_N}^{outer} + v_{verify\_N}^{inner}}{2} \right)$$

Returning to FIG. 4B, the method 400 may further include step 457, in which the control circuit 111 determines a deviation parameter value based on an amount of deviation between the reference image coordinate of step 403 and the verification image coordinate of step 455, wherein the reference image coordinate and the verification image coordinate are both associated with the reference location N. In one example, the deviation between the reference image coordinate and the verification image coordinate may be a distance between the reference image coordinate and the verification image coordinate. For instance, given that the reference image coordinate at the reference location N is expressed as $(u_{ref\_N}, v_{ref\_N})$ and the verification image coordinate at the reference location N is expressed as $(u_{verify\_N}, v_{verify\_N})$, a deviation (e.g., distance) at the reference location N may be expressed as $\sqrt{(u_{ref\_N}-u_{verify\_N})^2+(v_{ref\_N}-v_{verify\_N})^2}$.

As discussed above, in an aspect where the one or more reference locations are a plurality of reference locations, the control circuit 111 may be configured to determine the plurality of verification image coordinates respectively corresponding to the plurality of reference locations, where the verification image coordinate discussed above is one of the plurality of verification image coordinates. In such an aspect, the deviation parameter value is based on respective amounts of deviation between the plurality of reference image coordinates and the plurality of verification image coordinates for the plurality of reference locations, wherein each amount of deviation of the respective amounts of deviation is between: (a) a reference image coordinate corresponding to a respective reference location of the plurality of reference locations, and (b) a verification image coordinate corresponding to the same reference location. The plurality of verification image coordinates may be respective coordinates at which the verification symbol appears in a plurality of verification images, the verification image discussed above being one of the plurality of verification images. The control circuit 111 may be configured to control the camera to capture all of the plurality of verification images in one idle period, and/or may be configured to control the camera to capture the plurality of verification images in different idle periods.

For instance, when there are multiple reference locations, as shown in FIGS. 6A and 6B, the robot control system 110 may determine a plurality of respective reference image coordinates corresponding to the plurality of reference locations, and determine a plurality of respective verification image coordinates corresponding to the plurality of reference locations, and determine respective amounts of deviation between the plurality of reference image coordinates and the plurality of verification image coordinates. The deviation parameter value may be based on the respective amounts of deviation between the plurality of reference image coordinates and the plurality of verification image coordinates. For instance, the deviation parameter may be an average of the respective amounts of deviation, as follows.

$$\text{deviation parameter} = \frac{\sum_{N=1}^{M} \sqrt{(u_{ref\_N} - u_{verify\_N})^2 + (v_{ref\_N} - v_{verify\_N})^2}}{M}.$$

In the above expression, N may refer to the Nth reference location, while M may refer to a total number of reference locations.

Returning to FIG. 4B, the method 400 may further include step 459, in which the control circuit 111 determines whether the deviation parameter value exceeds a defined threshold (which may also be referred to as a defined deviation threshold). Further, in step 461, the control circuit 111 may, in response to a determination that the deviation parameter value exceeds the defined threshold, perform a second camera calibration to determine updated camera calibration information for the camera. For instance, the deviation parameter value exceeding the defined threshold may indicate that the camera calibration information of the camera is outdated and/or is likely to cause an undesirable amount of errors in a robot operation. Hence, if the deviation parameter value exceeds the defined threshold, a second camera calibration for the camera may be performed to update the camera calibration information for the camera (e.g., 570). The second camera calibration may use the same techniques as the first camera calibration, but may be based on images that are more recently captured by the camera. In an example, the robot operation may be stopped or paused if step 459 indicates that the deviation parameter value exceeds the defined threshold, and then proceed to perform the second camera calibration, which may begin by capturing images for the second camera calibration. After the second camera calibration is complete and the camera calibration information for the camera is updated, the robot control system 110 may resume the robot operation using the updated camera calibration information.

In an embodiment, the control circuit 111 may be configured, in response to a determination that the deviation parameter value does not exceed the defined threshold, to control the robot to continue the robot operation after the idle period without performing additional camera calibration (e.g., by outputting a fourth movement command to the robot via the communication interface). Such a condition may indicate that the camera calibration information from step 401 is still sufficiently accurate, and that robot operation can continue without experiencing an undesirable amount of errors.

In an embodiment, the control circuit 111 may be configured to determine a temperature of an environment in which the robot is located, and to adjust at least one of the defined deviation threshold (also referred to as re-defining the deviation threshold) or the camera calibration information for the camera based on the measured temperature. For example, the control circuit 111 may determine the temperature of the environment by measuring the temperature or receiving temperature data from another device or component. In such an embodiment, the control circuit 111 may be configured to adjust the defined threshold based on the measured temperature by: setting the defined threshold to have a first value when the measured temperature is outside of a defined range, and setting the threshold to a have a second value lower than the first value when the measured temperature is within the defined range. For instance, an excessively high temperature or an excessively low temperature may cause changes in the camera. More specifically, a temperature change may affect the intrinsic parameters of the camera. For example, components in the camera may expand when the temperature increases and may contract when the temperature decreases, which may affect the intrinsic parameters of the camera. Therefore, it may be advantageous to adjust the defined deviation threshold based on the temperature or amount of temperature change. For example, when the temperature is within a range of a normal operating temperature (e.g., a defined range based around room temperature), then the defined deviation threshold may be lower, because the temperature does not adversely affect the camera. On the other hand, when the temperature is outside the range of a normal operating temperature, the deviation threshold may be higher because a cold or hot temperature adversely affects the camera. In an alternative example, the deviation threshold may be defined to a lower value when the temperature is outside of a normal operating temperature, so as to more frequently trigger additional camera calibration. In this example, the deviation threshold may be defined to a higher value when the temperature is within the normal operating temperature, so as to less frequently trigger additional camera calibration.

Figure 8:
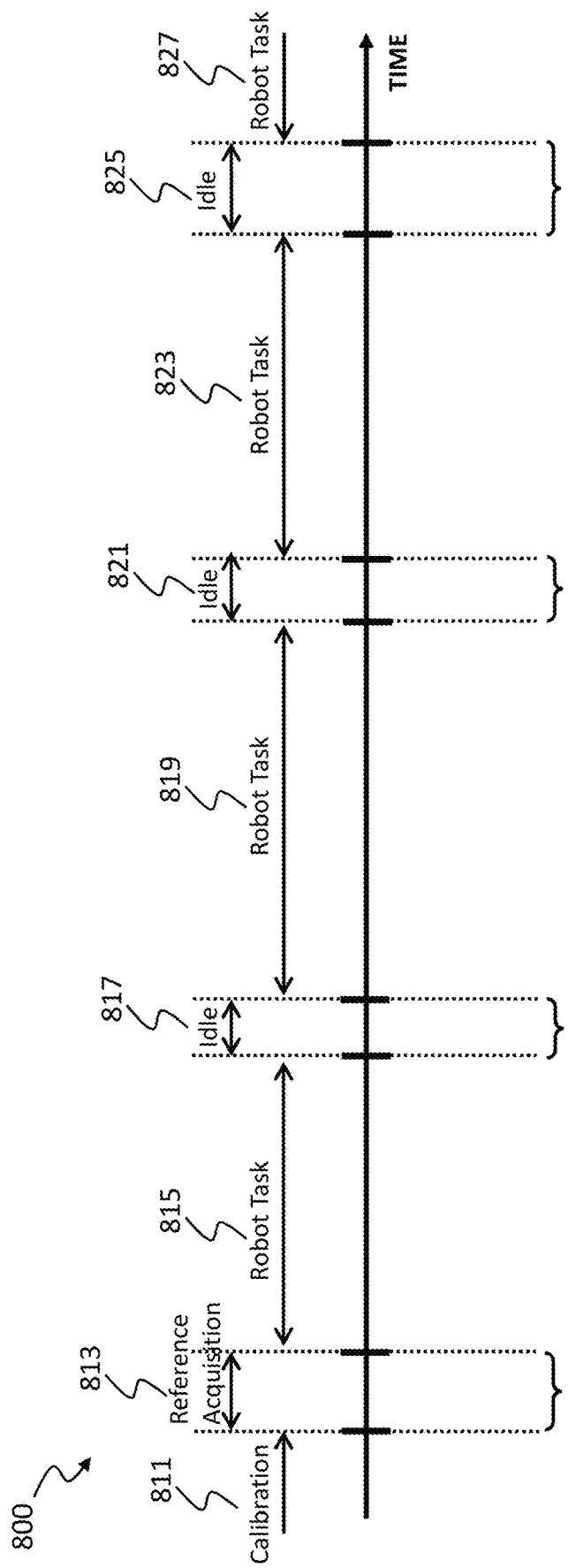
FIG. 8 illustrates an example time line for verification of calibration information, according to an embodiment herein.

FIG. 8 depicts an example time line 800 where the camera calibration and the verification of the camera calibration are performed. While the examples below discuss verifying camera calibration, they may more generally apply to verifying any type of calibration operation performed for a robot operation system. Before a robot operation begins, the robot control system 110 of FIG. 1A or 1B performs the first camera calibration to determine camera calibration information for the camera (e.g., camera 570 of FIG. 5A or 5B) during a calibration period 811. After the first camera calibration is complete, the robot control system 110 captures reference images of the verification symbol (e.g., verification symbol 530) at various reference locations and determines reference image coordinates at which the verification symbol appears in respective reference images (e.g., reference image 710 of FIG. 7A), during a reference acquisition period 813. The robot operation may begin after the reference acquisition period 813 ends upon determining the reference image coordinates.

After the robot operation begins, during a task period 815, the robot control system 110 controls the robot (e.g., robot 550 of FIG. 5A or 5B) to perform one or more robot tasks and thus, in an embodiment, may not be able to collect verification images (e.g., verification image 760 of FIG. 7B). The robot control system 110 detects an idle period 817 during which the robot is free from performing a robot task after the task period 815. Hence, during the idle period 817, the robot control system 110 captures one or more verification images of the verification symbol at a first set of one or more locations (e.g., 610A-610B) of the reference locations, respectively. After the idle period 817 ends, during a task period 819, the robot control system 110 resumes controlling the robot to perform one or more robot tasks and thus may not collect verification images. The robot control system 110 detects an idle period 821 during which the robot is free from performing a robot task, after the task period 817. During the idle period 821, the robot control system 110 captures one or more verification images of the verification symbol at a second set of one or more locations (e.g., 610C-610E) of the reference locations, respectively. After the idle period 821, during a robot task period 823, the robot control system 110 resumes controlling the robot to perform one or more robot tasks and thus may not collect verification images. The robot control system 110 detects an idle period 825 during which the robot is free from performing a robot task after the task period 823. During the idle period 825, the robot control system 110 captures one or more verification images of the verification symbol at a third set of one or more locations (e.g., 610E-610I) of the reference locations, respectively.

The verification images (e.g., 760) captured during the idle periods 817, 821, and 825 may be captured at different respective locations of the reference locations. For instance, the first set, second set, and third set of one or more locations may be different from each other, and may have no overlap in locations. Further, during the idle period 825, the robot control system 110 may determine that the verification image capture is complete, which may indicate that a sufficient number of verification images are captured for verification of the camera calibration. In one embodiment, the robot control system 110 may determine that the verification image capture is complete if verification images are captured at all of the reference locations (e.g., 610A-610I). In one embodiment, the robot control system 110 may determine that the verification image capture is complete if a number of the verification images reaches a defined target count.

Upon determining that the verification image capture is complete, the robot control system 110 determines the verification image coordinates at which the verification symbol appears in the respective verification images. Subsequently, the robot control system 110 determines a deviation parameter value based on respective amounts of deviation of the verification image coordinates from the reference image coordinates. If the deviation parameter exceeds a defined threshold, the robot control system 110 performs another camera calibration. In this example, however, the deviation parameter does not exceed the defined threshold, and thus the robot control system 110 continues performing a robot task during a task duration 827 after the idle period 825, without performing additional camera calibration.

Figure 9:
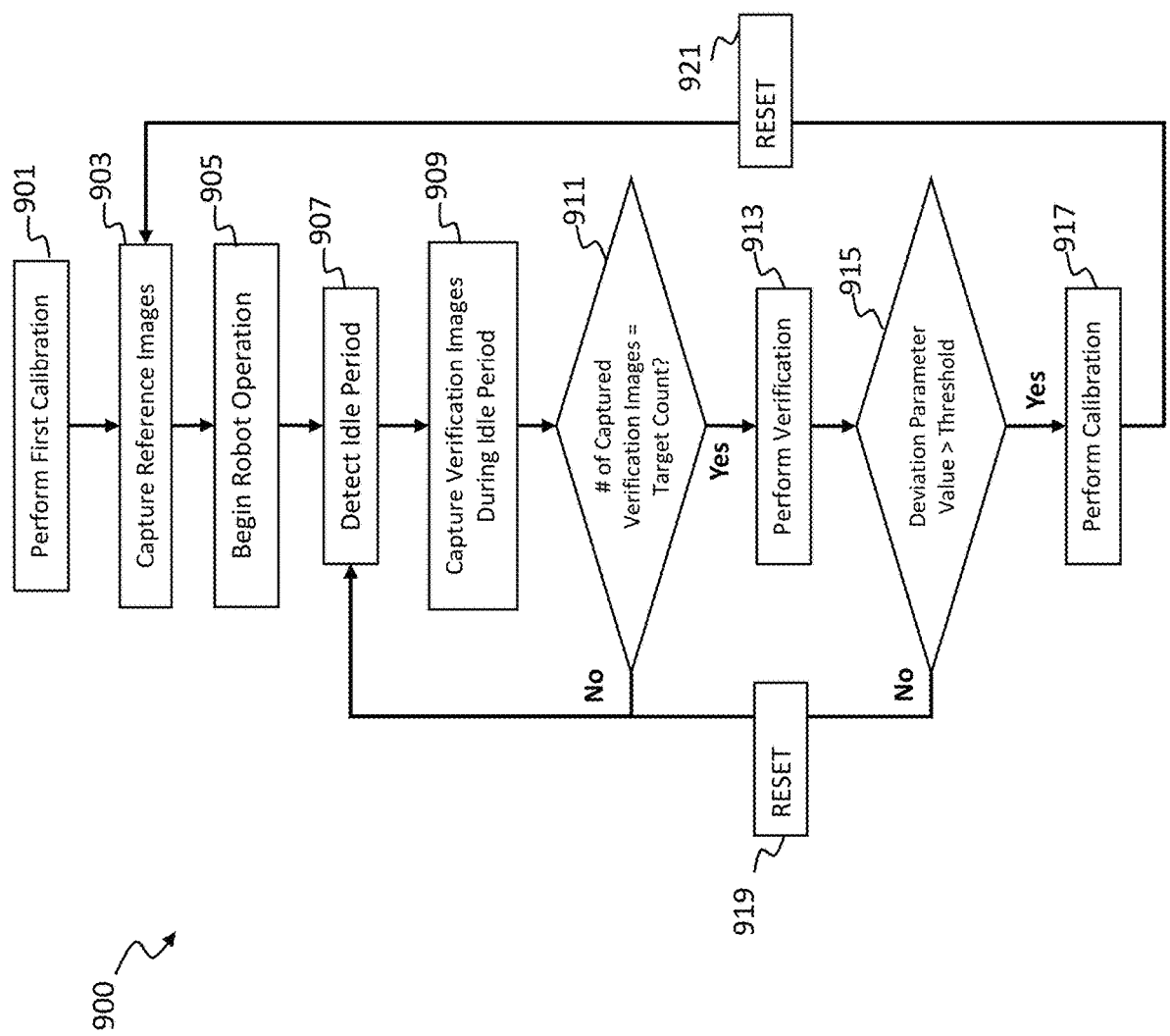
FIG. 9 provides a flow diagram that illustrates an example method for performing verification of calibration information, according to an embodiment herein.

FIG. 9 depicts an example flow diagram 900 that shows a verification process related to the timeline in FIG. 8. At step 901, the robot control system 110 of FIG. 1A, 1B, or 1C performs the first camera calibration of the camera (e.g., camera 570 of FIG. 5A or 5B) to determine camera calibration information of the camera. At step 903, the robot control system 110 controls the robot (e.g., robot 550 of FIG. 5A or 5B) to move the verification symbol (e.g., verification symbol 530 of FIG. 5A or 5B) to reference locations and captures, via the camera, respective instances of the reference images (e.g., reference image 710 of FIG. 7A) of the verification symbol at respective reference locations. At step 905, the robot control system 110 begins a robot operation of the robot based on the camera calibration information obtained from the first camera calibration.

At step 907, the robot control system 110 detects an idle period during the robot operation. At step 909, the robot control system 110 controls the robot (e.g., robot 550 of FIG. 5A or 5B) to move the verification symbol (e.g., verification symbol 530 of FIG. 5A or 5B) to one or more locations of the reference locations during the idle period and captures, via the camera, one or more verification images (e.g., verification image 760 of FIG. 7B) respectively at the one or more locations of the reference locations. In some cases, the robot control system 110 may control the robot to move the verification symbol to as many reference locations as is permitted by a duration of the idle period. At step 911, the robot control system 110 determines whether a total number of the captured verification images has reached a defined target count. If the total number of the captured verification images has not reached the target count, the robot control system 110 attempts to detect another, subsequent idle period during the robot operation, by returning to step 907, to capture more verification images.

If the total number of the captured verification images has reached the target count, at step 913, the robot control system 110 performs verification of the camera calibration based on the reference images (e.g., 710) and the verification images (e.g. 760). The verification of the camera calibration produces a deviation parameter. At step 915, the robot control system 110 determines whether the deviation parameter exceeds a defined threshold. If the deviation parameter does not exceed the threshold, the robot control system 110 may reset the total number of captured verification images to zero at step 919 and may continue the robot operation after the idle period while attempting to detect another idle period to capture a new set of verification images, by returning to step 907.

If the deviation parameter exceeds the threshold, the robot control system 110 may stop the robot operation and perform a second camera calibration, at step 917. After the second camera calibration at 917, the robot control system 110 may reset the total number of captured verification images to zero at 921. After step 921, the flow diagram may return to step 903, where the robot control system 110 controls the robot (e.g., 550) to move the verification symbol (e.g., 530) to the reference locations and captures, via the camera (e.g., 570), a new set of reference images (e.g., 710) of the verification symbol at the respective reference locations, such that the new set of reference images may be used for verification later.

As stated above, one aspect of the present disclosure involves receiving a reference image (e.g., reference image 710 of FIG. 7A) and a verification image (e.g., verification image 760 of FIG. 7B) that both capture or otherwise represent a common verification symbol (e.g., verification symbol 530 of FIGS. 6A-6D) disposed at a physical location on a robot arm, such as the robot arm 553 of the robot 550 of FIGS. 6A-6D. In an embodiment, the reference image (e.g., 710) may be generated at a first point in time, such as an earlier point in time, while the verification image (e.g., 760) may be, e.g., a new image that is generated at a second point in time, such as a later point in time. In some cases, the reference image may be generated based on one or more commands (also referred to as one or more instructions) generated by a computing system, such as the robot control system 110 of FIG. 1C. In some cases, the one or more commands may include a movement command and/or a camera command. The movement command may be for causing the robot arm to move the verification symbol to a reference location. For example, the movement command may cause the robot arm to adopt a particular pose, which results in the verification symbol being moved to a reference location associated with the particular pose of the robot arm. The camera command may be for causing a camera, such as the camera 570 of FIGS. 6A-6D, to generate the reference image while the robot arm is at the particular pose and/or while the verification symbol is at the reference location associated with the particular pose. The reference image may thus correspond to the reference location. Similarly, the verification image may be generated based on one or more commands, such as a movement command and/or camera command, which may be the same as or similar to the movement command and/or camera command discussed above with respect to the reference image. The one or more commands for the verification image may be generated by the same computing system that caused the reference image to be generated, such as the robot control system 110, or by another computing system. In this example, the one or more commands for generating the verification image may cause the verification symbol to be moved to the reference location again. For example, the one or more commands may cause the robot arm to again adopt the particular pose associated with the reference location.

In the above example, the computing system that receives the verification image may compare it against the reference image to determine whether calibration information is still sufficiently accurate. The calibration information may be determined by a calibration operation performed for a robot operation system. The calibration operation, which may also be referred to as a system calibration, may include a camera calibration, a robot calibration, or any other calibration for controlling one or more components of the robot operation system. In an embodiment, the calibration information may include camera calibration information, robot calibration information, or any other calibration information. The comparison discussed above may involve, for example, determining a deviation parameter value that is based on a difference between where the verification symbol appears in the reference image and where the verification symbol appears in the verification image. If the deviation parameter value is too great, such as if it exceeds a defined deviation threshold (e.g., predefined deviation threshold), then the computing system may determine that the calibration information is no longer sufficiently accurate. In such a situation, the calibration information may be referred to as reflecting or including a mis-calibration or mis-alignment. When the camera calibration information includes the mis-calibration or mis-alignment, it may no longer accurately describe an intrinsic characteristic of the camera (e.g., a projection characteristic or a lens distortion characteristic), and/or no longer accurately describe a relationship between the camera and its external environment (e.g., a spatial relationship between the camera and a base of the robot). When the robot calibration information includes mis-calibration or mis-alignment, it may no longer be reliable for accurately moving a robot arm or other component of the robot to a desired location and/or orientation.

Figure 10A:
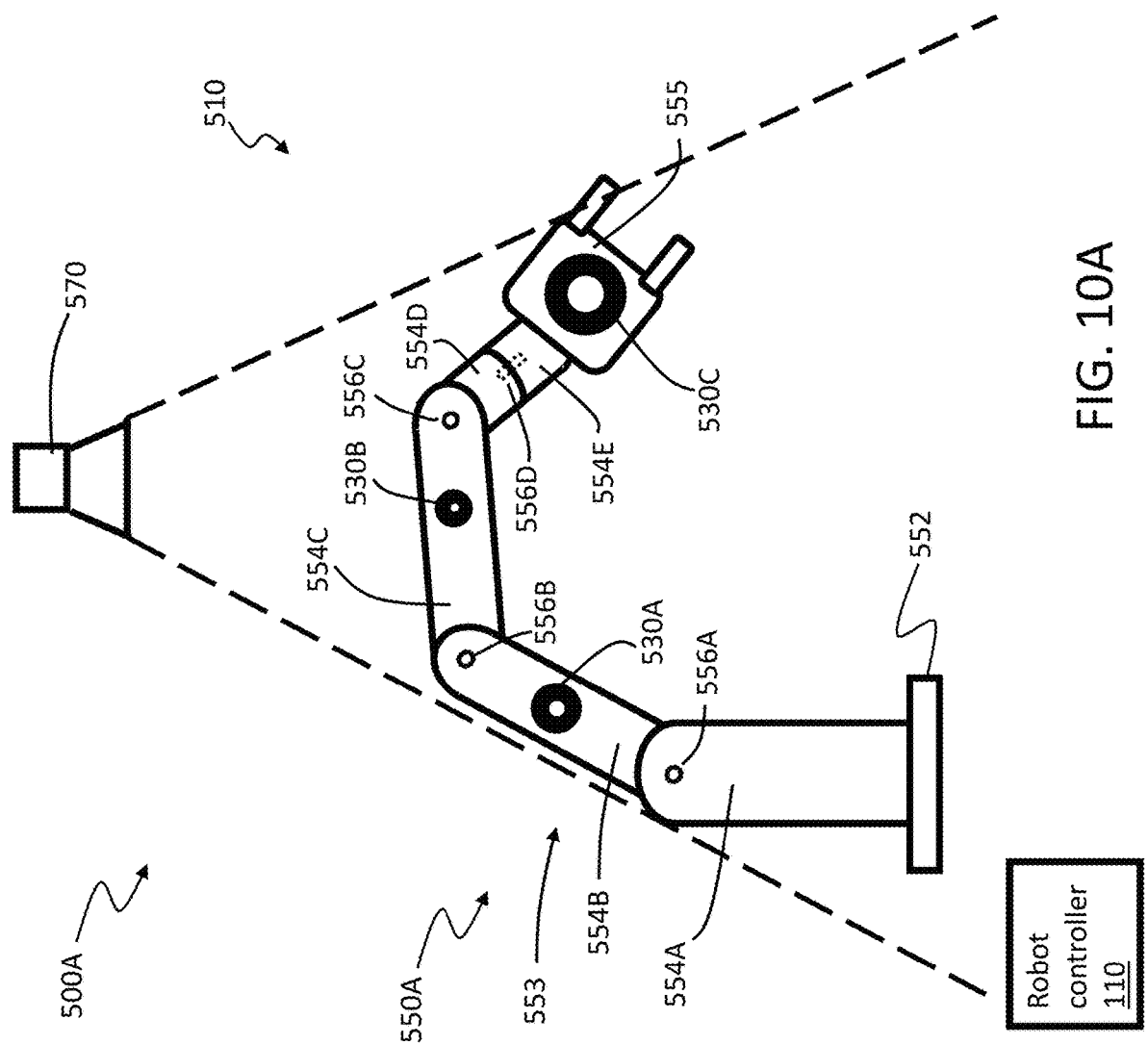
FIGS. 10A-10C illustrate a system in which a group of verification symbols are disposed on a robot, wherein the group of verification symbols are used to perform verification of calibration information, according to an embodiment herein.
Figure 10B:
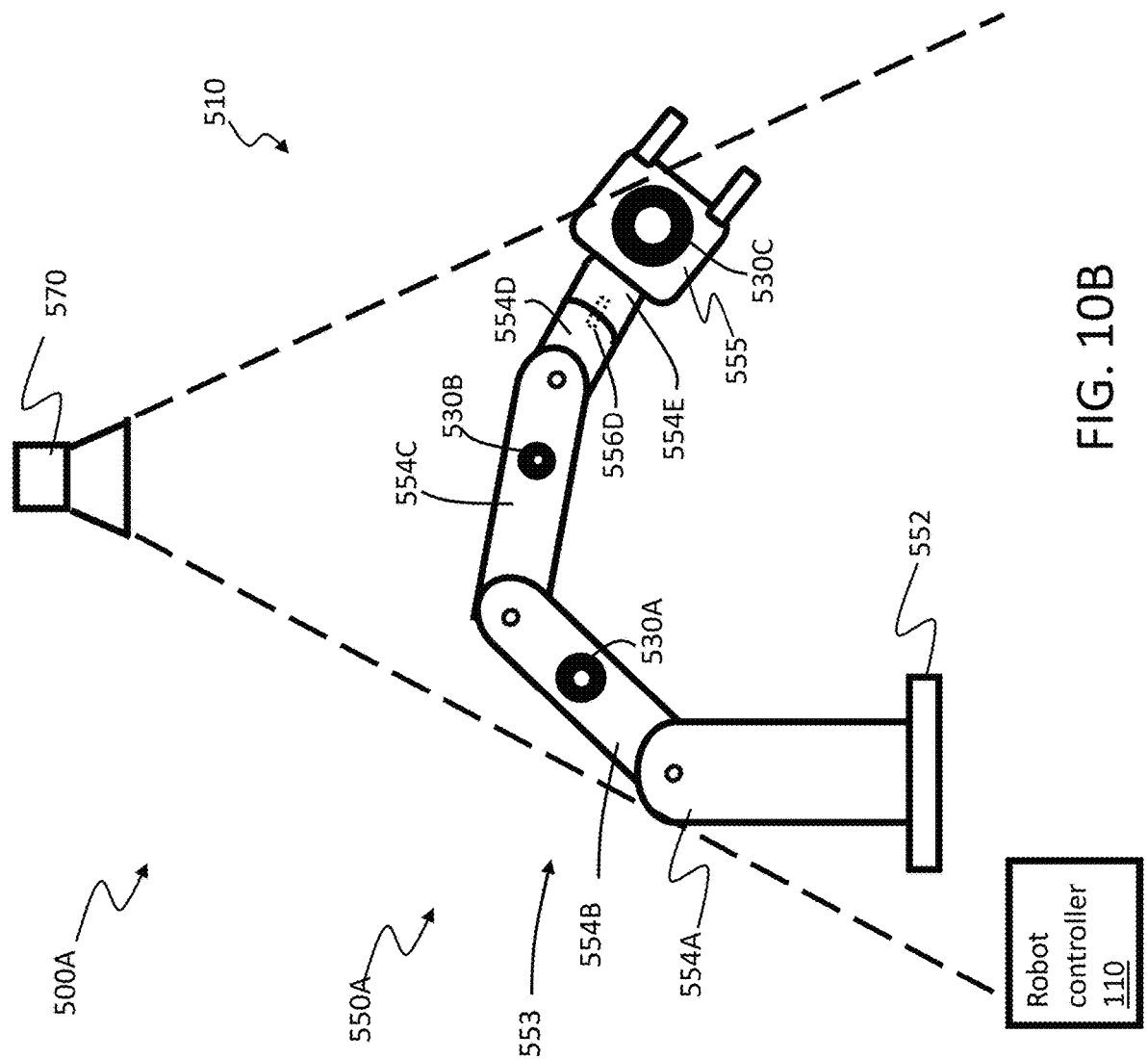
Figure 10C:
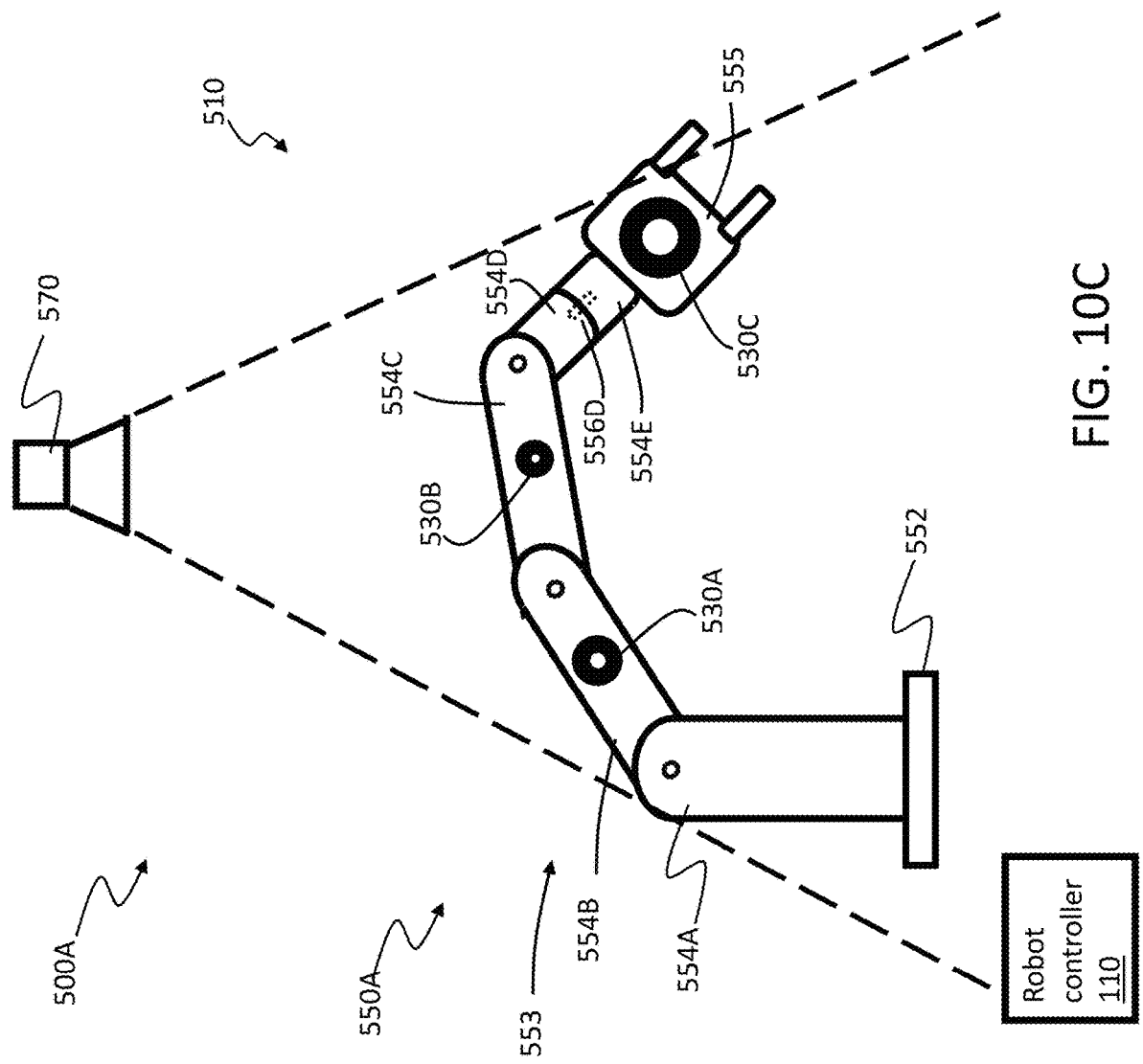

In an embodiment, the method of comparing the reference image and the verification image described above may involve multiple verification symbols. For example, FIGS. 10A-10C depict a group of multiple verification symbols 530A-530C. More particularly, the group of verification symbols 530A-530C may be part of a robot operation system 500A, which may be an embodiment of the robot operation system 500. The robot operation system 500A may include a robot 550A (which may be an embodiment of the robot 550), a camera 570 having a camera field of view 510, and a computing system, such as the robot controller 110. Like the robot 550, the robot 550A has a robot arm 553 which includes a plurality of arm portions that are movably attached to each other. For instance, the plurality of arm portions may include links 554A-554E and include a robot end effector, such as a robot hand 555, which is attached to link 554E. In some cases, as depicted in FIGS. 10A-10C, the plurality of arm portions may be connected or otherwise arranged in series, from a base 552 of the robot 550A to the robot end effector (e.g., robot hand 555). In such cases, the series of arm portions may form a kinematic chain, in which movement of a particular arm portion in the series may cause movement of some or all arm portions downstream of that particular arm portion. The arm portions which are downstream of the particular arm portion may refer to arm portions that follow the particular arm portion in the series of arm portions. For instance, links 554B-554E and the robot hand 555 may be downstream of the link 554A. In other words, the link 554A may be upstream of the links 554B-554E and upstream of the robot hand 555. In this example, each arm portion in the series of arm portions or in a subset thereof may be rotatable, extendable, retractable, or otherwise movable relative to a respective arm portion that immediately precedes the arm portion in the series of arm portions. For example, the link 554C may be rotatable relative to the link 554B, wherein the link 554B may be an arm portion that immediately precedes the link 554C in the series of arm portions depicted in FIG. 10A. In the example of FIGS. 10A-10C, the links 554A-554E and the robot hand 555 may be movably attached to each other via joints 556A-556D.

As discussed above, a robot arm (e.g., 553) may be moved to different poses, wherein a pose may refer to a shape, or more generally a geometry, formed by arm portions (e.g., links) of the robot arm. For example, FIGS. 10A-10C depict three different respective poses for the robot arm 553. In an embodiment, the robot 550A in FIGS. 10A-10C may include one or more actuators (e.g., motors) which are configured to rotate, translate (e.g., extend or retract), or otherwise move the links 554A-554E and the robot hand 555 relative to each other. In such an embodiment, each of the poses in FIGS. 10A-10C may be associated with a particular permutation of movement output by the one or more actuators. For instance, the permutation may describe angle values by which various arm portions of the robot arm 553 have been rotated relative to respective arm portions immediately preceding the various arm portions, and/or distances by which the various arm portions have been translated relative to respective arm portions immediately preceding the various arm portions. As an example, the poses in FIGS. 10A-10C may be associated with different permutations of five angle values which describe, respectively, a direction and amount of rotation of link 554B relative to link 554A, a direction and amount of rotation of link 554C relative to link 554B, a direction and amount of rotation of link 554D relative to link 554C, a direction and amount of rotation of link 554E relative to link 554D, and a direction and rotation of robot hand 555 relative to link 554E.

As stated above, FIGS. 10A-10C depict a group of multiple verification symbols 530A-530C that are disposed on one or more arm portions of the robot arm 553. More particularly, the verification symbol 530A may be disposed on link 554B, while the verification symbol 530B may be disposed on link 554C, and the verification symbol 530C may be disposed on the robot hand 555. In some cases, a robot (e.g., robot 550) may have any number of verification symbols, and they may be disposed on the robot in any manner. For example, the verification symbols 530A-530C may be randomly placed at respective locations on the robot 550A. In some cases, the number and relative placement of the verification symbols (e.g., 530A-530C) may be subject to one or more defined constraints. For example, their relative placement may be subject to a defined constraint which requires adjacent verification symbols (e.g., 530B and 530C) to be separated by a defined minimum distance (also referred to as symbol spacing), such as a defined minimum distance of 5 cm. Such a constraint may reduce a likelihood that a computing system (e.g., robot controller 110) will confuse a particular verification symbol (e.g., 530B) for an adjacent verification symbol (e.g., 530C).

Figure 11A:
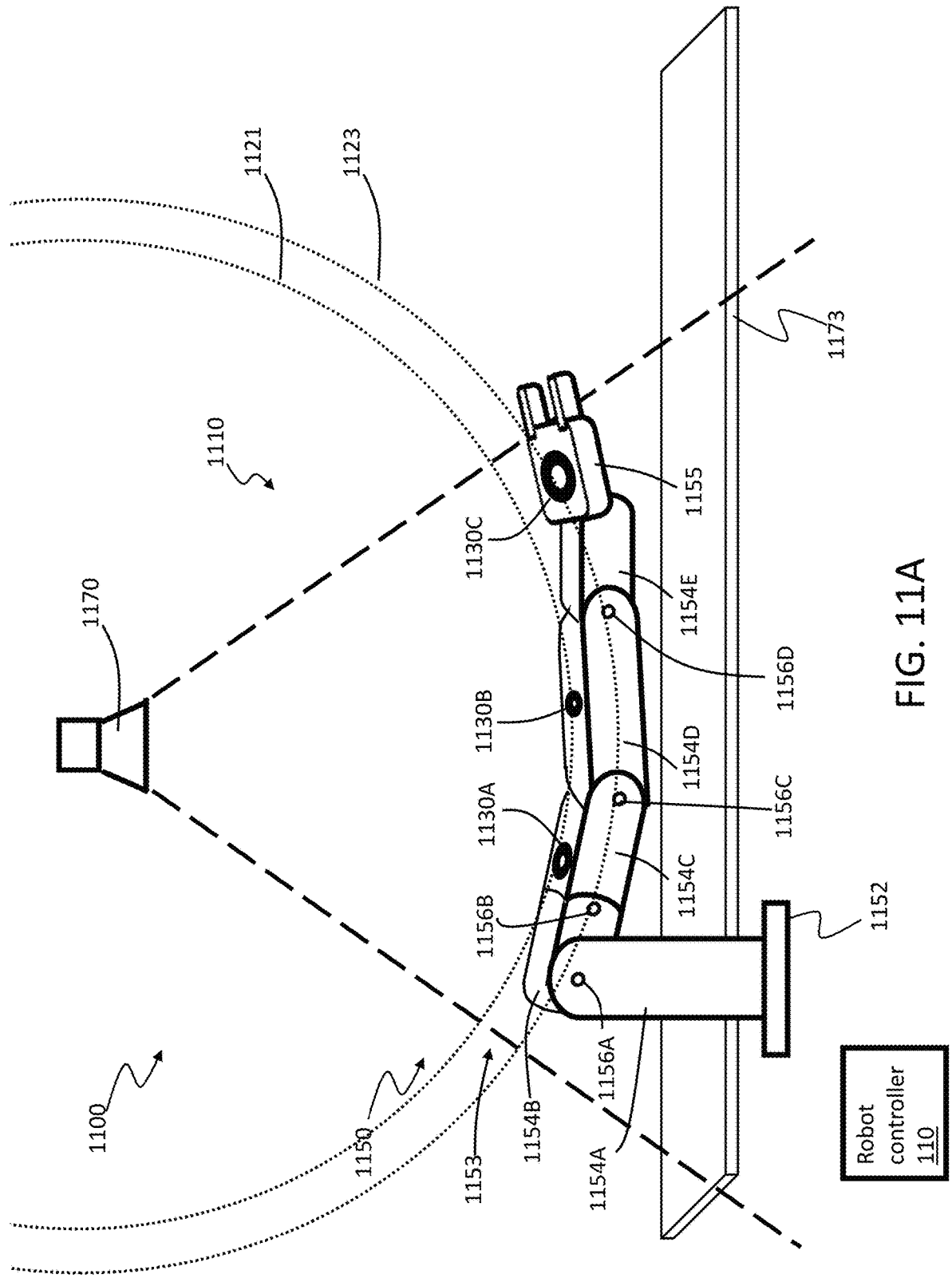
FIGS. 11A-11B illustrate a system in which a group of verification symbols are disposed on a robot, wherein the group of verification symbols are used to perform verification of calibration information, according to an embodiment hereof.
Figure 11B:
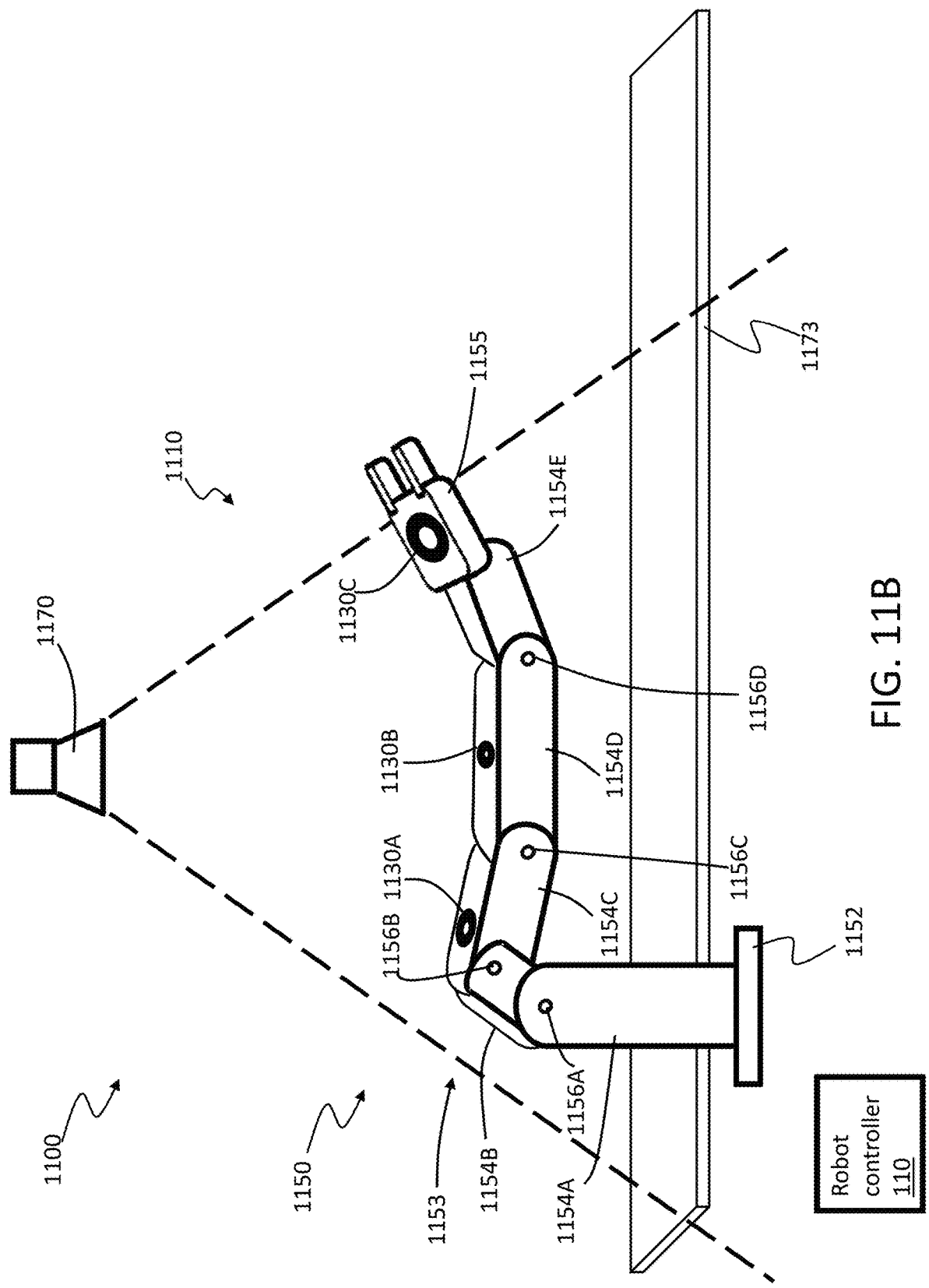
Figure 11C:
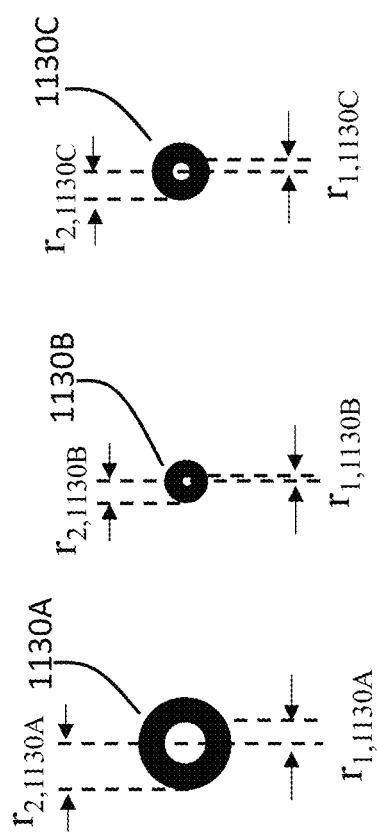
FIG. 11C illustrates a group of verification symbols that have different respective sizes, according to an embodiment hereof.

FIGS. 11A-11C depict another example involving a group of multiple verification symbols 1130A-1130C. More particularly, the verification symbols 1130A-1130C may be part of a robot operation system 1100 that includes a robot 1150, a camera 1170 having a camera field of view 1110, and a computing system, such as the robot controller 110. The robot operation system 1100 and the camera 1170 may, e.g., each be an embodiment of the robot operation system 500 and the camera 570, respectively. The robot 1150 may have a robot arm 1153 that includes a plurality of arm portions, such as links 1154A-1154E and a robot hand 1155 (or other robot end effector). The plurality of arm portions may be movably attached to each other via, e.g., joints 1156A-1156D. FIG. 11A illustrates the robot arm 1153 being at a first pose, while FIG. 11B illustrates the robot arm 1153 being at a second pose. Like in FIGS. 10A-10C, the plurality of arm portions may be connected or otherwise arranged in series, from a base 1152 of the robot 1150 to the robot hand 1155. The series of arm portions may form a kinematic chain, in which movement of one arm portion in the series may propagate to downstream arm portions in the chain. As depicted in FIG. 11A, the verification symbol 1130A may be disposed on link 1154C, while verification symbol 1130B may be disposed on the link 1154D, and the verification symbol 1130C may be disposed on the robot hand 1155.

In an embodiment, one or more verification symbols of the group of verification symbols (e.g., 530A-530C, or 1130A-1130C) may have a circular shape. For example, each of the verification symbols 530A-530C of FIGS. 10A-10C or 1130A-1130C of FIGS. 11A-11C may be a ring pattern, or more specifically a circular ring, as discussed above with respect to FIG. 5C. In the example of FIG. 5C, a ring pattern may have concentric circular regions (e.g., 531 and 533) or concentric circles (e.g., 535 and 537). The concentric circular regions or concentric circles may include, e.g., an inner circular region and an outer circular region, or an inner circle and an outer circle. In the example depicted in FIG. 11C, verification symbol 1130A may in an example be shaped as a circular ring having an inner circle with radius $r_{1,1130A}$ and an outer circle with radius $r_{2,1130A}$. In this example, the verification symbol 1130B may be another circular ring having an inner circle with radius $r_{1,1130B}$ and an outer circle with radius $r_{2,1130B}$. The verification symbol 1130C may also be shaped as a circular have an inner circle with radius $r_{1,1130C}$ and an outer circle with radius $r_{2,1130C}$.

In an embodiment, the group of verification symbols (e.g., 530A-530C, or 1130A-1130C) may be shaped as respective circular rings having different respective sizes. For example, as depicted in FIG. 11C, the verification symbols 1130A-1130C may have different radii for their respective outer circular regions or outer circles. That is, they may have $r_{2,1130A}$, $r_{2,1130B}$, and $r_{2,1130C}$ that all differ from each other. In an embodiment, the circular rings for the verification symbols 1130A-1130C may have different ratios between the respective radii of their inner circular regions or inner circles and the respective radii of their outer circular regions or outer circles. That is, the ratio $r_{2,1130A}/r_{1,1130A}$, the ratio $r_{2,1130B}/r_{1,1130B}$, and the ratio $r_{2,1130C}/r_{1,1130C}$ may all differ from each other. As discussed below in more detail, a computing system (e.g., robot control system 110) may be configured to identify the verification symbol 1130A/1130B/1130C based on a size of a respective circular ring forming the verification symbol 1130A/1130B/1130C, and/or based on a respective ratio between a radius of an inner circle of the circular ring and a radius of an outer circle of the circular ring.

In an embodiment, some or all of the verification symbols (e.g., 530A-530C of FIGS. 10A-10C, or 1130A-1130C of FIGS. 11A-11B) may be permanently attached or otherwise disposed on a robot arm (e.g., 533 or 1130). Such an embodiment may involve a calibration pattern (e.g., 520 of FIGS. 5A and 5B) which is used to perform camera calibration and which has a size that is large enough to accommodate a pattern that is sufficiently complex, and/or large enough to accommodate a sufficient number of pattern elements, in order to yield a sufficiently accurate result for camera calibration. However, such a large size for the calibration pattern (e.g., 520) may render it too large to be a permanent or otherwise persistent part of the robot arm, because the large size of the calibration pattern (e.g., 520) may cause it to interfere with normal robot operation. In such an example, the calibration pattern 520 may be, e.g., detached from the robot arm (e.g., 553) before resuming normal robot operation. In this embodiment, some or all of the verification symbols (e.g., 530A-530C or 1130A-1130C) may be less complex and/or smaller than the calibration pattern (e.g., 520). The smaller size of the verification symbols may allow them to remain on the robot arm (e.g., 553 or 1153) during normal robot operation while presenting no interference or only minimal interference to the normal robot operation. Thus, in such an example, some or all of the verification symbols (e.g., 530A-530C or 1130A-1130C) may in some cases be permanently or otherwise persistently disposed on a robot arm (e.g., 533 or 1133). Such an arrangement provides the advantage of allowing a robot controller or other computing system to be able to more frequently and/or more quickly perform calibration verification and to evaluate whether updated camera calibration needs to be determined.

Figure 12A:
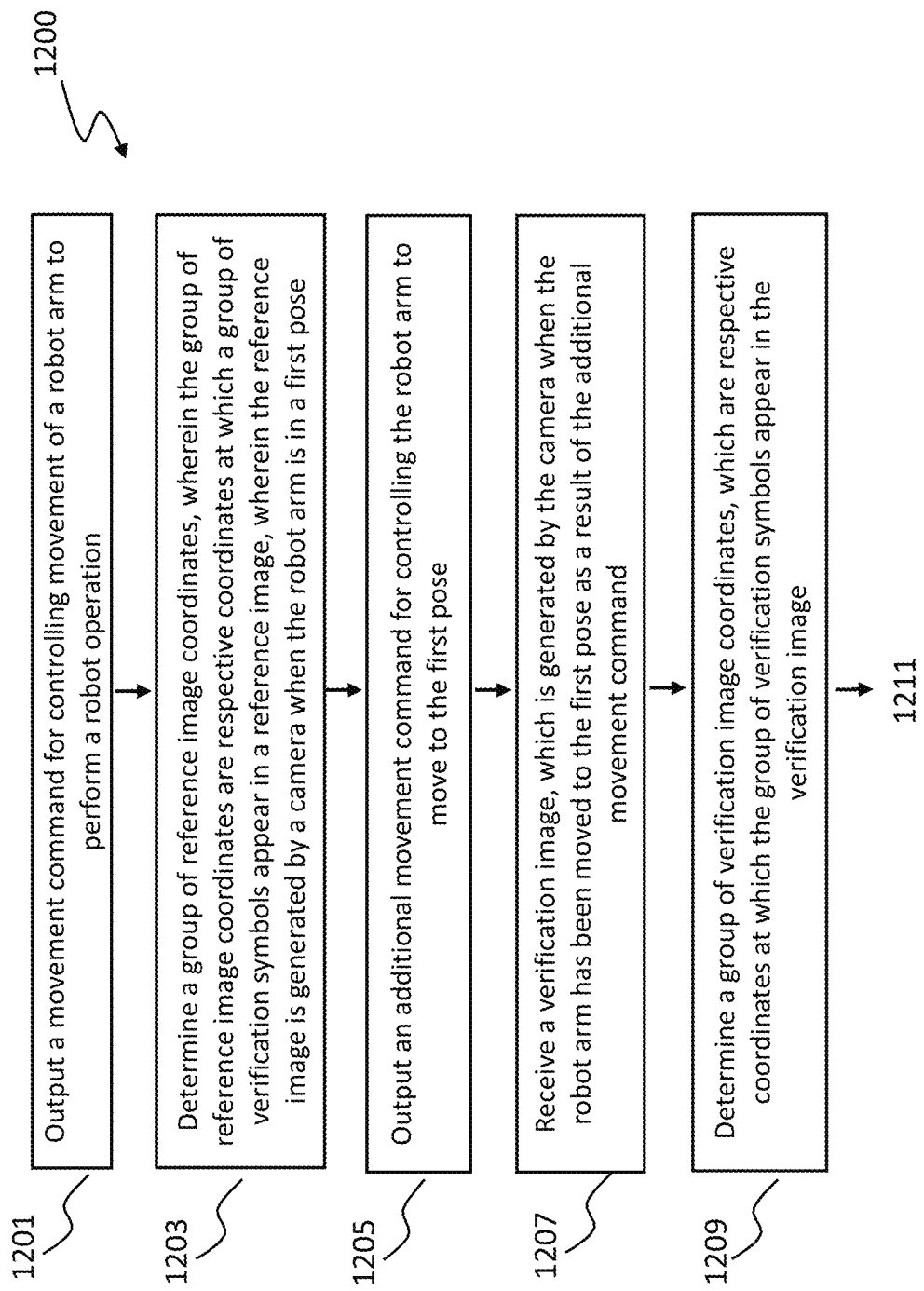
FIGS. 12A and 12B provide a flow diagram that illustrates a method for performing verification of calibration information, according to an embodiment herein.
Figure 12B:
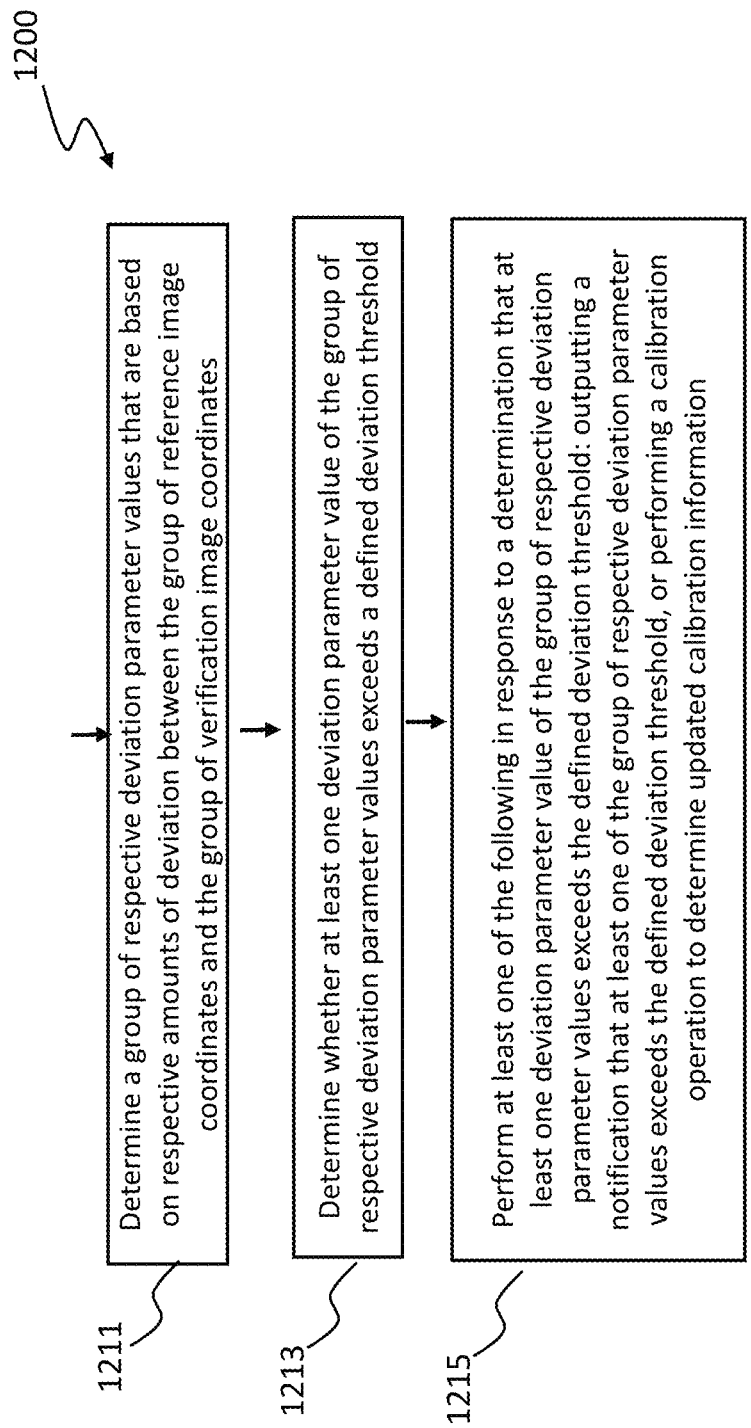

FIGS. 12A and 12B illustrate a method 1200 for using multiple verification symbols to verify calibration information, such as camera calibration information. In an embodiment, the method 1200 may be performed by a computing system, such as the robot control system 110 of FIGS. 10A-10C or of FIGS. 11A-11B, or more particularly by a control circuit of the computing system, such as the control circuit 111 of the robot control system 110 in FIG. 1C. As depicted in FIG. 1C, the computing system may include a communication interface 113 that is configured to communicate with a camera having a camera field of view, such as the camera 570 of FIG. 10A or the camera 1170 of FIG. 11A, which has the camera field of view 510 or 1110, respectively. The communication interface 113 may further be configured to communicate with a robot, such as the robot 550A of FIGS. 10A-10C or the robot 1150 of FIGS. 11A-11C. As stated above, the robot 550A/1150 may include a robot arm 553/1153 that has a plurality of arm portions which are movably attached to each other, and may include a group of verification symbols that are disposed on respective arm portions of the plurality of arm portions. In the example of FIGS. 10A-10C, the group of verification symbols may include the verification symbols 530A-530C, which are disposed on the link 554B, the link 554C, and the robot hand 555, respectively. In the example of FIGS. 11A-11C, the group of verification symbols may include the verification symbols 1130A-1130C, which may be disposed on the link 1154C, the 1154D, and the robot hand 1155, respectively.

In an embodiment, the method 1200 may include a step 1201, in which the control circuit 111 of the robot control system or other computing system outputs a movement command for controlling movement of the robot arm (e.g., robot arm 533/1153) to perform a robot operation. The movement command may be, e.g., based on calibration information. The calibration information, such as camera calibration information, may be determined from a first calibration operation, such as a first camera calibration. In some cases, step 1201 may be the same or similar to step 409 of method 400, in which the control circuit 111 controls movement of the robot arm to perform a robot operation. For example, the robot operation may involve picking up boxes or other objects in a warehouse. In this example, the control circuit 111 may be configured to determine, based on an image of the boxes generated by the camera (e.g., camera 570 of FIGS. 10A-10C or camera 1170 of FIGS. 11A-11B) and based on the calibration information, a spatial relationship between the camera and the boxes, and/or a spatial relationship between the robot (e.g., robot 550A 1150) and the boxes. In an embodiment, method 1200 may include a step in which the control circuit 111 performs the first calibration operation to determine the calibration information. Such a step of performing the first calibration operation may be similar to step 401 of method 400 of FIG. 4A, and may be performed before step 1201. As an example, the first calibration operation may be a camera calibration that involves determining an estimate for a camera calibration parameter based on calibration images generated by the camera.

In an embodiment, the method 1200 may include a step 1203, in which the control circuit 111 or other component of the computing system determines a group of reference image coordinates. The group of reference image coordinates may be, e.g., respective coordinates at which the group of verification symbols (e.g., 530A-530C/1130A-1130C) appear in a reference image, wherein the reference image may be an image for representing the group of verification symbols (e.g., 530A-530C/1130A-1130C). In an embodiment, the group of reference image coordinates may be used for verifying the calibration information.

Figure 13A:
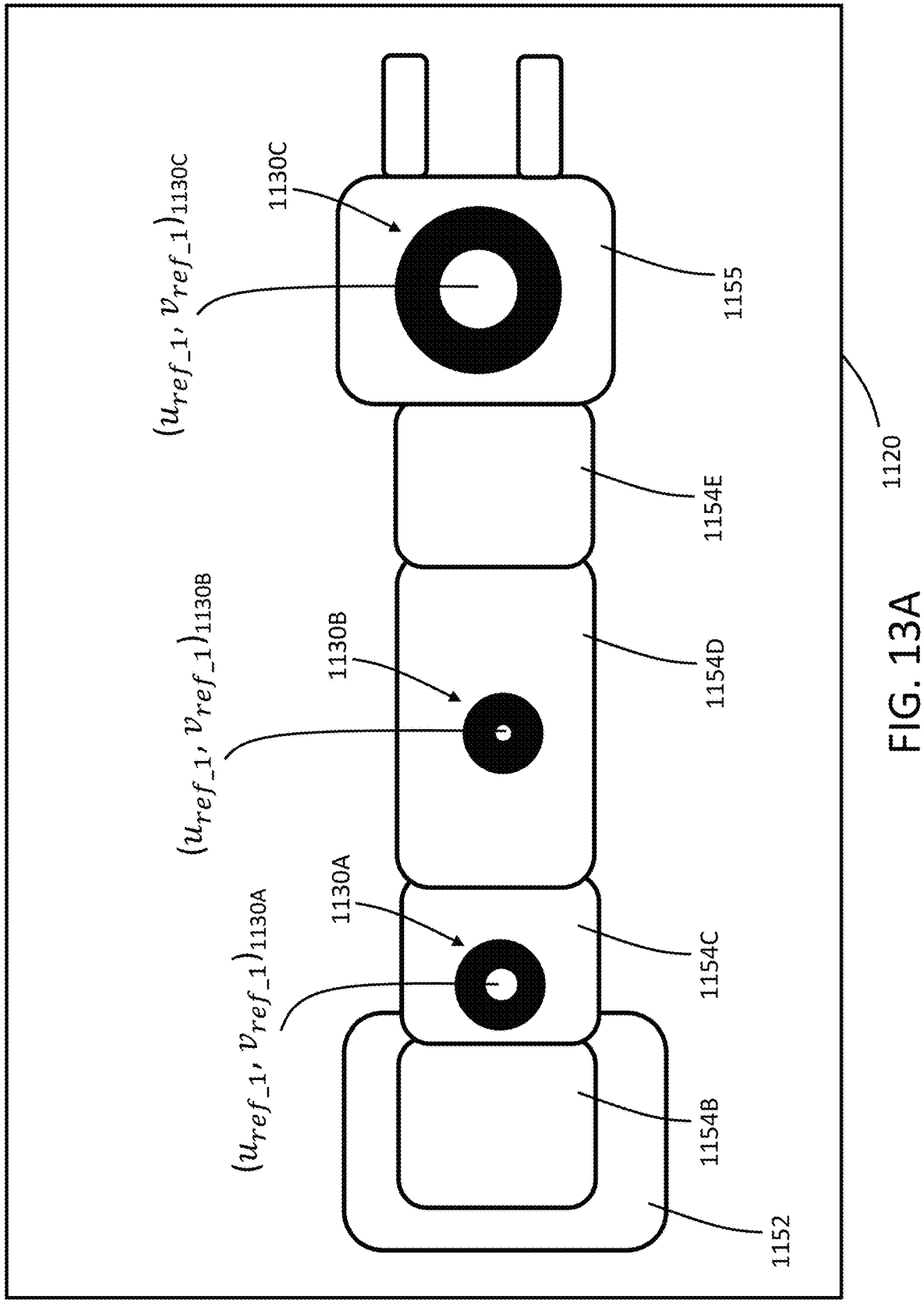
FIGS. 13A and 13B illustrate a reference image and a verification image, respectively, associated with a first pose of a robot arm.

For example, FIG. 13A depicts a reference image 1120 that represents the group of verification symbols 1130A-1130C of FIG. 11A. In the example of FIG. 13A, the group of reference image coordinates may include a first reference image coordinate, a second reference image coordinate, and a third reference image coordinate. In such an example, the first reference image coordinate may identify where the verification symbol 1130A appears in the reference image 1120, while the second reference image coordinate may identify where the verification symbol 1130B appears in the reference image 1120, and the third reference image coordinate may identify where the verification symbol 1130C appears in the reference image 1120. In a more specific example, each of the first reference image coordinate, the second reference image coordinate, and the third reference image coordinate may be a pixel coordinate $[u\ v]^T$. More particularly, FIG. 13A depicts the three reference image coordinates for the verification symbols 1130A, 1130B, and 11300 as $[u_{ref\_1}\ v_{ref\_1}]^T_{1130A}$, $[u_{ref\_1}\ v_{ref\_1}]^T_{1130B}$, $[u_{ref\_1}\ v_{ref\_1}]^T_{1130C}$, respectively. In this example, the label ref_N (e.g., ref_1) may refer to coordinates associated with a reference image that is generated when the robot arm 1153 is in an Nth pose, such as a first pose (when N=1). As discussed below in more detail, the reference image 1120 of FIG. 13A may correspond to or more generally be associated with a first pose, which may be the example pose of the robot arm 1153 illustrated in FIG. 11A. Different poses may place the verification symbols 1130A-1130C at different groups of respective locations in the camera field of view 1110. For instance, the pose in FIG. 11A may place the verification symbols 1130A-1130C at 3D locations $[x_{ref\_1}\ y_{ref\_1}\ z_{ref\_1}]^T_{1130A}$, $[x_{ref\_1}\ y_{ref\_1}\ z_{ref\_1}]^T_{1130B}$, $[x_{ref\_1}\ y_{ref\_1}\ z_{ref\_1}]^T_{1130C}$, respectively. In such an instance, these 3D locations $[x_{ref\_1}\ y_{ref\_1}\ z_{ref\_1}]^T_{1130A}$, $[x_{ref\_1}\ y_{ref\_1}\ z_{ref\_1}]^T_{1130B}$, $[x_{ref\_1}\ y_{ref\_1}\ z_{ref\_1}]^T_{1130C}$ may project or otherwise be mapped to the pixel coordinates $[u_{ref\_1}\ u_{ref\_1}]^T_{1130A}$, $[u_{ref\_1}\ u_{ref\_1}]^T_{1130B}$, $[u_{ref\_1}\ v_{ref\_1}]^T_{1130C}$ in the reference image 1120. In an embodiment, each of the pixel coordinates $[u_{ref\_1}\ v_{ref\_1}]^T_{1130A}$, $[u_{ref\_1}\ v_{ref\_1}]^T_{1130B}$, $[u_{ref\_1}\ v_{ref\_1}]^T_{1130C}$ may identify a center at which its respective verification symbol 1130A/1130B/1130C appears in the reference image 1120.

In an embodiment, step 1203 may involve the control circuit 111 receiving the reference image (e.g., 1120) from the communication interface 113 and/or the non-transitory computer-readable medium 115 of the robot control system 110 or other computing system. For instance, the reference image 1120 of FIG. 13A may be generated by the camera 1170 when the robot arm 1153 is in the pose of FIG. 11A. The computing system 110 may receive the reference image 1120 from the camera 1170 via the communication interface 113, and may store the reference image 1120 in the non-transitory computer-readable medium 115. In step 1203, the control circuit 111 may in an example retrieve or otherwise receive the reference image 1120 from the non-transitory computer-readable medium 115. The non-transitory computer-readable medium 115 may also store a verification image (which is discussed below), and the control circuit 111 may receive the verification image from the non-transitory computer-readable medium 115.

In an embodiment, the control circuit 111 may be configured to identify at least one verification symbol (e.g., 1130A) of the group of verification symbols (e.g., 1130A-1130C) in the reference image (e.g., 1120) based on a defined model that describes a geometry of the robot arm (e.g., 1153). For example, the defined model may describe which links, robot end effector, or other arm portions form the robot arm, their respective sizes (e.g., lengths), and how they are connected, and/or describe which arm portions have at least one verification symbol (e.g., 1130A) disposed thereon. In such an embodiment, the control circuit may be configured to determine, based on the model, a region within the reference image (e.g., 1120) at which the at least one verification symbol is expected to appear, and to search for the at least one verification symbol (e.g., 1130A) within the region of the reference image. In an embodiment, the model may store, or more generally describe, a position of a verification symbol (e.g., 1130A) on the robot arm (e.g., 1153). The position of the verification symbol (also referred to as symbol position) can be an approximate location of the verification symbol on the robot arm (e.g., 1153).

For example, if the reference image (e.g., 1120) is stored along with one or more parameter values of a movement command used to generate the pose associated with the reference image, or more specifically the pose of the robot arm appearing in the reference image, the one or more parameter values and the model may be used to estimate a pose for the robot arm (e.g., 1153) when the robot arm is moved according to the movement command. As discussed below in more detail, the one or more parameter values may in an embodiment belong to one or more actuator parameters used to control one or more actuators (e.g., one or more motors) used to move the robot arm (e.g., 1153). The estimated pose may be used to estimate a location of a verification symbol (e.g., 1130A) on the robot arm (e.g., 1153), and the estimated location may be used to estimate where the verification symbol is likely to appear in the reference image (e.g., 1120).

In the above examples, the control circuit 111 may be configured to focus on a region(s) of a reference image (e.g., 1120) at which a verification symbol or verification symbols are expected to appear. Such a technique may allow the control circuit 111 to avoid searching an entirety of the reference image (e.g., 1120) for verification symbols (e.g., 1130A-1130C), and to thus identify the verification symbols (e.g., 1130A-1130C) in the reference image (e.g., 1120) more quickly. The model in the above examples may also be used to search for the verification symbols in a verification image (which is discussed below).

As stated above, the group of verification symbols (e.g., 1130A-1130C) may in an embodiment be shaped as respective circular rings. In such an embodiment, the control circuit 111 may be configured to recognize or otherwise identify a verification symbol (e.g., 1130A) in the reference image (e.g., 1120) by identifying a circular ring that forms the verification symbol. If the group of verification symbols are shaped as respective circular rings having different respective sizes, such as illustrated above with respect to FIG. 11C, the control circuit 111 may be configured to identify a verification symbol (e.g., 1130A) based on a size (e.g., a radius $r_{2,1130A}$) of a respective circular ring forming the verification symbol. In some cases, if a verification symbol (e.g., 1130A) is shaped as a circular ring having at least a first circular region or first circle and a second circular region or second circle, the control circuit 111 may be configured to identify the verification symbol based on a ratio between a radius of the first circular region or first circle and a radius of the second circular region or second circle. For instance, the control circuit 111 may be configured to identify the verification symbol 1130A based on identifying a circular ring and confirming that the ring has the ratio $r_{2,1130A}/r_{1,1130A}$.

As further stated above, the reference image (e.g., 1120 of FIG. 13A) of step 1203 may be generated by the camera (e.g., 1170 of FIG. 11A) when the robot arm (e.g., 1153) is in a first pose, such as the pose depicted in FIG. 11A. The reference image may be generated by the camera during a first time period or, more generally, at a first point in time. The first time period may refer to a period of time (e.g., a period of milliseconds, seconds, or minutes) used for or otherwise associated with generating the reference image. For example, the first time period may include time for a camera operation for capturing the reference image, and in some instances may further include time for robot movement to position verification symbol in the camera field of view. In some cases, the first time period during which the reference image is generated may be, e.g., hours, days, or weeks before step 1201 and/or step 1203. In an embodiment, the computing system or more specifically the control circuit 111 which performs steps 1201 and 1203 may be uninvolved in generating the reference image (e.g., 1120). In an embodiment, the computing system or more specifically the control circuit 111 which performs steps 1201 and 1203 may be involved in generating the reference image (e.g., 1120). For instance, the computing system may, in a step which precedes the step 1201 and/or 1203, output a movement command during the first time period for causing the robot arm (e.g., 1153) to move to the first pose. In such an instance, this preceding step may be part of the method 1200. The first pose may cause the group of verification symbols (e.g., 1130A-1130C) to be moved to a first group of respective locations associated with the first pose, such as the locations $[x_{ref\_1}\ y_{ref\_1}\ z_{ref\_1}]^T_{1130A}$, $[x_{ref\_1}\ y_{ref\_1}\ z_{ref\_1}]^T_{1130B}$, $[x_{ref\_1}\ y_{ref\_1}\ z_{ref\_1}]^T_{1130C}$ discussed above. In some cases, such a step may be similar to or the same as step 403 in FIG. 4A. In the above example, the computing system, or more specifically the control circuit 111, may further output a camera command in this step which causes the camera (e.g., 1170) to generate the reference image (e.g., 1120) while the robot arm (e.g., 1153) is in the first pose. In an embodiment, the computing system may receive the reference image (e.g., 1120) from the camera and store the reference image in the non-transitory computer-readable medium 115 of FIG. 1C or in another non-transitory computer-readable medium. In some cases, the computing system may further store information which allows the robot arm (e.g., 1153) to return to the first pose, and/or to return the verification symbols (e.g., 1130A-1130C) back to the first group of respective locations. For example, the computing system may store the first group of respective locations, or more specifically store their 3D coordinates, and/or may store parameter values of the movement command for causing the robot arm (e.g., 1153) to move to the first pose. In an embodiment, the coordinates and/or movement command may be stored in the non-transitory computer-readable medium 115 in a manner that associates the stored information with the reference image (e.g., 1120) discussed above.

In an embodiment, the movement command discussed above for moving the robot arm to the first pose may include one or more parameter values that describe movement for the robot arm (e.g., 1153). As stated above, in some cases the one or more parameter values may belong to one or more actuator parameters which control one or more actuators that create movement for the robot arm (e.g., 1153). In such cases, the one or more parameter values may be referred to as one or more actuator parameter values (also referred to as robot joint values). For example, the one or more actuator parameter values may describe, e.g., respective amounts of rotation of arm portions of the robot arm relative to each other, respective locations and/or orientations of the arm portions relative to each other, and/or respective locations of joints (e.g., 1156A-1156D) connecting the arm portions. For instance, the one or more actuator parameter values of the movement command may describe respective angle values by which motors in the robot 1150 are to rotate various arm portions (e.g., links 1154A-1154E and robot hand 1155) relative to their immediately preceding arm portions.

In an embodiment, the movement command discussed above may have any parameter value(s) (e.g., a random parameter value(s)), and the first pose caused by the movement command may be any pose. In an embodiment, the movement command discussed above may be a movement command which causes some or all of the verification symbols (e.g., 1130A-1130C) to have a desired appearance in the reference image (e.g., 1120). For example, as discussed above, some or all of the group of verification symbols (e.g., 1130A-1130C) may have a circular shape, such as a ring shape formed by concentric circular regions or concentric circles. In such an example, when at least one of the verification symbols (e.g., 1130A) is in certain orientations relative to the camera (e.g., 1170), the at least one verification symbol (e.g., 1130A) may appear elliptical in the resulting reference images rather than appear completely circular. The elliptical appearance may lead to inaccurate calibration verification. For instance, if the reference image coordinate for the verification symbol 1130A is a location at which the symbol's center appears in the reference image, this reference image coordinate may be more difficult to accurately determine when the verification symbol 1130A appears elliptical in the reference image. Further, if identifying the verification symbol 1130A in the reference image (e.g., distinguishing the verification symbol 1130A from other features in the reference image) relies on identifying a ring pattern in the reference image and on verifying that the ring pattern has a particular ratio between concentric circles associated with the symbol (e.g., the ratio $r_{2,1130A}/r_{1,1130A}$ associated with the verification symbol 1130A), this identification may be more difficult to accurately perform when the ring pattern appears elliptical in the reference image. Thus, if the control circuit 111 is involved in outputting the movement command associated with generating the reference image, the control circuit 111 may attempt to generate a movement command which causes the group of verification symbols (e.g., 1130A-1130C) to be positioned in a manner such that they appear completely or substantially circular in the reference image.

As an example, the control circuit 111 may generate a movement command which causes the robot arm (e.g., 1153) to move to a pose in which the group of verification symbols (e.g., 1130A-1130C) directly face the camera (e.g., 1170). For instance, the pose may cause at least one verification symbol of the group of verification symbols (e.g., 1130A-1130C) to be tangent to a surface of an imaginary sphere that is concave with respect to the camera (e.g., 1170). In FIG. 11A, the depicted pose for the robot arm 1153 may cause the verification symbol 1130A and the verification symbol 1130B to have respective orientations at which they are tangent to a surface of an imaginary sphere 1121 that is concave with respect to the camera 170, and may cause the verification symbol 1130C to have an orientation at which it is tangent to a surface of an imaginary sphere 1123 that is also concave with respect to the camera 1170. In such a pose, which may be the first pose discussed above, the group of verification symbols (e.g., 1130A-1130C) may appear as respective circular shapes in the reference image (e.g., 1120). More particularly, the group of verification symbols (e.g., 1130A-1130C) in such an example may be positioned in a manner such that they appear with no eccentricity in the reference image, or appear with respective amounts of eccentricity that are less than a defined eccentricity threshold. In the above example, the imaginary circles 1121 and 1123 may be centered at the camera (e.g., 1170). In an embodiment, the control circuit 111 may be configured to generate random movement commands and search through the random movement commands to find one which can produce the orientations discussed above for the group of verification symbols. The movement command which is found may be output by the control circuit 111 in order to generate the reference image (e.g., 1120).

Returning to FIGS. 12A-12B, the method 1200 in an embodiment includes a step 1205, in which the control circuit 111 outputs a movement command for controlling the robot arm to move to the first pose, such as the first pose depicted in FIG. 10A or 11A, wherein the first pose is a pose at which the reference image (e.g., 1120) is generated during the first time period, as discussed above. In some cases, the movement command may be output to the robot (e.g., 550A/1150) via the communication interface 113. In an embodiment, the movement command in step 1205 may be referred to as an additional movement command, because it is in addition to the movement command of step 1201. The additional movement command may be outputted during a second time period, or more generally a second point in time, that is subsequent to the first time period. The second time period may refer to a period of time (e.g., a period of milliseconds, seconds, or minutes) used for or otherwise associated with generating the verification image. For example, the second time period may include time for robot movement to position the verification symbol in the camera field of view and/or time for a camera operation for capturing the verification image. In some cases, the second time period (or, more generally, the second point in time) may follow the first time period (or, more generally, the first point in time) by hours, days, or weeks. As discussed below in more detail, the additional movement command may be used to generate a verification image during the second time period. In an embodiment, the additional movement command may cause the robot arm (e.g., 1153) to move to a pose (e.g., the first pose of FIG. 11A) in which the group of verification symbols (e.g., 1130A-1130C) directly face the camera (e.g., 1170). For example, the group of verification symbols may have respective orientations at which they are tangent to one or more imaginary spheres that are concave with respect to the camera. In such a pose, the group of verification symbols (e.g., 1130A-1130C) may appear as respective circular shapes in the verification image (e.g., 1160 of FIG. 13B).

In an embodiment, if the method 1200 includes a step of outputting a movement command for generating the reference image during the first time period, as discussed above, the movement command for generating the reference image during the first time period may be a first additional movement command, while the movement command in step 1205 for generating the verification image during the second time period may be a second additional movement command. In some cases, the first additional movement command may be an earlier movement command, while the second additional movement command may be a later movement command. In some cases, the first additional movement command may have one or more actuator parameter values (or robot joint values) for controlling the robot arm to move to the first pose, and the second additional movement command may also have the one or more actuator parameter values. More particularly, the first additional movement command and the second additional movement command may have the same actuator parameter values. As an example, if a robot (e.g., 1150) include a plurality of motors that rotate various arm portions (e.g., links 1154A-1154E and robot hand 1155) relative to each other, the one or more actuator parameter values may include a plurality of respective angle values that control how much rotation is to be output by the plurality of motors. In this example, the first additional movement command and the second additional movement command may both include the same plurality of respective angle values that control how much rotation is output by the plurality of motors.

In an embodiment, the first additional movement command and/or the second additional movement command may be output during a respective idle period, such as the idle period discussed above with respect to step 411 for FIG. 4A. In some situations, if the calibration information is determined by performing a calibration operation, the first additional movement command may be output immediately after the calibration operation is performed, or during an earliest idle period which follows the calibration operation. In some situations, the second additional movement command may be in response to a defined triggering condition, such as a defined period of time elapsing since the calibration operation was performed, a collision event involving the robot, or any other event (e.g., a natural disaster such as an earthquake) that can lead to possible displacement or mis-alignment between the camera and the robot or portions thereof, or some other triggering condition. If generating the verification image involves the control circuit 111 outputting a camera command, the camera command may in some examples also be output in response to the defined triggering condition.

In an embodiment, the first pose of step 1205 for the robot arm (e.g., 1153) may be associated with a particular group of respective reference locations for the group of verification symbols (e.g., 1130A-1130C) disposed on the robot arm, as discussed above. For example, the group of respective reference locations may be the 3D locations $[x_{ref\_1} \; y_{ref\_1} \; z_{ref\_1}]^T_{1130A}$, $[x_{ref\_1} \; y_{ref\_1} \; z_{ref\_1}]^T_{1130B}$, $[x_{ref\_1} \; y_{ref\_1} \; z_{ref\_1}]^T_{1130C}$. When the reference image (e.g., 1120) is generated, the group of verification symbols (e.g., 1130A-1130C) may be located at the group of respective reference locations associated with the first pose. In step 1205, if the additional movement command causes the robot arm to return to the first pose, the group of verification symbols (e.g., 1130A-1130C) may return to the group of reference locations (e.g., $[x_{ref\_1} \; y_{ref\_1} \; z_{ref\_1}]^T_{1130A}$, $[x_{ref\_1} \; y_{ref\_1} \; z_{ref\_1}]^T_{1130B}$, $[x_{ref\_1} \; y_{ref\_1} \; z_{ref\_1}]^T_{1130C}$). In such an example, the group of verification symbols (e.g., 1130A-1130C) may be disposed at the group of respective reference locations when the reference image (e.g., 1120) is generated, and may be disposed at the group of respective reference locations again when the verification image (e.g., 1160) is generated.

Figure 13B:
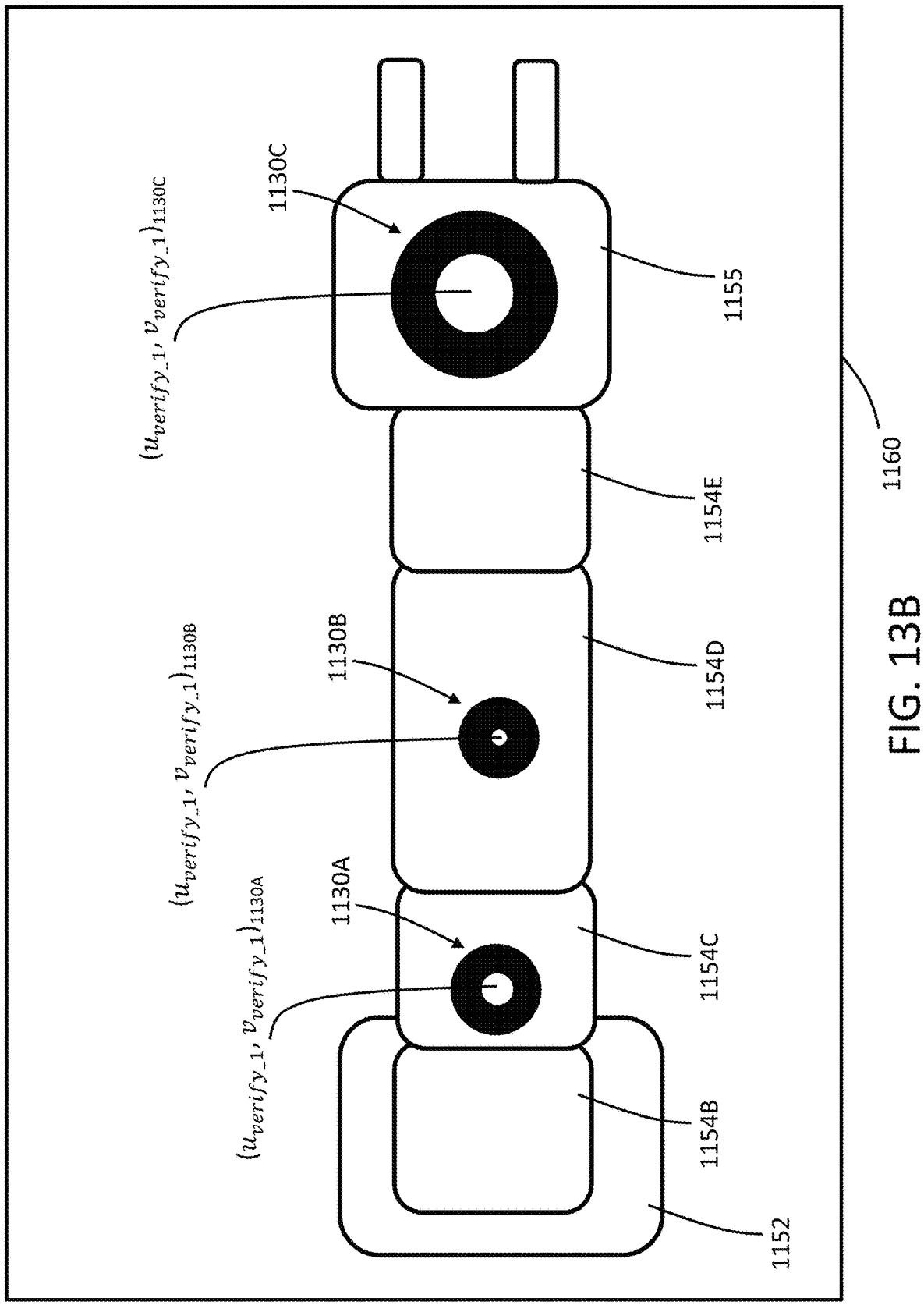

Returning to FIGS. 12A-12B, the method 1200 in an embodiment may include a step 1207, in which the control circuit 111 receives a verification image, such as the verification image 1160 in FIG. 13B. As stated above, the reference image (e.g., 1160) may be an image for representing the group of verification symbols (e.g., 1130A-1130C). In this example, the verification image (e.g., 1160) may be an additional image for also representing the group of verification symbols (e.g., 1130A-1130C), and may be generated when the robot arm (e.g., 1153) has been moved to the first pose as a result of the additional movement command of step 1205, such as to the first pose depicted in FIG. 11A.

In an embodiment, the method 1200 may include a step 1209, in which the control circuit 111 determines a group of verification image coordinates. In this embodiment, the group of verification image coordinates may be respective coordinates at which the group of verification symbols (e.g., 1130A-1130C) appear in the verification image (e.g., 1160 of FIG. 13B). In an embodiment, the group of verification image coordinates may be for verifying the calibration information, such as camera calibration information. Similar to the discussion above for the reference image coordinates in step 1203, the group of verification image coordinates in an example may include a first verification image coordinate, a second verification image coordinate, and a third verification image coordinate. In a more specific example, each of the first verification image coordinate, the second verification image coordinate, and the third verification image coordinate may be a pixel coordinate that identifies, e.g., a center of its respective verification symbol. For instance, FIG. 13B depicts three verification image coordinates, or more particularly pixel coordinates $[u_{verify\_1} \; v_{verify\_1}]^T_{1130A}$, $[u_{verify\_1} \; v_{verify\_1}]^T_{1130B}$, $[u_{verify\_1} \; v_{verify\_1}]^T_{1130C}$, at which respective centers of the verification symbols 1130A-1130C appear in the verification image 1160. Similar to the discussion for the reference image coordinates, the label verify_N (e.g., verify_1) may refer to coordinates associated with a verification image that is generated when the robot arm is in an Nth pose, such as the first pose (N=1).

Figure 14A:
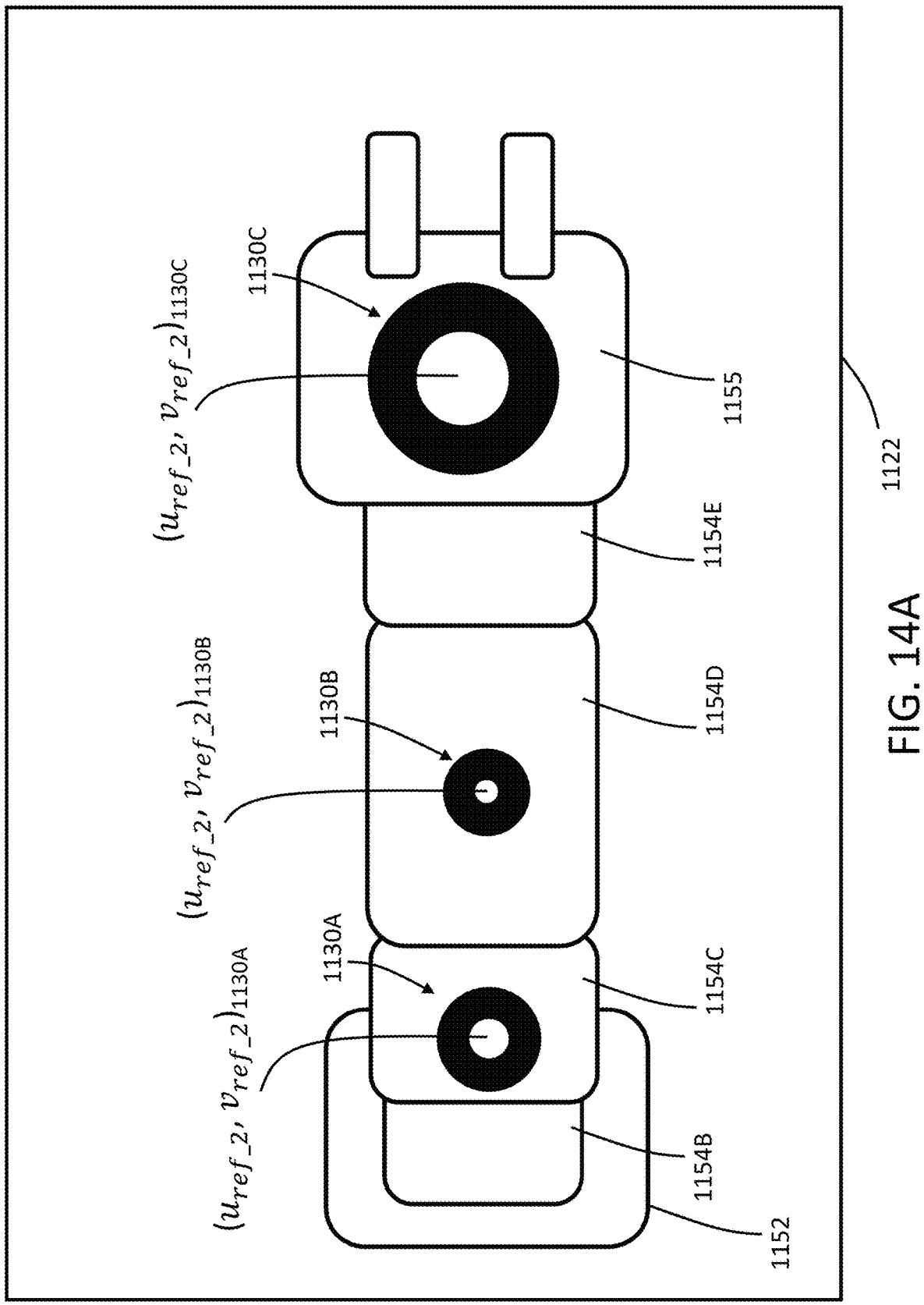
FIGS. 14A and 14B illustrate a reference image and a verification image, respectively, associated with a second pose of a robot arm.
Figure 14B:
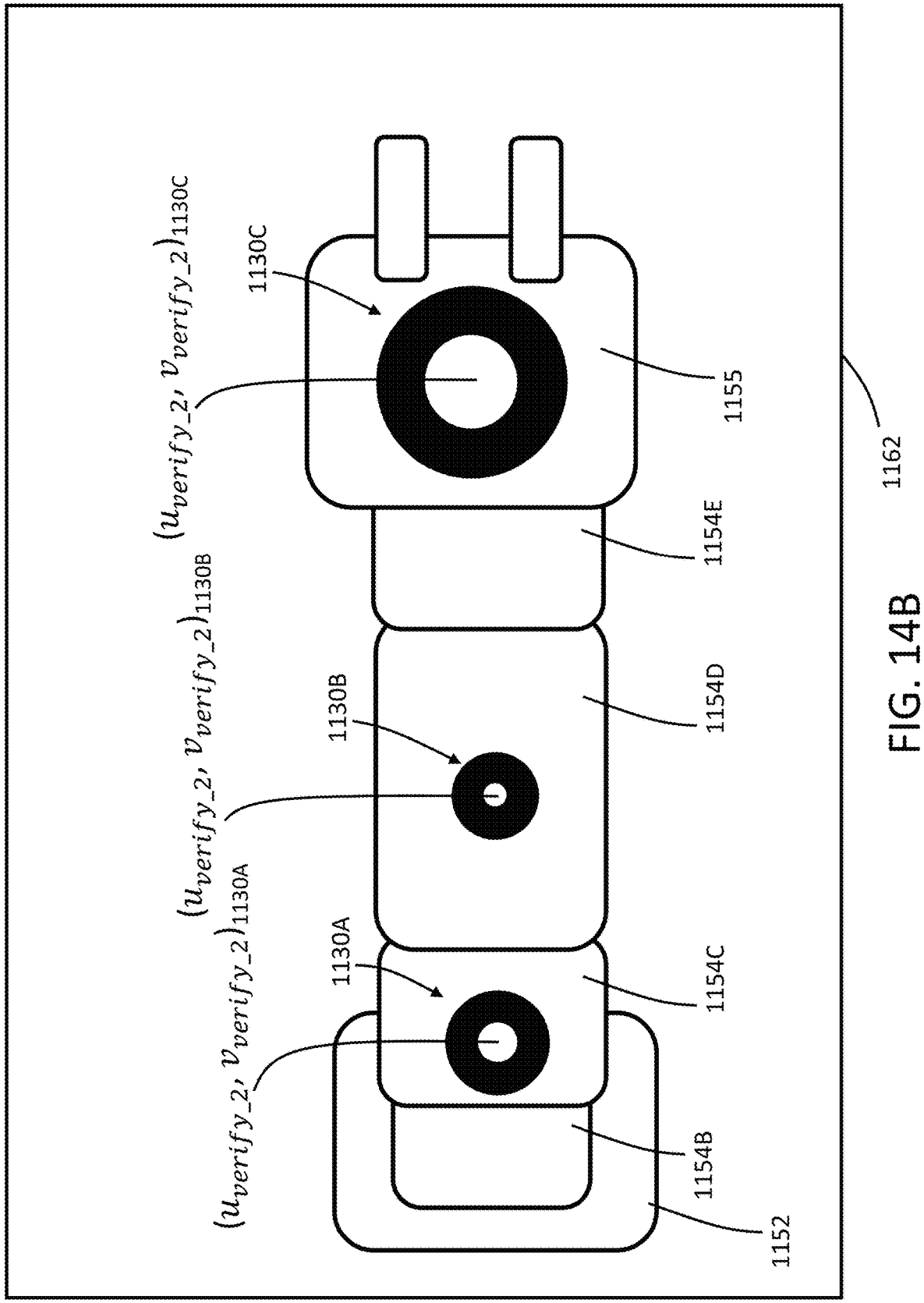

In an embodiment, the control circuit 111 may perform steps 1203-1209 multiple times for multiple reference images and multiple verification images (e.g., five reference images and five verification images). The multiple reference images and multiple verification images may correspond with multiple respective poses. For example, FIGS. 10A-10C depict a series of three poses for the robot arm 553. In this example, the control circuit 111 of the robot controller 110 or any other computing system may receive a first reference image and a first verification image that are both associated with the first pose as illustrated in FIG. 10A, receive a second reference image and a second verification image that are both associated with a second pose illustrated in FIG. 10B, and a third reference image and third verification image that are associated with a third pose illustrated in FIG. 10C. In another example, the reference image 1120 of the FIG. 13A may be a first reference image, and the verification image 1160 of FIG. 13B may be a first verification image, both of which may be associated with the first pose depicted in FIG. 11A for the robot arm 1153. In this example, the control circuit 111 may further receive a second reference image 1122 of FIG. 14A and a second verification image 1162 of FIG. 14B, both of which may be associated with a second pose depicted in FIG. 11B. In this example, the reference image coordinates $[u_{ref\_1} \; v_{ref\_1}]^T_{1130A}$, $[u_{ref\_1} \; v_{ref\_1}]^T_{1130B}$, $[u_{ref\_1} \; v_{ref\_1}]^T_{1130C}$ of FIG. 13A may be a first group of reference image coordinates, while the verification image coordinates $[u_{verify\_1}\ v_{verify\_1}]^T_{1130A}$, $[u_{verify\_1}\ v_{verify\_1}]^T_{1130B}$, $[u_{verify\_1}\ v_{verify\_1}]^T_{1130C}$ of FIG. 13B may be a first group of verification image coordinates. The control circuit 111 in this example may further be configured to determine a second group of reference image coordinates $[u_{ref\_2}\ v_{ref\_2}]^T_{1130A}$, $[u_{ref\_2}\ v_{ref\_2}]^T_{1130B}$, $[u_{ref\_2}\ v_{ref\_2}]^T_{1130C}$ for the second reference image 1122 of FIG. 14A, and to determine a second group of verification image coordinates $[u_{verify\_2}\ v_{verify\_2}]^T_{1130A}$, $[u_{verify\_2}\ v_{verify\_2}]^T_{1130B}$, $[u_{verify\_2}\ v_{verify\_2}]^T_{1130C}$ for the second verification image 1162 of FIG. 14B. In the above examples, the control circuit 111 may be configured in some instances to output different respective movement commands for causing the robot arm (e.g., 1153) to move to the multiple respective poses, wherein the multiple reference images and/or multiple verification images are associated with the multiple respective poses.

Returning to FIGS. 12A-12B, the method 1200 in an embodiment may include a step 1211, in which the control circuit 111 determines a group of respective deviation parameter values that are based on respective amounts of deviation between the group of reference image coordinates (e.g., $[u_{ref\_1}\ v_{ref\_1}]^T_{1130A}$, $[u_{ref\_1}\ v_{ref\_1}]^T_{1130B}$, $[u_{ref\_1}\ v_{ref\_1}]^T_{1130C}$ of FIG. 13A) and the group of verification image coordinates (e.g., $[u_{verify\_1}\ v_{verify\_1}]^T_{1130A}$, $[u_{verify\_1}\ v_{verify\_1}]^T_{1130B}$, $[u_{verify\_1}\ v_{verify\_1}]^T_{1130C}$ of FIG. 13B). For example, the group of respective deviation parameter values in the context of FIGS. 13A and 13B may include a first deviation parameter value, a second deviation parameter value, and a third deviation parameter value. The first deviation parameter value may be based on an amount of deviation between a first reference image coordinate $[u_{ref\_1}\ v_{ref\_1}]^T_{1130A}$ for the verification symbol 1130A in the reference image 1120 and a first verification image coordinate $[u_{verify\_1}\ v_{verify\_1}]^T_{1130A}$ for the verification symbol 1130A in the verification image 1160. For instance, the first deviation parameter value may be equal to or more generally based on a distance between the first reference image coordinate and the first verification image coordinate, as discussed above with respect to step 457 of FIG. 4B. Similarly, the second deviation parameter value may be based on (e.g., equal to) an amount of deviation between a second reference image coordinate $[u_{ref\_1}\ v_{ref\_1}]^T_{1130B}$ for the verification symbol 1130B in the reference image 1120 and a second verification image coordinate $[u_{verify\_1}\ v_{verify\_1}]^T_{1130B}$ for the verification symbol 1130B in the verification image 1160. Further, the third deviation parameter value may be based on an amount of deviation between a third reference image coordinate $[u_{ref\_1}\ v_{ref\_1}]^T_{1130C}$ for the verification symbol 1130C in the reference image 1120 and a third verification image coordinate $[u_{verify\_1}\ v_{verify\_1}]^T_{1130C}$ for the verification symbol 1130C in the verification image 1160. In the above example, the group of respective deviation parameter values are associated with the group of verification symbols 1130A-1130C. That is, the first deviation parameter value is associated with the verification symbol 1130A, while the second deviation parameter value is associated with the verification symbol 1130B, and the third deviation parameter value is associated with the verification symbol 1130C.

In an embodiment, some or all of the group of respective deviation parameter values may be based on a single pair of a reference image and a verification image, both of which may be associated with a common pose for the robot arm. For example, the first deviation parameter value discussed above may be associated with the verification symbol 1130A, and may be based on a single pair of the reference image 1120 and the verification image 1160, both of which are associated with a common pose, such as the pose in FIG. 11A.

In an embodiment, some or all of the group of respective deviation parameter values may be based on multiple pairs of respective reference images and respective verification images, wherein each pair is associated with a respective pose of multiple poses for the robot arm. As an example, the first deviation parameter value discussed above, which is associated with the verification symbol 1130A, may be based on a first pair of the reference image 1120 and the verification image 1160 (of FIGS. 13A and 13B), and a second pair of the reference image 1122 and the verification image 1162 (of FIGS. 14A and 14B). The first pair may be associated with the first pose of FIG. 11A, while the second pair may be associated with the second pose of FIG. 11B. More particularly, the first deviation parameter value in this example may be based on an amount of deviation (e.g., distance) between $[u_{ref\_1}\ v_{ref\_1}]^T_{1130A}$ and $[u_{verify\_1}\ v_{verify\_1}]^T_{1130A}$ (which are associated with the first pose), and based on an amount of deviation between $[u_{ref\_2}\ v_{ref\_2}]^T_{1130A}$ and $[u_{verify\_2}\ v_{verify\_2}]^T_{1130A}$ (which are associated with the second pose). In one example, the first deviation parameter value may be equal to or based on an average of the two amounts of deviation. More generally speaking, the group of respective deviation parameter values in this example may be based on respective amounts of deviation between the first group of reference image coordinates and the first group of verification image coordinates (which are associated with the first pose), and further based on respective amounts of deviation between the second group of reference image coordinates and the second group of verification image coordinates (which are associated with the second pose).

In some cases, a reference image coordinate in a first reference image and a reference image coordinate in a second reference image may be part of a set of reference image coordinates that indicate where a common verification symbol (e.g., 1130A) appears in a set of reference images, such as the two reference images 1120, 1122 discussed above. The set of reference images and set of reference image coordinates in this example may correspond to a set of respective poses for the robot arm (e.g., 1153), such as the two poses in FIGS. 11A and 11B, respectively. Similarly, a verification image coordinate in a first verification image and a verification image coordinate in a second verification image may be part of a set of verification image coordinates that indicate where the verification symbol appears in a set of verification images, such as the verification images 1160, 1162 discussed above. The set of verification images and the set of verification image coordinates may also correspond to the set of poses. In such cases, a deviation parameter value associated with the verification symbol may be based on respective amounts of deviation between the set of reference image coordinates and the set of verification image coordinates.

Returning to FIGS. 12A-12B, method 1200 may in an embodiment include a step 1213, in which the control circuit 111 determines whether at least one deviation parameter value of the group of respective deviation parameter values exceeds a defined deviation threshold. In some cases, step 1213 may be similar to step 459 of FIG. 4B. In an embodiment, step 1213 may involve determining whether each deviation parameter value of the group of respective deviation parameter values has exceeded a respective deviation threshold. For example, the control circuit 111 may determine whether a deviation parameter value associated with the verification symbol 1130A has exceeded a defined deviation threshold, whether the deviation parameter value associated with the verification symbol 1130B has exceeded a defined deviation threshold, and/or whether the deviation parameter value associated with the verification symbol 1130C has exceeded the defined deviation threshold. In some cases, the respective deviation thresholds may have the same value and thus form a common deviation threshold for the verification symbols, or may have different values.

In an embodiment, the method may include a step 1215, in which the control circuit 111 may perform at least one of the following in response to a determination that at least one deviation parameter value of the group of respective deviation parameter values exceeds the defined deviation threshold: (a) outputting a notification that at least one of the group of respective deviation parameter values exceeds the defined deviation threshold, or (b) performing a calibration operation to determine updated calibration information (e.g., updated camera calibration information). For example, step 1215 may involve outputting the notification to a user interface device, such as an electronic display in communication with the robot controller 110. The electronic display may display, for instance, the at least one deviation parameter value, or an indication that the at least one deviation parameter value exceeds the defined deviation threshold. In an embodiment, performing the calibration operation in step 1215 may be similar to or the same as step 461 in FIG. 4B. In an embodiment, if the calibration information of step 1201 is determined by performing a first calibration operation, then the calibration operation of step 1215 may be a second calibration operation that is subsequent to the first calibration operation.

In an embodiment, the at least one deviation parameter value exceeding the defined deviation threshold may indicate that there is a change to the camera (e.g., 1170 of FIGS. 11A-11B) and/or a change to an environment of the camera or to the robot operation system (e.g., 1100). In some cases, the change to the camera may be an internal change, such as if a lens or image sensor of the camera has changed shape or size due to a temperature change or physical damage. In some cases, the change to the camera may include a change to a location at which the camera (e.g., 170) is mounted, such as due to a vibration in a structure (e.g., ceiling) to which the camera is mounted. In some cases, a change in the environment of the camera or to the robot operation system may include a change in a position or orientation of a base (e.g., 1152) of a robot (e.g., 1150), such as due to a vibration in a structure (e.g., floor) to which the robot is mounted. In some cases, the change in the environment of the camera or to the robot operation system may be a change in a relationship between arm portions of the robot arm (e.g., between the links 1154A-1154E of the robot arm 1153), or in the arm portions themselves. For example, one of the arm portions (e.g., link 1154D or the robot hand 1155) may become bent or otherwise deformed or damaged due to an event which was not planned for by the computing system 110. The unplanned event may be a collision event or some other unexpected event which can lead to possible change in the robot (e.g., 1150) or other element of the robot operation system. The calibration verification discussed above may provide a quick and efficient technique for detecting the change to a camera (e.g., 1170) and/or a change to an environment of the camera or to the robot operation system 1100. For instance, a change in the camera (e.g., 1170) and/or the robot (e.g., 1150) may be detected by comparing a reference image coordinate(s) and a corresponding verification image coordinate(s) to determine a difference between them. In many cases, such a comparison can be made without placing a heavy demand on computational resources of the computing system 110. For example, the comparison can be done with computations that take only a limited amount of processor execution time and/or a limited amount of memory. Thus, the comparison can facilitate accurate monitoring of the accuracy of calibration information in a computationally efficient manner.

In an embodiment, the at least one deviation parameter value exceeding the defined deviation threshold may indicate that there is a calibration error, such as a camera calibration error in which the camera calibration information from the first camera calibration is no longer sufficiently accurate. In an embodiment, the method 1200 may involve the control circuit 111 determining a type of calibration error (also referred to as a type of mis-alignment) causing the at least one deviation parameter value to exceed the defined deviation threshold. The type of calibration error may indicate, for instance, whether a loss of accuracy for the calibration information (e.g., camera calibration information) is caused by or otherwise representative of a change to the robot, or whether the loss of accuracy is caused by or otherwise representative of a change to the camera. For example, the change to the camera (e.g., 1170) may include the internal change to the camera and/or the change to the location at which the camera is mounted, as discussed above. The change to the robot may include the change to a location or orientation of a base (e.g., 1152) of the robot (e.g., 1150), a change to the relationship between the arm portions of the robot arm (e.g., 1153), and/or a change to the arm portions themselves, as discussed above.

In an embodiment, the determination of the type of calibration error may be based on a comparison among the group of respective deviation parameter values, and more specifically based on whether the group of respective deviation parameter values exceed a defined deviation threshold in a substantially uniform manner. For example, if the group of deviation parameter values associated with the different verification symbols (e.g., 1130A-1130C) all exceed the defined deviation threshold and do so in a substantially uniform manner, the control circuit 111 may determine that the loss of accuracy is caused by the camera (e.g., 1170), or more specifically by a change to the camera. This is because an appearance for each of the verification symbols (e.g., 1130A-1130C) in a reference image or verification image is dependent on an internal property and/or on positioning of the camera (e.g., 1170). More specifically, the reference image coordinates and verification image coordinates for the verification symbols (e.g., 1130A-1130C) in the reference image or verification image may all be dependent on the internal property or on the positioning of the camera. Thus, a change to the internal property or to the positioning of the camera (e.g., 1170) may often affect respective deviation parameter values for all of the verification symbols (e.g., 1130A-1130C), and more specifically may often increase all of the deviation parameter values in a substantially uniform manner. By comparison, if there is damage, malfunctioning operation, or other change in a portion of the robot (e.g., 1150), such as an arm portion, it is unlikely that other portions of the robot would all be changed (e.g., damaged or all malfunction) in exactly the same way. Thus, if there is a change in a portion of the robot which would increase at least one deviation parameter value above the defined deviation threshold, other deviation parameter values of the group of deviation parameter values may still remain below the defined deviation threshold, or the group of deviation parameter values may all exceed the defined deviation threshold, but do so in a non-uniform manner. Thus, in an embodiment, if at least one of the group of respective deviation parameter values associated with the different verification symbols (e.g., 1130A-1130C) exceeds the defined deviation threshold, but the group of respective deviation parameter values do not all exceed the defined deviation threshold in a substantially uniform manner, the control circuit 111 may determine that the loss of accuracy is caused by the robot (e.g., 1150), or more specifically a change to the robot.

In an embodiment, the control circuit 111 may use a defined uniformity threshold to evaluate whether the group of deviation parameter values all exceed the defined deviation threshold in a substantially uniform manner. For instance, the control circuit 111 may determine whether at least one of the deviation parameter value exceeds the defined deviation threshold, and further determine whether differences among the deviation parameter values (or among the respective amounts by which they exceed the defined deviation threshold) are within the defined uniformity threshold. The uniformity threshold may be defined in a dynamic manner (e.g., based on a current operating condition of the robot operation system), or may be predefined. As an example of using the defined uniformity threshold, if the control circuit 111 determines that respective deviation parameter values for the verification symbols 1130A-1130C all exceed the defined deviation threshold, but that a deviation parameter value associated with the verification symbol 1130C differs from a deviation parameter value associated with the verification symbol 1130A by more than the defined uniformity threshold, and/or differs from a deviation parameter value associated with the verification symbol 1130B by more than the defined uniformity threshold, then the control circuit 111 may determine that the loss of accuracy is caused by a change in the robot 1150, such as a change in at least the robot hand 1155 or other arm portion on which the verification symbol 1130C is disposed. In the above example, the control circuit 111 is directly comparing the deviation parameter values. In other examples, the control circuit 111 may compare respective amounts by which the deviation parameter values exceed the defined deviation threshold, and whether those respective amounts differ by more than the defined uniformity threshold. In another example, if the control circuit 111 determines that a first deviation parameter value of the group of deviation parameter values exceed the defined deviation threshold, but that one or more of the group of deviation parameter values do not exceed the defined deviation threshold, the control circuit 111 may also determine that the calibration error (also referred to as a mis-alignment) is caused by a change to the robot (e.g., 1150), such as to an arm portion on which the verification symbol associated with the first deviation parameter value is disposed. In another example, if the control circuit 111 determines that the group of deviation parameter values all exceed the defined deviation threshold and that they do not differ from each other by more than the defined uniformity threshold, then the control circuit 111 may determine that the calibration error is caused by a change in the camera (e.g., 1170).

In some cases, the control circuit 111 of the robot controller 110 or other computing system may be in communication with a conveyor belt, such as conveyor belt 1173 of FIGS. 11A and 11B. In such cases, the control circuit 111 may be configured, in response to a determination that the at least one deviation parameter value exceeds the defined deviation threshold, to cause the conveyor 1173 belt to stop. Stopping the conveyor belt 1173 may prevent the robot arm 1153 from having an undesired interaction with an object on the conveyor belt 1173 based on inaccurate calibration information.

In an embodiment, the control circuit 111 may be configured to determine that, if the calibration information is sufficiently accurate for a particular arm portion (e.g., link 1154C on which verification symbol 1130A is disposed, or link 1154D on which verification symbol 1130B is disposed, or robot hand 1155 on which verification symbol 1130C is disposed), that the calibration information is also sufficiently accurate for one or more arm portions which are upstream of that particular arm portion. As stated above, the plurality of arm portions may be arranged as a series of arm portions, from a base of the robot to a robot end effector. An arm portion may be upstream of another arm portion if the former arm portion precedes the latter arm portion in the series of arm portions. For instance, link 1154D in FIGS. 11A-11B may be upstream of link 1154E and the robot hand 1155. In one example, if the control circuit 111 determines that the calibration information (e.g., camera calibration information) is sufficiently accurate for, e.g., the robot hand 1155, it may determine that the calibration is sufficiently accurate for upstream arm portions, such as link 1154E, 1154D, 1154C, 1154B, and 1154A. In this example, the control circuit 111 may determine that the calibration information is sufficiently accurate for an arm portion if a deviation parameter value associated with a verification symbol disposed on the arm portion is below the defined deviation threshold. In an embodiment, if the control circuit 111 determines that there is a calibration error for a particular arm portion, such that the calibration information is not sufficiently accurate for that arm portion, the control circuit 111 may determine that there is a calibration error for some or all downstream arm portions. For example, if the control circuit 111 determines that the calibration information is not sufficiently accurate for a particular robot portion such as link 1154D, then the control circuit 111 may determine that the calibration information is not sufficiently accurate for downstream arm portions, such as link 1154E and the robot hand 1155.

In an embodiment, one or more steps of the method 1200, such as steps 1203 through 1215, may be performed by the robot controller 110 or other computing system in response to a user command. For instance, a user (e.g., system operator) may manually trigger a calibration verification operation that involves steps 1203 through 1215. In an embodiment, steps 1203 through 1215 may be performed during an idle period. The idle period may be, e.g., a period in which a robot operation such as picking up objects from a conveyor belt or a pallet is not being performed. In an embodiment, one or more steps of the method 1200, such as steps 1203 through 1215, may be performed by the robot controller 110 or other computing system in response to a defined triggering condition. As discussed above, the triggering condition may include, e.g., an unplanned event such as a collision involving the robot (e.g., 1150), an earthquake or other natural disaster, which may lead to a change in the robot (e.g., 1150) and/or the camera (e.g., 1170). In some cases, the triggering condition may include a specific period of time elapsing after an earlier calibration operation, such as a calibration operation used to determine the calibration information of step 1201. In such an example, the earlier calibration operation may be a first calibration operation, while the calibration operation of step 1215 may be a second calibration operation.

Additional Discussion of Various Embodiments

Embodiment A1 relates to a robot control system comprising a communication interface configured to communicate with a robot having a base and a robot arm with a verification symbol disposed thereon, and to communicate with a camera having a camera field of view. The robot control system further comprises a control circuit configured to perform a first camera calibration (or, more generally, a calibration operation) to determine camera calibration information associated with the camera (or, more generally, calibration information associated with the robot control system). The control circuit is further configured: a) to control the robot arm to move the verification symbol, during or after the first camera calibration, to a location within the camera field of view by outputting a first movement command to the robot via the communication interface, the location being a reference location of one or more reference locations for verification of the first camera calibration, b) to receive an image of the verification symbol from the camera via the communication interface, wherein the camera is configured to capture the image of the verification symbol at the reference location, the image being a reference image for the verification, c) to determine a reference image coordinate for the verification, the reference image coordinate being a coordinate at which the verification symbol appears in the reference image; d) to control, based on the camera calibration information, movement of the robot arm to perform a robot operation by outputting a second movement command that is based on the camera calibration information to the robot via the communication interface; e) to detect an idle period during the robot operation; f) to control the robot arm to move the verification symbol to at least the reference location during the idle period by outputting a third movement command to the robot via the communication interface; g) to receive an additional image of the verification symbol from the camera via the communication interface during the idle period, wherein the camera is configured to capture the additional image of the verification symbol at least at the reference location, the additional image being a verification image for the verification; h) to determine a verification image coordinate used for the verification, the verification image coordinate being a coordinate at which the verification symbol appears in the verification image; i) to determine a deviation parameter value based on an amount of deviation between the reference image coordinate and the verification image coordinate, the reference image coordinate and the verification image coordinate both associated with the reference location, wherein the deviation parameter value is indicative of a change in the camera since the first camera calibration or of a change in a relationship between the camera and the robot since the first camera calibration, i) to determine whether the deviation parameter value exceeds a defined threshold, and j) in response to a determination that the deviation parameter value exceeds the defined threshold, to perform a second camera calibration to determine updated camera calibration information (or, more generally to perform a second calibration operation to determine updated calibration information).

Embodiment A2 includes the robot control system of embodiment A1, wherein the control circuit is configured, in response to a determination that the deviation parameter value does not exceed the defined threshold, to control the robot to continue the robot operation after the idle period without performing additional camera calibration by outputting a fourth movement command to the robot via the communication interface.

Embodiment A3 includes the robot control system of embodiment A1 or A2, wherein the one or more reference locations are a plurality of reference locations that respectively correspond with a plurality of reference image coordinates, the reference image coordinate being one of the plurality of reference image coordinates. In this embodiment, the control circuit is further configured to determine a plurality of verification image coordinates respectively corresponding to the plurality of reference locations, wherein the verification image coordinate is one of the plurality of verification image coordinates, and wherein the deviation parameter value is based on respective amounts of deviation between the plurality of reference image coordinates and the plurality of verification image coordinates for the plurality of reference locations, wherein each amount of deviation of the respective amounts of deviation is between: (a) a reference image coordinate corresponding to a respective reference location of the plurality of reference locations, and (b) a verification image coordinate corresponding to the same reference location.

Embodiment A4 includes the robot control system of embodiment A3, wherein the plurality of verification image coordinates are respective coordinates at which the verification symbol appears in a plurality of verification images, the verification image being one of the plurality of verification images, and wherein the control circuit is configured to control the camera to capture all of the plurality of verification images in the idle period.

Embodiment A5 includes the robot control system of embodiment A3, wherein the plurality of verification image coordinates are respective coordinates at which the verification symbol appears in a plurality of verification images, the verification image being one of the plurality of verification images, and wherein the control circuit is configured to control the camera to capture the plurality of verification images in different idle periods, the idle period being one of the different idle periods.

Embodiment A6 includes the robot control system of any one of embodiments A1-A5, wherein the verification symbol includes a first region having a first color and a second region having a second color, wherein a ratio of an area of the first region to an area of the second region is defined and stored on a storage device of the robot control system as a defined ratio.

Embodiment A7 includes the robot control system of embodiment A6, wherein the control circuit is configured to identify the verification symbol in the reference image or the verification image based on the defined ratio.

Embodiment A8 includes the robot control system of embodiment A7, wherein the robot arm has a calibration pattern disposed thereon, wherein the reference image includes the verification symbol and the calibration pattern, wherein the control circuit is configured to determine whether a portion of the reference image is the verification symbol or the calibration pattern by determining whether the portion of the reference image has a first image region having the first color and has a second image region having the second color, and whether a ratio between an area of the first image region and an area of the second image region is equal to the defined ratio.

Embodiment A9 includes the robot control system of any one of embodiments A1-A8, wherein the verification symbol includes a first shape and a second shape that are concentric with each other, wherein respective centers of the first shape and the second shape are at substantially the same location.

Embodiment A10 includes the robot control system of embodiment A9, wherein the control circuit is configured to determine the reference image coordinate by: a) determining a first coordinate of a center of the first shape in the reference image; b) determining a second coordinate of a center of the second shape in the reference image; and c) determining the reference image coordinate as an average of the first coordinate and the second coordinate in the reference image. In this embodiment, the control circuit is configured to determine the verification image coordinate by: d) determining a first coordinate of a center of the first shape in the verification image; e) determining a second coordinate of a center of the second shape in the verification image; and f) determining the verification image coordinate as an average of the first coordinate and the second coordinate in the verification image.

Embodiment A11 includes the robot control system of any one of embodiments A1-A10, wherein the control circuit is configured to identify the verification symbol in the reference image or the verification image by identifying a circular ring, the verification symbol being shaped as the circular ring.

Embodiment A12 includes the robot control system of any one of embodiments A1-A11, wherein the control circuit is further configured to determine a temperature of an environment in which the robot is located; and to adjust at least one of the defined threshold or the camera calibration information based on the temperature that is measured.

Embodiment A13 includes the robot control system of embodiment A12, wherein the control circuit is configured to adjust the defined threshold based on the temperature by: setting the defined threshold to have a first value when the temperature is outside of a defined range; and setting the threshold to a have a second value lower than the first value when the temperature is within the defined range.

Embodiment A14 includes the robot control system of any one of embodiments A1-A13, wherein the one or more reference locations to which the control circuit is configured to cause the verification symbol to be moved via the robot arm include a plurality of reference locations disposed on a surface of a sphere that is concave with respect to the camera.

Embodiment A15 includes the robot control system of embodiment A14, wherein the control circuit is further configured to control the robot arm to move the verification symbol to be tangent to the surface of the sphere at each reference location of the plurality of reference locations.

Embodiment A16 includes the robot control system of any one of embodiments A1-A15, wherein the control circuit is configured to control the robot arm to move the verification symbol to directly face the camera when the verification symbol is moved to the reference location.

Embodiment A17 includes the robot control system of any one of embodiments A1-A16, wherein the control circuit is configured to detect the idle period of the robot operation by detecting a time period during which the robot is free from performing a robot task during the robot operation.

Embodiment A18 includes the robot control system of embodiment A17, wherein the control circuit is configured to control the robot arm to interact with objects on a conveyor belt that is reachable by the robot arm, wherein the control circuit is configured to detect the idle period by detecting the conveyor belt having no object thereon, or detecting that a distance between the robot and a closest object on the conveyor belt exceeds a defined distance threshold.

Embodiment B1 relates to a computing system comprising a communication interface and a control circuit. The communication interface is configured to communicate with: (i) a camera having a camera field of view and (ii) a robot having a robot arm with a plurality of arm portions that are movably attached to each other, and with a group of verification symbols that are disposed on respective arm portions of the plurality of arm portions. The control circuit is configured, when the robot arm is in the camera field of view, to perform a method that comprises: outputting a movement command for controlling movement of the robot arm to perform a robot operation, wherein the movement command is based on calibration information; determining a group of reference image coordinates, the group of reference image coordinates being respective coordinates at which the group of verification symbols appear in a reference image, wherein the reference image is an image for representing the group of verification symbols, and is generated by the camera during a first time period when the robot arm is in a first pose; outputting, during a second time period subsequent to the first time period, an additional movement command for controlling the robot arm to move to the first pose; receiving a verification image, which is an additional image for representing the group of verification symbols, and is generated by the camera when the robot arm has been moved to the first pose as a result of the additional movement command; determining a group of verification image coordinates, the group of verification image coordinates being respective coordinates at which the group of verification symbols appear in the verification image; determining a group of respective deviation parameter values that are based on respective amounts of deviation between the group of reference image coordinates and the group of verification image coordinates, wherein the group of respective deviation parameter values are associated with the group of verification symbols; determining whether at least one deviation parameter value of the group of respective deviation parameter values exceeds a defined deviation threshold; and performing at least one of the following in response to a determination that at least one deviation parameter value of the group of respective deviation parameter values exceeds the defined deviation threshold: outputting a notification that at least one of the group of respective deviation parameter values exceeds the defined deviation threshold, or performing a calibration operation to determine updated calibration information. The control circuit may perform the method by, e.g., executing instructions on a non-transitory computer-readable medium.

Embodiment B2 includes the computing system of Embodiment B1, wherein the first pose is associated with a first additional movement command output during the first time period, the first additional movement command having one or more actuation parameter values for controlling the robot arm to move to the first pose, wherein the reference image is generated by the camera when the robot arm is in the first pose as a result of the first additional movement command. Further in this embodiment, the additional movement command output during the second time period is a second additional movement command, and also includes the one or more actuation parameter values.

Embodiment B3 includes the computing system of Embodiment B2, wherein each verification symbol of the group of verification symbols has a circular shape, and wherein the one or more actuation parameter values of the first additional movement command and of the second additional movement command cause the group of verification symbols to be positioned in a manner such that the group of verification symbols appear in the reference image and in the verification image with no eccentricity, or with respective amounts of eccentricity that are less than a defined eccentricity threshold.

Embodiment B4 includes the computing system of any one of Embodiments B1-B3, wherein the control circuit is configured to determine one or more actuation parameter values for the additional movement command that cause each verification symbol of the group of verification symbols to be moved to directly face the camera.

Embodiment B5 includes the computing system of Embodiment B4, wherein the one or more actuation parameter values cause the group of verification symbols to be tangent to one or more imaginary spheres that are concave with respect to the camera.

Embodiment B6 includes the computing system of any one of Embodiments B1-B5, wherein when at least one verification symbol of the group of verification symbols is shaped as a circular ring, the control circuit is configured to identify the at least one verification symbol in the reference image and in the verification image by identifying the circular ring.

Embodiment B7 includes the computing system of Embodiment B6, wherein when the group of verification symbols are shaped as respective circular rings having different respective sizes, the control circuit is configured to identify the at least one verification symbol based on a size of a respective circular ring forming the at least one verification symbol.

Embodiment B8 includes the computing system of any one of Embodiments B1-B7, wherein the control circuit is configured to identify at least one verification symbol of the group of verification symbols in the reference image based on a defined model that describes a geometry of the robot arm.

Embodiment B9 includes the computing system of Embodiment B8, wherein the control circuit is configured to determine, based on the model, a region within the reference image at which the at least one verification symbol is expected to appear, and to search for the at least one verification symbol within the region of the reference image.

Embodiment B10 includes the computing system of any one of Embodiments B1-B9, wherein the control circuit is configured to determine, based on a comparison among the group of respective deviation parameter values, a type of calibration error causing the at least one deviation parameter value to exceed the defined deviation threshold, wherein the type of calibration error indicates whether a loss of accuracy for the calibration information is representative of a change in the robot, or whether the loss of accuracy is representative of a change in the camera.

Embodiment B11 includes the computing system of Embodiment B10, wherein the control circuit is configured to determine whether the group of respective deviation parameter values all exceed the defined deviation threshold and whether the group of respective deviation parameters differ from each other by more than a defined uniformity threshold. The control circuit in this embodiment is further configured, in response to a determination that the group of respective deviation parameter values all exceed the defined deviation threshold and do not differ from each other by more than the defined uniformity threshold, to determine that the type of calibration error is a calibration error representative of a change in the camera.

Embodiment B12 includes the computing system of Embodiment B11, wherein the control circuit is further configured, in response to a determination that one or more of the group of respective deviation parameter values do not exceed the defined deviation threshold, or that the group of respective deviation parameter values differ from each other by more than the defined uniformity threshold, to determine that the type of calibration error is a calibration error representative of a change in the robot.

Embodiment B13 includes the computing system of any one of Embodiments B1-B12. In this embodiment, the calibration information is associated with a first calibration operation, and the calibration operation for generating the updated calibration information is a second calibration operation that is subsequent to the first calibration operation, wherein the control circuit is configured to output the additional movement command and to output a camera command for receiving the verification image in response to a defined triggering condition. The defined triggering condition includes at least one of: a defined period of time elapsing since the first calibration operation, or an event which was not planned by the computing system and which results in a change to the robot or to the camera.

Embodiment B14 includes the computing system of any one of Embodiments B1-B13, wherein when the plurality of robot arm portions are arranged as a series of arm portions from a base of the robot to a robot end effector, the control circuit is configured: to determine whether a deviation parameter value for a first verification symbol of the group of verification symbols exceeds the defined deviation threshold; to identify from among the plurality of arm portions a first arm portion on which the first verification symbol is disposed; and in response to a determination that the deviation parameter value for first verification symbol does not exceed the defined deviation threshold, to determine that the calibration information is accurate for the first arm portion and for at least one additional arm portion which precedes the first arm portion in the series of arm portions.

Embodiment B15 includes the computing system of any one of Embodiments B1-B14, wherein when the computing system is in communication with a conveyor belt used for the robot operation, the control circuit is configured, in response to a determination that the at least one deviation parameter value exceeds the defined deviation threshold, to cause the conveyor belt to be stopped.

Embodiment B16 includes the computing system of any one of Embodiments B1-B15, wherein the reference image is a first reference image associated with the first pose of the robot arm, wherein the verification image is a first verification image associated with the first pose, wherein the group of reference image coordinates is a first group of reference image coordinates associated with the first pose, and the group of verification image coordinates is a first group of verification image coordinates associated with the first pose. In this embodiment, the control circuit is configured: to determine a second group of reference image coordinates, the second group of reference image coordinates being respective coordinates at which the group of verification symbols appear in a second reference image, wherein the second reference image is generated by the camera when the robot arm is in a second pose; to output, subsequent to the second reference image being generated, a further movement command for controlling the robot arm to move the robot arm to the second pose; to receive a second verification image, which also represents the group of verification symbols, and is generated by the camera when the robot arm has been moved to the second pose as a result of the further movement command; and to determine a second group of verification image coordinates, the second group of verification image coordinates being respective coordinates at which the group of verification symbols appear in the second verification image. In this embodiment, the group of respective deviation parameter values are further based on respective amounts of deviation between the second group of reference image coordinates and the second group of verification image coordinates.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A computing system comprising:
   a communication interface configured to communicate with: (i) a camera having a camera field of view and (ii) a robot having a robot arm with a plurality of arm portions that are movably attached to each other, and with a group of verification symbols that are disposed on respective arm portions of the plurality of arm portions; and
   a control circuit configured, when the robot arm is in the camera field of view:
      to output a movement command for controlling movement of the robot arm to perform a robot operation, wherein the movement command is based on calibration information;
      to determine a group of reference image coordinates, the group of reference image coordinates being respective coordinates at which the group of verification symbols appear in a reference image, wherein the reference image is an image for representing the group of verification symbols, and is generated by the camera during a first time period when the robot arm is in a first pose;
      to output, during a second time period subsequent to the first time period, an additional movement command for controlling the robot arm to move to the first pose;
      to receive a verification image, which is an additional image for representing the group of verification symbols, and is generated by the camera when the robot arm has been moved to the first pose as a result of the additional movement command;
      to determine a group of verification image coordinates, the group of verification image coordinates being respective coordinates at which the group of verification symbols appear in the verification image;
      to determine a group of respective deviation parameter values that are based on respective amounts of deviation between the group of reference image coordinates and the group of verification image coordinates, wherein the group of respective deviation parameter values are associated with the group of verification symbols,
      to determine whether at least one deviation parameter value of the group of respective deviation parameter values exceeds a defined deviation threshold, and
      to perform at least one of the following in response to a determination that at least one deviation parameter value of the group of respective deviation parameter values exceeds the defined deviation threshold: outputting a notification that at least one of the group of respective deviation parameter values exceeds the defined deviation threshold, or performing a calibration operation to determine updated calibration information.

2. The computing system of claim 1, wherein the first pose is associated with a first additional movement command output during the first time period, the first additional movement command having one or more actuation parameter values for controlling the robot arm to move to the first pose, wherein the reference image is generated by the camera when the robot arm is in the first pose as a result of the first additional movement command, and
   wherein the additional movement command output during the second time period is a second additional movement command, and also includes the one or more actuation parameter values.

3. The computing system of claim 2, wherein each verification symbol of the group of verification symbols has a circular shape, and wherein the one or more actuation parameter values of the first additional movement command and of the second additional movement command cause the group of verification symbols to be positioned in a manner such that the group of verification symbols appear in the reference image and in the verification image with no eccentricity, or with respective amounts of eccentricity that are less than a defined eccentricity threshold.

4. The computing system of claim 1, wherein the control circuit is configured to determine one or more actuation parameter values for the additional movement command that cause each verification symbol of the group of verification symbols to be moved to directly face the camera.

5. The computing system of claim 4, wherein the one or more actuation parameter values cause the group of verification symbols to be tangent to one or more imaginary spheres that are concave with respect to the camera.

6. The computing system of claim 1, wherein when at least one verification symbol of the group of verification symbols is shaped as a circular ring, the control circuit is configured to identify the at least one verification symbol in the reference image and in the verification image by identifying the circular ring.

7. The computing system of claim 6, wherein when the group of verification symbols are shaped as respective circular rings having different respective sizes, the control circuit is configured to identify the at least one verification symbol based on a size of a respective circular ring forming the at least one verification symbol.

8. The computing system of claim 1, wherein the control circuit is configured to identify at least one verification symbol of the group of verification symbols in the reference image based on a defined model that describes a geometry of the robot arm.

9. The computing system of claim 8, wherein the control circuit is configured
   to determine, based on the model, a region within the reference image at which the at least one verification symbol is expected to appear, and
   to search for the at least one verification symbol within the region of the reference image.

10. The computing system of claim 1, wherein the control circuit is configured to determine, based on a comparison among the group of respective deviation parameter values, a type of calibration error causing the at least one deviation parameter value to exceed the defined deviation threshold, wherein the type of calibration error indicates whether a loss of accuracy for the calibration information is representative of a change in the robot, or whether the loss of accuracy is representative of a change in the camera.

11. The computing system of claim 10, wherein the control circuit is configured to determine whether the group of respective deviation parameter values all exceed the defined deviation threshold and whether the group of respective deviation parameters differ from each other by more than a defined uniformity threshold, and
    in response to a determination that the group of respective deviation parameter values all exceed the defined deviation threshold and do not differ from each other by more than the defined uniformity threshold, to determine that the type of calibration error is a calibration error representative of a change in the camera.

12. The computing system of claim 11, wherein the control circuit is further configured, in response to a determination that one or more of the group of respective deviation parameter values do not exceed the defined deviation threshold, or that the group of respective deviation parameter values differ from each other by more than the defined uniformity threshold, to determine that the type of calibration error is a calibration error representative of a change in the robot.

13. The computing system of claim 1, wherein the calibration information is associated with a first calibration operation, and the calibration operation for generating the updated calibration information is a second calibration operation that is subsequent to the first calibration operation, wherein the control circuit is configured to output the additional movement command and to output a camera command for receiving the verification image in response to a defined triggering condition, wherein the defined triggering condition includes at least one of: a defined period of time elapsing since the first calibration operation, or an event which was not planned by the computing system and which results in a change to the robot or to the camera.

14. The computing system of claim 1, wherein when the plurality of robot arm portions are arranged as a series of arm portions from a base of the robot to a robot end effector, the control circuit is configured:
    to determine whether a deviation parameter value for a first verification symbol of the group of verification symbols exceeds the defined deviation threshold;
    to identify from among the plurality of arm portions a first arm portion on which the first verification symbol is disposed; and
    in response to a determination that the deviation parameter value for first verification symbol does not exceed the defined deviation threshold, to determine that the calibration information is accurate for the first arm portion and for at least one additional arm portion which precedes the first arm portion in the series of arm portions.

15. The computing system of claim 1, wherein when the computing system is in communication with a conveyor belt used for the robot operation, the control circuit is configured, in response to a determination that the at least one deviation parameter value exceeds the defined deviation threshold, to cause the conveyor belt to be stopped.

16. The computing system of claim 1, wherein the reference image is a first reference image associated with the first pose of the robot arm, wherein the verification image is a first verification image associated with the first pose, wherein the group of reference image coordinates is a first group of reference image coordinates associated with the first pose, and the group of verification image coordinates is a first group of verification image coordinates associated with the first pose, wherein the control circuit is configured:
    to determine a second group of reference image coordinates, the second group of reference image coordinates being respective coordinates at which the group of verification symbols appear in a second reference image, wherein the second reference image is generated by the camera when the robot arm is in a second pose;
    to output, subsequent to the second reference image being generated, a further movement command for controlling the robot arm to move the robot arm to the second pose;
    to receive a second verification image, which also represents the group of verification symbols, and is generated by the camera when the robot arm has been moved to the second pose as a result of the further movement command;
    to determine a second group of verification image coordinates, the second group of verification image coordinates being respective coordinates at which the group of verification symbols appear in the second verification image,
    wherein the group of respective deviation parameter values are further based on respective amounts of deviation between the second group of reference image coordinates and the second group of verification image coordinates.

17. A non-transitory computer-readable medium having instructions stored thereon that, when executed by a control circuit of a computing system, causes the control circuit
    to output a movement command that is based on calibration information, wherein the computing system is configured to communicate with: (i) a camera having a camera field of view and (ii) a robot having a robot arm that includes a plurality of arm portions that are movably attached to each other, and includes a group of verification symbols that are disposed on respective arm portions of the plurality of arm portions, and wherein the movement command is for controlling movement of the robot arm to perform a robot operation;
    to determine a group of reference image coordinates, the group of reference image coordinates being respective coordinates at which the group of verification symbols appear in a reference image, wherein the reference image is an image for representing the group of verification symbols, and is generated by the camera during a first time period when the robot arm is in a first pose;
    to output, during a second time period subsequent to the first time period, an additional movement command for controlling the robot arm to move to the first pose;
    to receive a verification image, which is an additional image for representing the group of verification symbols, and is generated by the camera when the robot arm has been moved to the first pose as a result of the additional movement command;
    to determine a group of verification image coordinates, the group of verification image coordinates being respective coordinates at which the group of verification symbols appear in the verification image;
    to determine a group of respective deviation parameter values that are based on respective amounts of deviation between the group of reference image coordinates and the group of verification image coordinates, wherein the group of respective deviation parameter values are associated with the group of verification symbols, to determine whether at least one deviation parameter value of the group of respective deviation parameter values exceeds a defined deviation threshold, and to perform at least one of the following in response to a determination that at least one deviation parameter value of the group of respective deviation parameter values exceeds the defined deviation threshold: outputting a notification that at least one of the group of respective deviation parameter values exceeds the defined deviation threshold, or performing a calibration operation to determine updated calibration information.

18. The non-transitory computer-readable medium of claim 17, wherein the first pose is associated with a first additional movement command output during the first time period, the first additional movement command having one or more actuation parameter values for controlling the robot arm to move to the first pose, wherein the additional movement command output during the second time period is a second additional movement command, and also includes the one or more actuation parameter values.

19. The non-transitory computer-readable medium of claim 17, wherein the instructions, when executed by the control circuit, further cause the control circuit to determine, based on a comparison among the group of respective deviation parameter values, a type of calibration error causing the at least one deviation parameter value to exceed the defined deviation threshold, wherein the type of calibration error indicates whether a loss of accuracy for the calibration information is representative of a change in the robot, or whether the loss of accuracy is representative of a change in the camera.

20. A method performed by a computing system, comprising:

outputting, by the computing system, a movement command that is based on calibration information, wherein the computing system is configured to communicate with: (i) a camera having a camera field of view and (ii) a robot having a robot arm with a plurality of arm portions that are movably attached to each other, and with a group of verification symbols that are disposed on respective arm portions of the plurality of arm portions, and wherein the movement command is for controlling movement of the robot arm to perform a robot operation;

determining, by the computing system, a group of reference image coordinates, the group of reference image coordinates being respective coordinates at which the group of verification symbols appear in a reference image, wherein the reference image is an image for representing the group of verification symbols, and is generated by the camera during a first time period when the robot arm is in a first pose;

outputting, by the computing system during a second time period subsequent to the first time period, an additional movement command for controlling the robot arm to move to the first pose;

receiving a verification image by the computing system, wherein the verification image is an additional image for representing the group of verification symbols, and is generated by the camera when the robot arm has been moved to the first pose as a result of the additional movement command;

determining, by the computing system, a group of verification image coordinates, the group of verification image coordinates being respective coordinates at which the group of verification symbols appear in the verification image;

determining, by the computing system, a group of respective deviation parameter values that are based on respective amounts of deviation between the group of reference image coordinates and the group of verification image coordinates, wherein the group of respective deviation parameter values are associated with the group of verification symbols, determining, by the computing system, that at least one deviation parameter value of the group of respective deviation parameter values exceeds a defined deviation threshold, and performing at least one of the following by the computing system in response to a determination that at least one deviation parameter value of the group of respective deviation parameter values exceeds the defined deviation threshold: outputting a notification that at least one of the group of respective deviation parameter values exceeds the defined deviation threshold, or performing a calibration operation to determine updated calibration information.

* * * * *